(12) United States Patent
Simpson et al.

(10) Patent No.: US 8,572,681 B2
(45) Date of Patent: Oct. 29, 2013

(54) METHODS AND SYSTEMS FOR IDENTITY VERIFICATION

(75) Inventors: Paul Simpson, Oakville (CA); Felix Chau, Markham (CA)

(73) Assignee: WIC CDN Inc., Vaughn, Ontario (CA)

( * ) Notice: Subject to any disclaimer, the term of this patent is extended or adjusted under 35 U.S.C. 154(b) by 1077 days.

(21) Appl. No.: 12/382,233

(22) Filed: Mar. 11, 2009

(65) Prior Publication Data

US 2010/0235623 A1 Sep. 16, 2010

(51) Int. Cl.
*H04L 29/06* (2006.01)
*H04L 9/32* (2006.01)
*G06Q 10/00* (2012.01)

(52) U.S. Cl.
USPC ............. 726/2; 713/155; 713/168; 705/18; 726/11

(58) Field of Classification Search
USPC .............. 713/155, 168; 726/2, 11; 705/18
See application file for complete search history.

(56) References Cited

U.S. PATENT DOCUMENTS

| | | | |
|---|---|---|---|
| 6,950,536 B2 | 9/2005 | Houvener | |
| 6,957,199 B1 | 10/2005 | Fisher | |
| 7,328,344 B2 | 2/2008 | Chang | |
| 7,333,635 B2 | 2/2008 | Tsantes et al. | |
| 7,566,002 B2 * | 7/2009 | Love et al. | 235/380 |
| 2002/0083008 A1 | 6/2002 | Smith et al. | |
| 2002/0120846 A1 | 8/2002 | Stewart et al. | |
| 2004/0010695 A1 | 1/2004 | Sahota et al. | |
| 2004/0088587 A1 * | 5/2004 | Ramaswamy et al. | 713/202 |
| 2005/0144114 A1 | 6/2005 | Ruggieri et al. | |
| 2005/0144457 A1 * | 6/2005 | Lee et al. | 713/176 |
| 2005/0177505 A1 | 8/2005 | Keeling et al. | |
| 2006/0020783 A1 | 1/2006 | Fisher | |
| 2006/0047814 A1 * | 3/2006 | Batz et al. | 709/226 |
| 2006/0101508 A1 | 5/2006 | Taylor | |
| 2006/0144927 A1 | 7/2006 | Love et al. | |
| 2006/0173985 A1 * | 8/2006 | Moore | 709/223 |
| 2006/0277043 A1 | 12/2006 | Tomes et al. | |
| 2007/0136603 A1 | 6/2007 | Kueceukyan | |
| 2008/0065889 A1 | 3/2008 | Green et al. | |
| 2008/0189551 A1 | 8/2008 | Chang | |

* cited by examiner

*Primary Examiner* — Kambiz Zand
*Assistant Examiner* — Aubrey Wyszynski
(74) *Attorney, Agent, or Firm* — Fasken Martineau Dumoulin LLP

(57) ABSTRACT

The present invention relates to methods and systems for identity verification. The method includes transmitting from a customer system to a customer connector server an identity verification request containing identification information for an individual. At the customer connector server, at least one verification service required for the request is identified and a data manager server is selected for each service. A verification service request is transmitted to each data manager server. At each data manager server, at least one data access service is identified and one data connector server is selected for each service. A data access service request is transmitted to each data connector server. At least one data source is accessed from each data connector server for each request. The identification information provided is then verified against identity information stored within the at least one data source and a response is generated and communicated to the customer system.

45 Claims, 48 Drawing Sheets

METHODS AND SYSTEMS FOR IDENTITY VERIFICATION

FIELD OF THE INVENTION

The present invention relates to the field of identity verification. More specifically, the present invention relates to methods and systems for verifying the identity of an individual.

BACKGROUND OF THE INVENTION

Of late identity fraud has become a worrying concern. Identity fraud and theft resulting therefrom are on the rise and are considered to be one of the fastest growing crimes in North America. Criminals are increasingly using false, stolen, or forged identification documents to commit thefts and other crimes. In some cases, real identification documents have been altered to create a fake identity for a thief. In other cases, false identification documents have been manufactured using sophisticated design technologies. In some instances, the names featured on these identification documents match the real names of unsuspecting, law-abiding citizens. Government organizations and other identity document issuing authorities have attempted to foil these identity thieves and forgers by incorporating security features (i.e. such holographic images, special watermarks, etc.) in the identity documents. While these enhanced security features may tend to initially stymie forgers, in the long run, forgers find ways to circumvent these security features.

At present, most identity verification procedures rely on a physical inspection of the identification documents presented by an individual. Those who carry out these inspections may have had very little training or be generally ill-equipped to identity forgeries. Even when adequately trained, such inspectors may still be duped by elaborate forgeries. As a result, such inspections which rely on a subjective examination of the physical identity document tend to be unreliable. In any event, these inspections tend to focus on authenticating the identity document or artifact and not the identity featured on the identity document, which is ultimately what is required.

Identity verifications procedures which are based on verifying the correctness of identifying information of the individual (i.e. name, date of birth, address, social security number or social insurance number, passport number, etc.) exist and are routinely used by police and other security professionals to authenticate identity. However, such systems tend to typically require access to government or other third party data provider records or databases (which access may be restricted for reasons of privacy and security). Moreover, such systems tend be very expensive to deploy because of the need to accommodate different platforms used by the data sources and may be highly customized to suit the needs of the requestor. As a result, such identity verification systems tend to be out of reach or not generally available or accessible to members of the public or businesses at large.

In light of the foregoing, it would be desirable to have an effective identity verification solution; one that that could be broadly implemented in businesses at large and that could be commonly used by a plurality of different users to verify the identity of individuals prior to the completion of a commercial transaction, such as a purchase, rental or lease. Preferably, such a system would be secure and would not compromise an individual's right to privacy. It would be further advantageous if such a system were capable of verifying an individual's identity using a plurality of data sources and of returning a response to such verification in good time. Such a system would tend to allow identity verification to be carried out in an efficient and cost-effective manner and would tend to make identity verification services more accessible to the public.

SUMMARY OF THE INVENTION

According to a broad aspect of an embodiment of the invention, there is provided method for verifying the identity of an individual. The method includes the step of transmitting from a customer system to a customer connector server a request for identity verification containing identification information provided by the individual to be identified. At the customer connector server, at least one verification service required to satisfy the request for identity verification is identified from the request for identity verification. An appropriate data manager server from a plurality of data manager servers is selected for each verification service, based on a first set of predetermined criteria. A corresponding request for verification service is then transmitted to each appropriate data manager server. At each appropriate data manager server, at least one data access service required to permit the identification information provided by the individual to be verified against identity information relating to the individual contained within the at least one data source, is identified from the corresponding request for verification service. An appropriate data connector server from a plurality of data connector servers is thereafter selected for each data access service, based on a second set of predetermined criteria. Subsequently, a corresponding request for data access service is transmitted to each appropriate data connector server. At least one data source is accessed from each appropriate data connector server in connection with each request for data access service. The identification information provided by the individual is verified against the identity information relating to the individual contained within the at least one data source. Next, a response indicating whether the identity of the individual has been authenticated or not is generated and communicated to the customer system.

In an additional feature, the method further includes receiving at the customer connector server the request for identity verification and authenticating the source of the request for identity verification, prior to identifying from the request for identity verification the at least one verification service.

In another feature, the request for identity verification includes encrypted header, input and output xml strings. The method further includes decrypting and de-serializing the header, input and output xml strings, after authenticating the source of the request for identity verification. Additionally, the method includes creating incoming header, input and output data holders for the data obtained from the decrypted and deserialized header, input and output xml strings and loading data into the incoming header, input and output data holders.

In a further feature, identifying from the request for identity verification the at least one verification service includes obtaining from the incoming header data holder an incoming service identifier associated with at least one verification service, and determining the at least one verification service based on the incoming service identifier. After the determining step, outbound header, input and output data holders may be created and data from the incoming header, input and output data holders may be loaded into the outbound header, input and output data holders.

In yet a further feature, the first set of predetermined criteria includes the geographic proximity of each data manager server to the customer connector server and the responsiveness of each data manager server. The step of selecting for each verification service an appropriate data manager server, includes the step of retrieving for each verification service a list of data manager servers capable of managing the verification service and information pertaining to the geographic proximity and responsiveness criteria for each of the data manager servers on the list.

In still another feature, the method further includes receiving at the appropriate data manager server the corresponding request for verification service and authenticating the source of the request for verification service, prior to identifying from the request for verification service the at least one data access service. The request for verification service includes encrypted incoming header, input and output xml strings. After authenticating the source of the request for verification service, the incoming header, input and output xml strings is decrypted and de-serialized.

In a further feature, the step of identifying from the request for verification service the at least one data access service includes obtaining from the incoming header data holder an incoming service identifier associated with at least one data access service, and determining the at least one data access service based on the incoming service identifier. After the determining step, outbound header, input and output data holders may be created and data from the incoming header, input and output data holders may be loaded into the outbound header, input and output data holders. The method further includes, after the steps of creating and loading, the step of verifying whether the requestor who initiated the request for identity verification has a valid subscription to the verification service requested.

In still another feature, the second set of predetermined criteria includes the geographic proximity of each data connector server to the appropriate data manager server and the responsiveness of each data connector server. The step of selecting for each data access service an appropriate data connector server, includes the step of retrieving for each data access service a list of data connector servers capable of managing the data access service and information pertaining to the geographic proximity and responsiveness for each of the data connector servers on the list.

In an additional feature, the method further includes receiving at the appropriate data connector server the corresponding request for data access service and authenticating the source of the request for data access service, prior to accessing from each appropriate data connector server at least one data source. The request for data access service includes encrypted incoming header, input and output xml strings. The method further includes the step of decrypting and de-serializing the incoming header, input and output xml strings, after authenticating the source of the request for data access service.

According to another broad aspect of an embodiment of the invention, there is provided method for verifying the identity of an individual. The method includes the step of transmitting from a business portal to a customer connector server a request for identity verification containing identification information provided by the individual to be identified. At the business portal, at least one verification service required to satisfy the request for identity verification is identified from the request for identity verification. An appropriate data manager server from a plurality of data manager servers is selected for each verification service, based on a first set of predetermined criteria. A corresponding request for verification service is then transmitted to each appropriate data manager server. At each appropriate data manager server, at least one data access service required to permit the identification information provided by the individual to be verified against identity information relating to the individual contained within the at least one data source, is identified from the corresponding request for verification service. An appropriate data connector server from a plurality of data connector servers is thereafter selected for each data access service, based on a second set of predetermined criteria. Subsequently, a corresponding request for data access service is transmitted to each appropriate data connector server. At least one data source is accessed from each appropriate data connector server in connection with each request for data access service. The identification information provided by the individual is verified against the identity information relating to the individual contained within the at least one data source. Next, a response indicating whether the identity of the individual has been authenticated or not is generated and communicated to the customer system.

According to yet another broad aspect of an embodiment of the invention, there is provided a system for verifying the identity of an individual. The system includes a customer connector server for connecting to a customer system and for receiving therefrom a request for identity verification containing identification information provided by the individual to be identified; a plurality of data manager servers connected the customer connector server; and a plurality of data connector servers. Each data connector server is connected to at least one data manager server of the plurality and is operable to access at least one data source containing identity information relating to the individual. The customer connector server is operable to identify from the request for identity verification at least one verification service required to satisfy the request and to select for each verification service, based on a first set of predetermined criteria, an appropriate data manager server of the plurality thereof to manage the verification service. The customer connector server is further operable to transmit to each appropriate data manager server a corresponding request for verification service. Each appropriate data manager server is operable to identity from the corresponding request for verification service at least one data access service required to permit the identification information provided by the individual to be verified against the identity information relating to the individual contained within the at least one data source. Each appropriate data manager server is further operable to select for each data access service, based on a second set of predetermined criteria, an appropriate data connector server of the plurality thereof to manage the data access service, and to transmit to each appropriate data connector server a corresponding request for data access service.

In a further feature, the customer system includes a system selected from the group consisting of: (a) a point-of-sale system; (b) a financial services system; and (c) a risk management system.

In another feature, the plurality of data manager servers includes a first data manager server and a second data manager server. The customer connector server is connected to the first data manager server; the first data manager server is connected to the second data manager server; and the second data manager server is connected to one of the data connector servers of the plurality.

In still another feature, at least one data source is selected from the group consisting of: (a) a database system; (b) a legacy records system; and (c) a web service.

In yet another feature, the at least one data source is managed by a data service provider. The selected at least one data connector server is physically located at a facility of the data service provider and resides behind a firewall of the data service provider.

In another feature, the customer connector server, the data manager servers and the data connector servers includes a server engine for coordinating and managing the performance of a plurality of request and response processing steps, and a plurality of frameworks configured for communication with the server engine. The plurality of frameworks have resources which may be called upon by the server engine to perform at least some of the request and response processing steps. The plurality of frameworks may include an engine framework, a system development framework and a system portal framework.

Additionally, the customer connector server may include a main process manager module; a communication service module for receiving the request for identity verification from the customer system and for returning responses to the customer system; a request handler module for coordinating authentication of the source of the request for identity verification and creation of a first set of incoming data holders associated with the request for identity verification received from the customer system; a customer handler module for creating a second set of outgoing data holders based on the first set of incoming data holders for transmission to each appropriate data manager server; and a service locator module configured for communication with the customer handler module. The service locator module is operable to select the appropriate data manager and transmit to the appropriate data manager server the outgoing data holders. Each of the communication service module, the request handler module and the customer handler module is configured for communication with the main process manager module. The main process manager module is operable to coordinate the activities of the communication service module, the request handler module and the customer handler module.

In still another feature, the server engine of the customer connector server may further include a heart beat service module configured for communication with the service locator module and co-operable therewith to transmit heart beat type messages to the plurality of data manager servers to measure the responsiveness of the plurality of data manager servers.

In yet another feature, the server engine of each data manager server includes a main process manager module; a communication service module for receiving a request for verification service from the customer connector server and for returning responses to the customer connector server; a request handler module for coordinating authentication of the source of the request for verification service and creation of a first set of incoming data holders associated with the request for verification service received from the customer connector server; a service handler module for creating a second set of outgoing data holders based on the first set of incoming data holders for transmission to the appropriate data connector server; and a service locator module configured for communication with the service handler module. The service locator module is operable to select the appropriate data connector server and transmit to the appropriate data connector server the outgoing data holders. Each of the communication service module, the request handler module and the service handler module is configured for communication with the main process manager module. The main process manager module is operable to coordinate the activities of the communication service module, the request handler module and the service handler module.

In still another feature, the server engine of each data manager server further includes a heart beat service module configured for communication with the service locator module and co-operable therewith to transmit heart beat type messages to at least some data connector servers of the plurality to measure the responsiveness of the at least some data connector servers. The heart beat service module is configured for communication with the main engine process module and is operable to respond to heart beat type messages originating from the customer connector server.

In another additional feature, the server engine of each data connector server includes: a main process manager module; a communication service module for receiving a request for data access service from the at least one data manager server and for returning responses to the at least one data manager server; a request handler module for coordinating authentication of the source of the request for data access service and creation of a set of incoming data holders associated with the request for data access service received from the at least one data manager server; a data access module capable of accessing the at least one data source; and an interface handler module configured for communication with, and operable to actuate, the data access module. Each of the communication service module, the request handler module and the interface handler module is configured for communication with the main process manager module. The main process manager module is operable to coordinate the activities of the communication service module, the request handler module and the interface handler module.

Further still, the server engine of each data connector server includes a heart beat service module configured for communication with the main process manager module. The heart beat service module is operable to respond to heart beat type messages originating from the at least one data manager server.

Additionally, the server engine of each data connector server further includes a cache database connected to the data access service module. The cache database is capable of storing data extracted from the at least one data source. The server engine of each data connector server is further provided with a batch control manager connected to the data access service module and the at least one data source. The batch control manager is operable to periodically refresh the data stored on the cache database with more recent data extracted from the at least one data source.

In another feature, the first set of predetermined criteria includes the geographic proximity of each of the data manager servers to the customer connector server and the performance index of each of the data manager servers. The geographic proximity criterion in the first set of predetermined criteria is given priority over the performance index criterion. The performance index of each of the data manager servers is calculated based on the responsiveness of each of the data manager servers. The responsiveness of each of the data manager servers is determined using a heart beat strategy deployed jointly by the customer connector server and each of the data manager servers.

In yet another feature, the second set of predetermined criteria includes the geographic proximity of each of the data connector servers to the appropriate data manager server and the performance index of each of the data connector servers. The geographic proximity criterion in the second set of predetermined criteria is given priority over the performance index criterion. The performance index of each of the data connector servers is calculated based on the responsiveness of each of the data connector servers. The responsiveness of each of the data connector servers is determined using a heart beat strategy deployed jointly by the appropriate data manager server and each of the data connector servers.

According to still another broad aspect of an embodiment of the invention, there is provided a system for verifying the identity of an individual. The system includes a business portal for connecting to a customer system and for receiving therefrom a request for identity verification containing identification information provided by the individual to be identified; a plurality of data manager servers connected the business portal; and a plurality of data connector servers. Each data connector server is connected to at least one data manager server of the plurality and is operable to access at least one data source containing identity information relating to the individual. The business portal is operable to identify from the request for identity verification at least one verification service required to satisfy the request and to select for each verification service, based on a first set of predetermined criteria, an appropriate data manager server of the plurality thereof to manage the verification service. The business portal is further operable to transmit to each appropriate data manager server a corresponding request for verification service. Each appropriate data manager server is operable to identity from the corresponding request for verification service at least one data access service required to permit the identification information provided by the individual to be verified against the identity information relating to the individual contained within the at least one data source. Each appropriate data manager server is further operable to select for each data access service, based on a second set of predetermined criteria, an appropriate data connector server of the plurality thereof to manage the data access service, and to transmit to each appropriate data connector server a corresponding request for data access service.

BRIEF DESCRIPTION OF THE DRAWINGS

The embodiments of the present invention shall be more clearly understood with reference to the following detailed description of the embodiments of the invention taken in conjunction with the accompanying drawings, in which.

DETAILED DESCRIPTION OF EMBODIMENTS OF THE INVENTION

The description which follows, and the embodiments described therein are provided by way of illustration of an example, or examples of particular embodiments of principles and aspects of the present invention. These examples are provided for the purposes of explanation and not of limitation, of those principles of the invention. Specific details pertaining to the particular network configuration, architecture, interfaces, procedures and techniques are set forth in order to provide a thorough understanding of the principles and aspects of the invention. However, it will be apparent to those skilled in the art that the principles of the present invention may be put into practice in other embodiments which depart from these specific details. For the purposes of simplicity and clarity, descriptions of well-known devices, hardware, circuits and methods have been omitted so as not to obscure the description of embodiments of the present invention.

Figure 1:
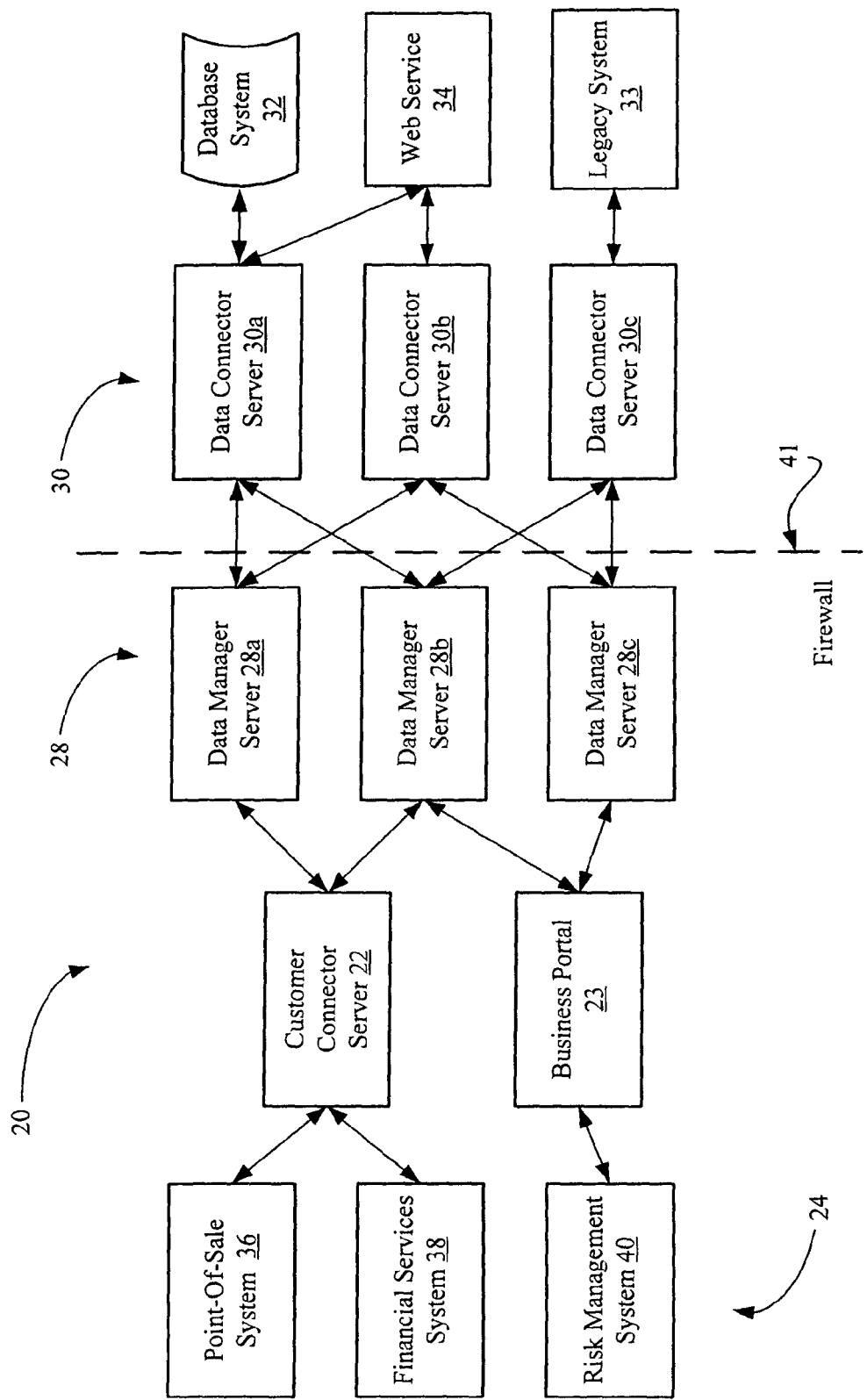
FIG. 1 is a simplified block diagram showing an identity verification system in a network environment in accordance with an embodiment of the invention.

Referring to FIG. 1, there is shown a system used for verifying the identity of an individual designated generally with reference numeral 20. The identity verification system 20 is operatively connected in a network environment. The network environment may include a telephone network, a data network, a mobile cellular network, a satellite network, a wired or wireless network, a network capable of supporting internet telephony or VoIP, or any combination of the foregoing.

The identity verification system 20 includes: at least one of a customer connector server 22 or a business portal 23 for connecting the identity verification system 20 to customer systems 24 and for receiving a request for identity verification from the customer systems 24; a plurality of data manager servers identified generically with reference numeral 28 connected to the customer connector server 22 for managing the third party data services used for verification of the individual's identity; and a plurality of data connector servers identified generically with reference numeral 30 connected to the data manager servers 28 for coordinating access to third party data sources 32, 33 and 34 containing identity information.

To facilitate understanding, a brief conceptual overview of the method performed by the identity verification system 20 is described with reference to FIGS. 8a and 8b. A request for verification of an individual's identity is initiated at the customer systems 24 and transmitted to the customer connector server 22 (or business portal 23) (at step 170). Upon receipt of the request, the customer connector server 22 performs a series of request processing steps which include identifying the verification service(s) required based on an incoming service identifier contained in the header of the request and selecting the appropriate data manager server(s) to carry out the verification service(s) based on certain predetermined criteria. Thereafter, the customer connector server 22 transmits a request for verification service to the selected data manager server(s) (at step 180). Once each data manager server 28 receives the request for verification service, it performs its own request processing steps which may include identifying the data access service(s) required based on an incoming service identifier contained in the header of the request for verification service and selecting the appropriate data connector server(s) 30 to carry out the data access service(s) based on certain predetermined criteria. Each appropriate data manager server 28 then transmits a request for data access service to the appropriate data connector server(s) 30 (at step 190). Each data connector server 30 performs certain request processing steps which may include accessing one or more data sources 32, 33 or 34 to verify the identification information provided by the individual to be verified against the identity information relating to the individual contained within the one or more data sources 32, 33 or 34 (at step 200).

The one or more data sources 32, 33 or 34 transmit a response to its/their associated data connector server 30 (at step 210). Each data connector server 30 will then perform a series of response processing steps and transmits the processed response to its associated data manager server 28 (at step 215). In like fashion, each data manager server 28 will perform a series of response processing steps, which may include compiling responses received from a plurality of data connector servers, before transmitting the compiled response to its associated customer connector server 22 (at step 220). Lastly, the customer connector server 22 performs a series of response processing steps of its own and then transmits a response to the request for identity verification to the customer system 24.

The customer systems 24 shown in FIG. 1 include a point-of-sale system 36, a financial services system 38 and a risk management system 40. These systems 36, 38 and 40 are representative of systems that a customer (i.e. a user of the identity verification system 20 or a requestor of identity verification services) may employ to communicate a request for identity verification to the identity verification system 20. Accordingly, the customer systems 24 could include other systems where identity verification is required. The customer systems 24 may be provided with certain hardware components such as telephones, computer systems, magnetic card readers, scanning devices, keypads, biometric devices or the like and/or certain software programs, applications or user interfaces to permit information identifying the individual to be collected and transmitted to the identity verification system 20.

For ease of secured integration with the customer systems 24, the customer connector server 22 is preferably, physically located in a customer's facility. In this embodiment, the point-of-sale system 36 is connected to the customer connector server 22 through the Internet, while the financial services system 38 is connected to the customer connector server 22 via a virtual private network (VPN). Dedicated transmission lines allow the risk management system 40 to connect to the business portal 23. As will be appreciated by a person skilled in the art, this arrangement is intended to be illustrative only, as the various systems 36, 38 and 40 could be connected to the customer connector server 22 or business portal 23 by any one of the Internet, a virtual private network, dedicated transmission lines and other like means.

The business portal 23 offers customer systems 24 an alternate way to connect to the identity verification system 20. It can be accessed via the Internet or by other similar means. Preferably, the business portal 23 is associated with data centers which are may be located in relatively, close proximity to large urban centers where the concentration of customers may be highest.

In the exemplary embodiment shown in FIG. 1, the plurality of data manager servers 28 includes servers 28a, 28b and 28c and the plurality of data connector servers 30 includes servers 30a, 30b and 30c. When deployed in a real world application, it is likely that a greater number of data manager servers and data connector servers would be employed. As explained in greater detail below, the identity verification system 20 is designed to be scaleable and expandable such that additional data manager servers and data connector servers can be added to the network, as necessary.

Preferably, the data manager servers 28a, 28b and 28c are installed in high security and high availability data centers disposed at different locations in a country serviced by the identity verification system 20, or in other countries worldwide.

In the embodiment shown in FIG. 1, each data manager server 28a, 28b, 28c is shown connected to the customer connector sever 22 or the business portal 23 (or both) and one or more data connector servers 30a, 30b and 30c. However, in other embodiments, the identity verification system could be configured to have a plurality of data manager servers connected to each other in series. For example, in one such an embodiment, the customer connector server could be connected to a first data manager, the first data manager would itself be connected to a second data manager server. But, it is the second data manager server which would be linked to the data connector servers. It will thus be appreciated that the identity verification system may be configured in a number of different ways to suit a particular application.

For security reasons (more specifically to prevent attempts to gain unauthorized access to the third party data sources 32, 33 and 34) and for ease of integration with the data sources 32, 33 and 34, it is preferred that the data connector servers 30a, 30b and 30c be physically located on site at the third party services provider facility and that data connector server 30a, 30b, 30c reside behind the firewall 41 of the third party data services provider. In certain embodiments, one or more data connector servers could be deployed in a dedicated data center having secured communication with the data sources 32, 33 and 34.

Three data sources 32, 33 and 34 are shown in FIG. 1. However, as will be appreciated by a person skilled in the art, the number of data sources represented is merely illustrative. In real world applications, the actual number of data sources would likely be greater than three. Moreover, in this embodiment, data sources 32, 33, 34 represent a database system, a legacy records system and a web service, respectively. However, it should be understood that in other applications the data sources could be different. The data stored, or made available, on such data sources could be drawn from public records, government sources (such as from the Department of Motor Vehicles (DMV) or other like government agencies), credit card issuers and fraud management systems.

Figure 2:
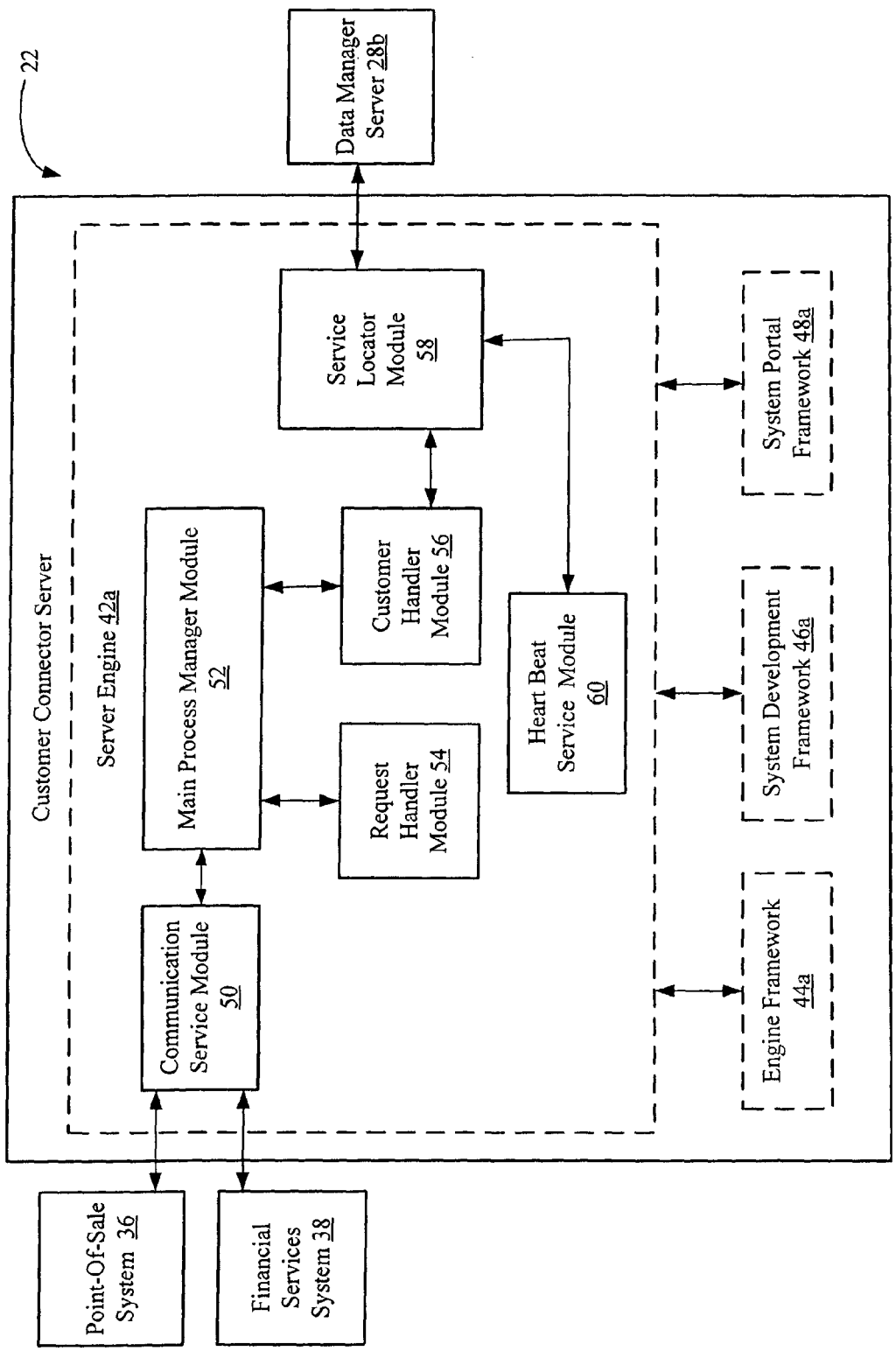
FIG. 2 is a block diagram showing components of the customer connector server illustrated in FIG. 1.
Figure 3:
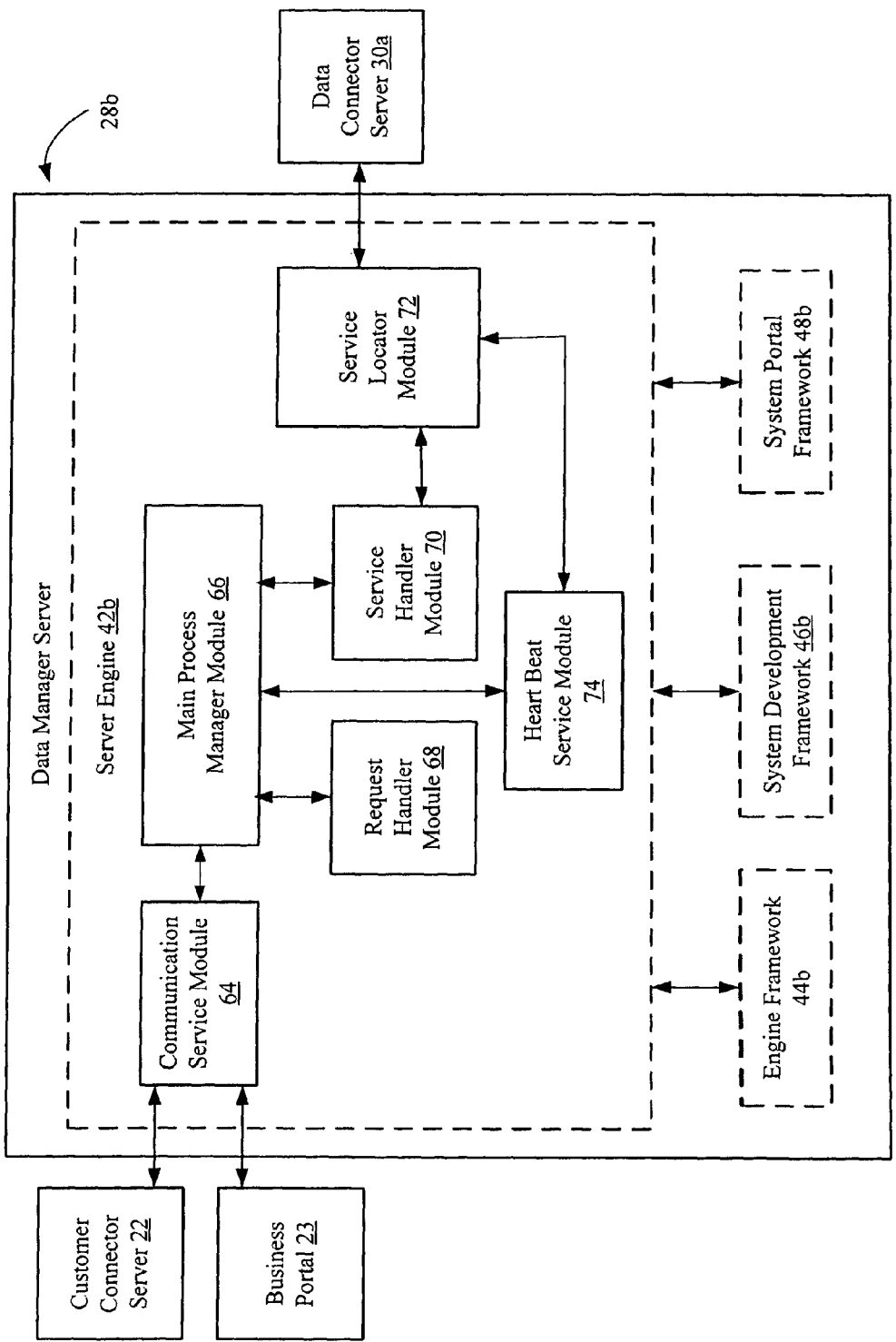
FIG. 3 is a block diagram showing components of one of the data manager servers illustrated in FIG. 1.
Figure 4:
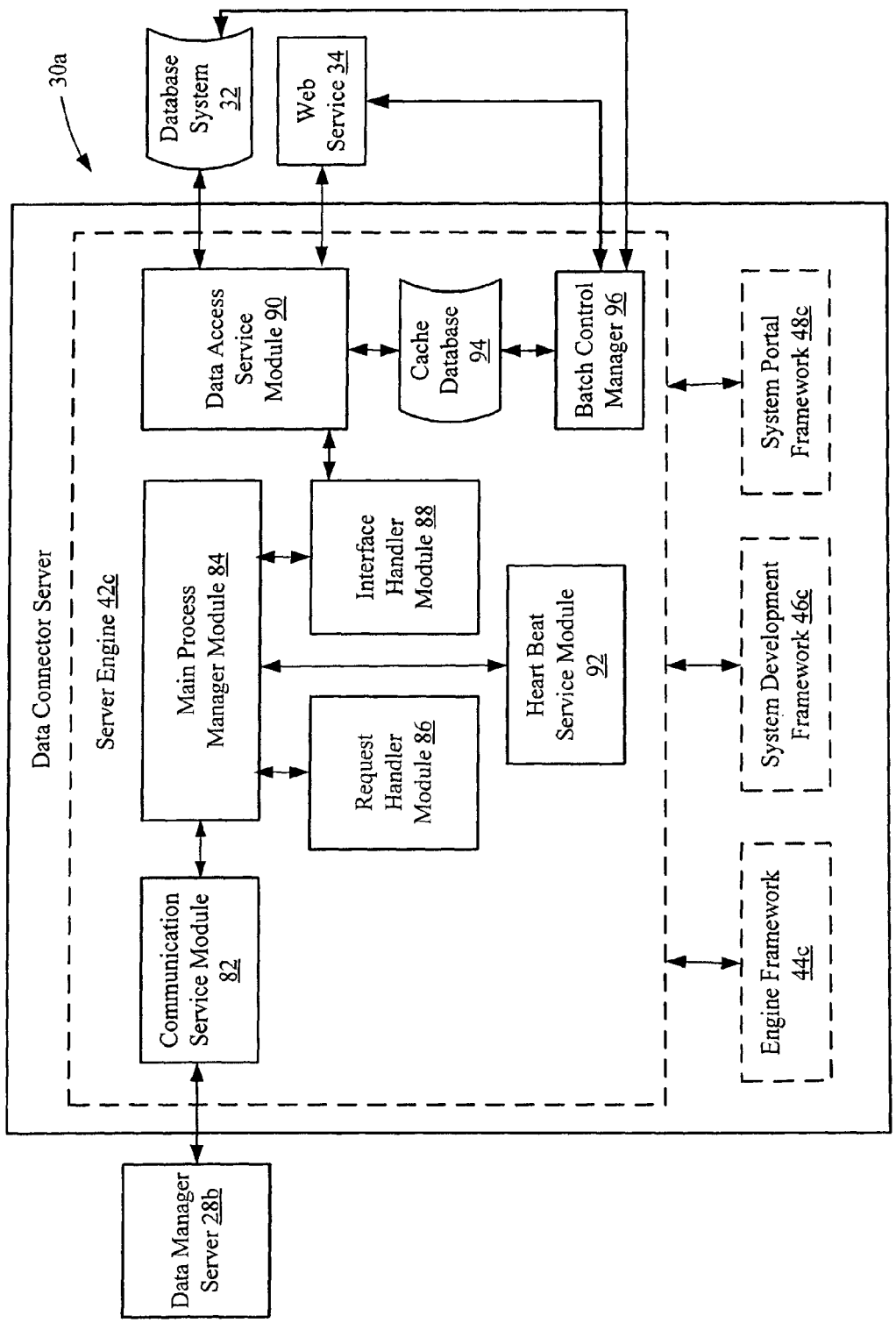
FIG. 4 is a block diagram showing components of one of the data connector servers illustrated in FIG. 1.

Referring to FIGS. 2, 3 and 4, each of the servers 22, 28 and 30 includes: a server engine identified generically with reference numeral 42 (and more specifically, engine 42a in customer connector server 22, engine 42b in data manager server 28 and engine 42c in data connector server 30); an engine framework identified generically with reference numeral 44 (and more specifically, engine framework 44a in customer connector server 22, engine framework 44b in data manager server 28 and engine framework 44c in data connector server 30); a system development framework identified generically with reference numeral 46 (and more specifically, system development framework 46a in customer connector server 22, a system development framework 46b in data manager server 28 and system development framework 46c in data connector server 30); and a systems portal framework identified generically with reference numeral 48 (and more specifically, systems portal framework 48a in customer connector server 22, systems portal framework 48b in data manager server 28 and systems portal framework 48c in data connector server 30). Each of the engine framework 44, the system development framework 46, and the systems portal framework 48 are configured for communication with the server engine 42.

As will be described in greater detail below, the server engine 42 will be responsible for coordinating and managing the performance of the various request and response processing steps carried out in each of the servers 22, 28 and 30 during an identity verification transaction. As needed, the server engine 42 will call upon resources within the engine framework 44, the systems development framework 46 and the systems portal framework 48 to perform specific tasks or steps.

Referring now to FIG. 2, the server engine 42a includes a communication service module 50, a main process manager module 52, a request handler module 54, a customer handler module 56, a heart beat service module 60. Each of the modules 50, 54 and 56 is configured to communicate with the main process manager module 52. The service locator module 58 is connected to the customer handler module 56 and the heart beat service module 60.

The communication service module 50 is designed to receive the request for identity verification transmitted from the customer systems 24 to the customer connector server 22 and to transmit the request to the main process manager module 52 for further processing. When a response to the request is returned to the customer connector server 22, it is the communication service module 50 which ultimately communicates the response to customer systems 24.

The main process manager module 52 co-ordinates the activities of the communication service modules 50, the request handler module 54 and the customer handler module 56 and serves as an intermediary between the communication service module 50 and the request handler module 54 on the one hand, and the request handler module 54 and the customer handler module 56 on the other hand. Broadly speaking, in a typical identity verification transaction, the request received at the communication service module 50 is first transmitted to the main process manager module 52. The main process manager module 52 then transmits the request to the request handler module 54 for processing. The product of this further processing is then returned to the main process manager module 52 to be passed along to the customer handler module 56.

The request handler module 54 is responsible for coordinating the authentication of the source of the request and the creation of data holders (header, input, output), a user context (which stores information regarding the customer system 24 that initiated the request) and a data context (which stores the outgoing service identifiers, the schema for input and output data and information about the customer connector server 22) for the request. As will be explained in greater detail below, the request handler module 54 will call upon the login module 158 of the system portal framework 48a to authenticate the source of the request, and the data holder module 100 and incoming service manager (ISM) module 104 of the engine framework 44a to create the data holders, the user context and the data context.

The role of the customer handler module 56 is to obtain for each outgoing service identifier stored in the data context information about the data manager servers available for the required services. As described in greater detail below, the customer handler module 56 will call upon the outgoing service manager module 108 of the engine framework 44a to complete this task. The customer handler module 56 will also be responsible for creating outbound (header, input and output) data holders and loading each of the header, input and output data holders received from the main process manager module 52 into the corresponding outbound data holder.

The service locator module's 58 primary function is to locate the best-suited (i.e. most appropriate/available) data manager servers 28a, 28b and 28c to whom it may transmit the outbound (header, input, and output) data holders received from the customer handler module 56. Additionally, when any of the data manager servers 28a, 28b and 28c returns a response to the customer connector server 22, it is the service locator module 58 that receives it and passes it back the customer handler module 56 for processing.

The heart beat service module 60 (in cooperation with the heart beat service module 74 of the data manager server 28) is responsible for coordinating the implementation of the heart beat strategy which will be used by the service locator module 58 to locate the best-suited data manager servers 28 to handle the service requests. When a heart beat-type response message is received at the customer connector server 22, it is ultimately routed to the heart beat service module 60. The module 60 will call upon the heart beat manager module 124 of the engine framework 44a to update the statistics database 126 with information obtained from the incoming message. Additionally, the heart beat service manager 60 may be actuated at predetermined times to initiate the sending of periodic performance measuring test messages to each data manager server 28a, 28b and 28c to monitor the health of the system network. The heart beat manager module 124 and the outgoing service manager module 108, both of the engine framework 44a, and the service locator module 58 will be called upon to carry out this task.

Referring now to FIG. 3, there is shown the data manager server 28b. The server engine 42b of the data manager server 28b generally resembles the server engine 42a of the customer connector server 22 in that it has a communication service module 64, a main process manager module 66, a request handler module 68, a service locator module 72 and a heart beat service module 74. However, instead of a customer handler module 56, the data manager server 28b is provided with a service handler module 70. Each of the modules 64, 68, 70 and 74 is configured to communicate with the main process manager module 66. The service locator module 72 is connected to the service handler module 70 and the heart beat service module 74.

The communication service module 64 is designed to receive a request for service transmitted from the customer connector server 22 or business portal 23 and to transmit the request to the main process manager module 66 for further processing. When a response to the request is returned to the data manager server 28b, it is the communication service module 64 which ultimately communicates the response to the customer connector server 22.

The main process manager module 66 co-ordinates the activities of the communication service modules 64, the request handler module 68, the service handler module 70 and the heart beat service module 74, and serves as an intermediary between the communication service module 64 and the request handler module 68, the request handler module 68 and the service handler module 70, and the heart beat service module 74 and the communication service module 64. Broadly speaking, in a typical identity verification transaction, the request for service received at the communication service module 64 is first transmitted to the main process manager module 66. The main process manager module 66 then transmits the request to the request handler module 68 for processing. The product of this further processing is then returned to the main process manager module 66 to be passed along to the service handler module 70.

The request handler module 68 is responsible for coordinating the authentication of the source of the request and the creation of data holders (header, input, output), a user context (which stores information regarding the authenticated user that initiated the service request and the user profile) and a data context (which stores the outgoing service identifiers, the schema for input and output data and information about the data manager server 28b) for the request. As will be explained in greater detail below, the request handler module 68 will call upon the login module 158 of the system portal framework 48b to authenticate the source of the request, and the data holder module 100 and incoming service manager module (ISM) 104 of the engine framework 44b to create the data holders, the user context and the data context.

The role of the service handler module 70 is to obtain for each outgoing service identifier stored in the data context information about the data connector servers available for the required services. As described in greater detail below, the service handler module 70 will call upon the outgoing service manager module 108 of the engine framework 44b to complete this task. The service module 70 will also be responsible for creating outbound (header, input and output) data holders and in most cases, loading each of the header, input and output data holders received from the main process manager module 66 into the corresponding outbound data holder. It also determines whether the output data holders require any customized formatting by calling upon the custom business rules module 120 of the engine framework 44b to search in the rules database 122 for any rules defined for the outgoing service identifier.

The service locator module's 72 primary function is to locate the best-suited (i.e. most appropriate/available) data connector servers 30a, 30b and 30c to whom it may transmit the outbound (header, input, and output) data holders received from the service handler module 70. Additionally, when any of the data manager servers 30a, 30b and 30c returns a response to the data manager server 28b, it is the service locator module 72 that receives it and passes it back the service handler module 70 for processing.

The heart beat service module 74 (in cooperation with the heart beat service module 60) is responsible for coordinating the implementation of the heart beat strategy which will be used by the service locator module 72 to locate the best-suited data connector servers 30 to handle the service requests. When a heart beat-type message is received at data manager server 28, it is ultimately routed to the heart beat service module 74. The module 74 will call upon the heart beat manager module 124 of the engine framework 44b to update the statistics database 126 with information obtained from the incoming message and to generate a reply message to be communicated to the customer connector server 22. Additionally, the heart beat service manager 74 may be actuated at predetermined times to initiate the sending of periodic performance measuring test messages to each data connector server 30a, 30b and 30c to monitor the health of the system network. The heart beat manager module 124 and the outgoing service manager module 108, both of the engine framework 44a, and the service locator module 72 will be called upon to carry out this task.

Referring now to FIG. 4, there is shown the data connector server 30a. The server engine 42c of the data connector server 30a generally resembles the server engine 42b of the data manager server 28b in that it has a communication service module 82, a main process manager module 84, a request handler module 86 and a heart beat service module 92. However, instead of a service handler module 70 and a service locator module 72, the data connector server 30a is provided with an interface handler module 88 and a data access service module 90, respectively. Each of the modules 82, 86, 88 and 92 is configured to communicate with the main process manager module 84. The data access service module 90 is connected to the interface handler module 88. Also provided are a cache database 94 connected to the data access service module 90 and a batch control manager 96 configured for communication with the cache database 94.

The communication service module 82 is designed to receive a request for service transmitted from the data manager servers 28a and 28b and to transmit the request to the main process manager module 84 for further processing. When a response to the request is returned to the data connector server 30a, it is the communication service module 82 which ultimately communicates the response to the data manager server 28a or 28b (as the case may be).

The main process manager module 84 co-ordinates the activities of the communication service modules 82, the request handler module 86, the interface handler module 88 and the heart beat service module 92, and serves as an intermediary between the communication service module 82 and the request handler module 86, the request handler module 86 and the interface handler module 88, and the heart beat service module 92 and the communication service module 82. Broadly speaking, in a typical identity verification transaction, the request for service received at the communication service module 82 is first transmitted to the main process manager module 84. The main process manager module 84 then transmits the request to the request handler module 86 for processing. The product of this further processing is then returned to the main process manager module 84 to be passed along to the interface handler module 88.

The request handler module 86 is responsible for coordinating the authentication of the source of the request and the creation of data holders (header, input, output), a user context (which stores information regarding the data manager server that initiated the service request) and a data context (which stores the outgoing service identifiers, the schema for input and output data and information about the data connector server 30a) for the request. As will be explained in greater detail below, the request handler module 86 will call upon the login module 158 of the system portal framework 48c to authenticate the source of the request, and the data holder module 100 and incoming service manager (ISM) module 104 of the engine framework 44c to create the data holders, the user context and the data context.

The role of the interface handler module 88 is to call on the data access service module 90 to access the data sources 32, 33 and 34. The data access service module 90 is adapted to communicate with each of the data sources 32, 33 and 34 and is responsible for implementing a data I/O (input/output) format for each data source 32, 33, 34 to be queried. It can implement a variety of data I/O formats such as, those employed in legacy systems, message-based systems, mirrored Relational Database Management Systems (RDBMS), systems using real-time Open Database Connectivity (ODBC) access, Simple Object Access Protocol (SOAP)) or systems that require intermediary caching.

Figure 19:
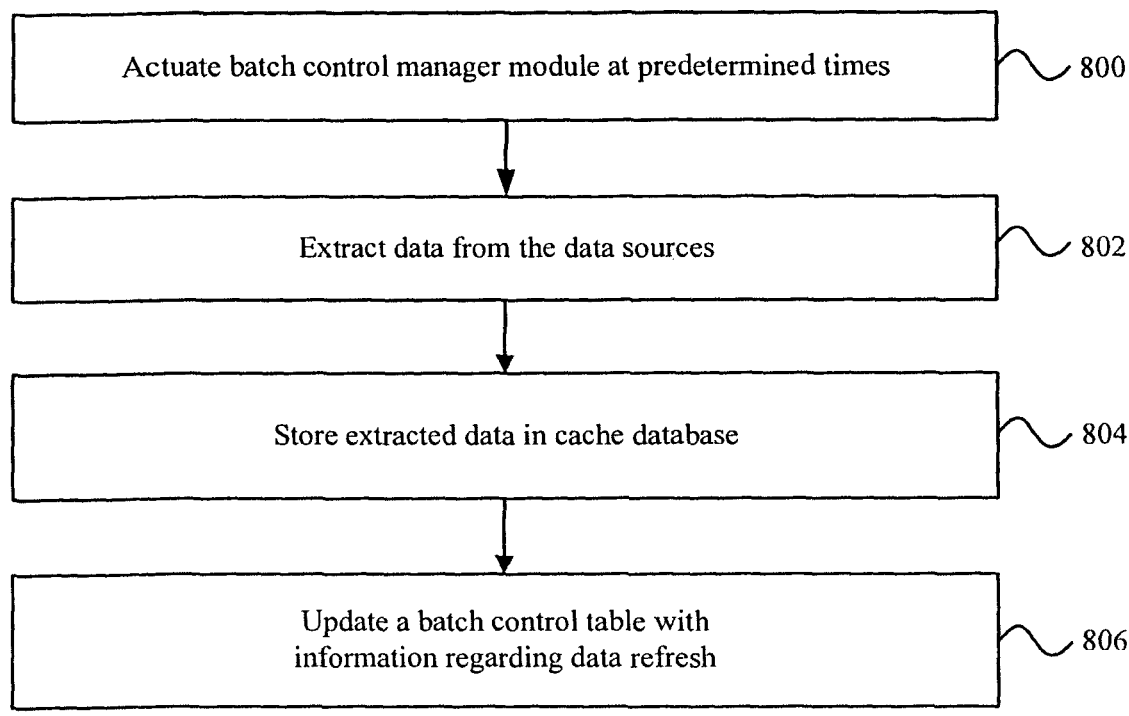
FIG. 19 is a flow chart illustrating steps carried out by the batch control manager module to refresh data in a cache database.

The cache database 94 is provided to shadow traffic-sensitive data sources and can be accessed by the data access service module 90. In this way, it is be possible to avoid having to connect to the live data sources and experience excessive wait times due to network volumes. The batch control manager module 96 operates to periodically refresh and populate the cache database 94 to ensure the data remains fresh or current. FIG. 19 shows the sequence of steps carried out by the batch control manager module 96 to refresh data in a cache database. The batch control manager module 96 is actuated at predetermined times (at step 800). It extracts data from the data sources 32, 33 or 34 (as the case may be) (at step 802) and stores the extracted data in the cache database 94 (at step 804). Thereafter, a batch control table is updated with information regarding the data refresh, for example, the date/time of the last refresh and the status if the refresh (at step 806). In alternative embodiments, the system could be configured so that the data would be pushed into the cache database by the data provider.

The heart beat service module 92 (in cooperation with the heart beat service module 74 of the data manager server 28) is responsible for coordinating the implementation of the heart beat strategy used by the data manager server 28 to select the best-suited (i.e. most appropriate/available) data connector servers 30 to handle the service requests. When a heart beat-type message is received at data connector server 30, it is ultimately routed to the heart beat service module 92. The module 92 will call upon the heart beat manager module 124 of the engine framework 44c to update the statistics database 126 with information obtained from the incoming message and to generate a reply message to be communicated to the data manager sever 28.

Figure 5:
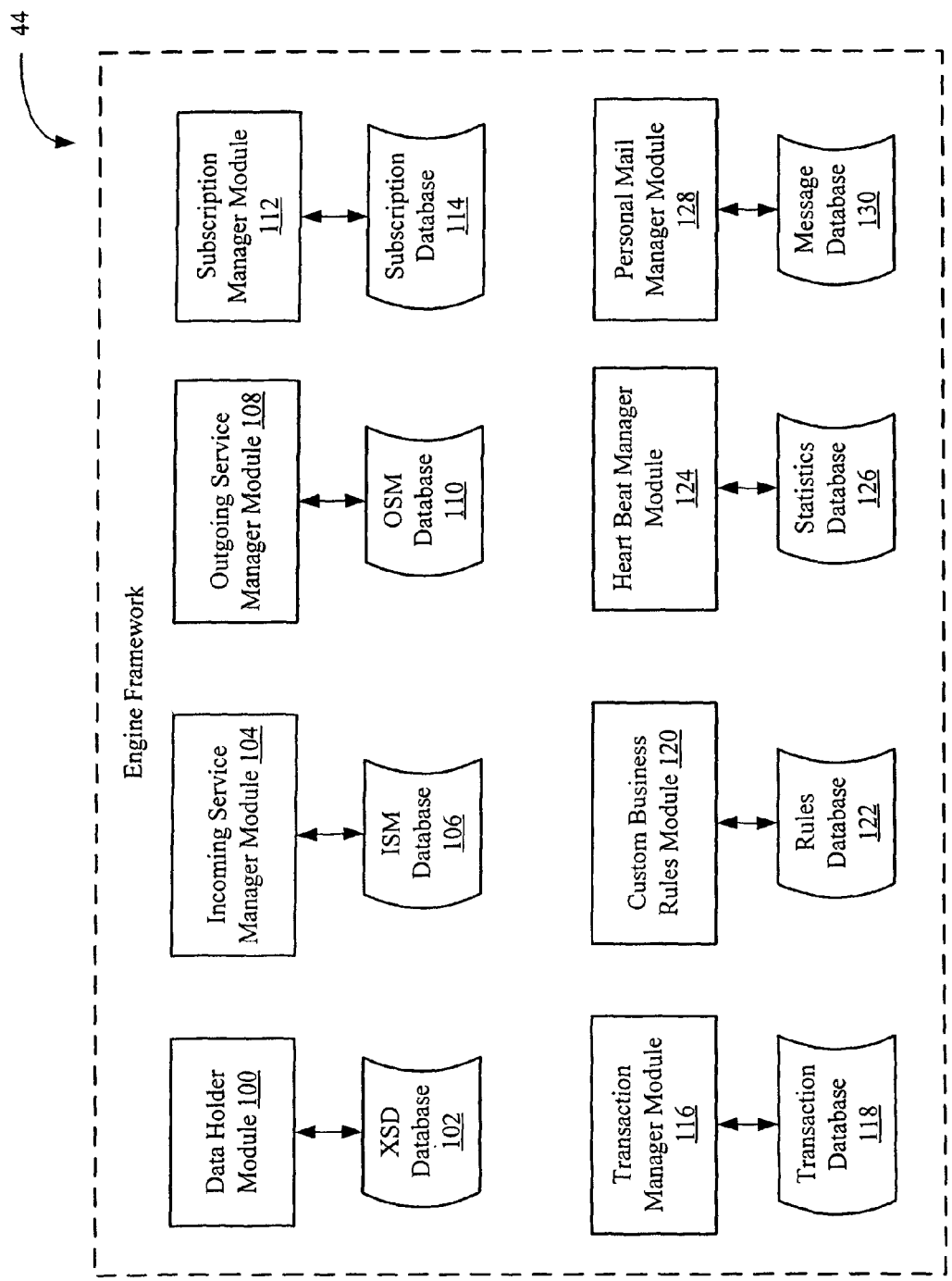
FIG. 5 is a block diagram showing components of a representative engine framework in accordance with an embodiment of the invention.

Referring now to FIG. 5, a representative engine framework 44 includes: a data holder module 100 and its associated XSD database 102; an incoming service manager (ISM) module 104 and its associated ISM database 106; an outgoing service manager (OSM) module 104 and its associated OSM database 106; a subscription manager module 112 and its associated subscription database 114; a transaction manager module 116 and its associated transaction database 118; a custom business rules module 120 and its associated rules database 122; a heart beat manager module 124 and its associated statistics database 126; and a personal mail manager module 128 and its associated message database 130. While the elements 102, 106, 110, 114, 118, 122, 126 and 130 are identified as being databases, it will be appreciated that these elements need not be databases. They could be data tables.

Each of the engine frameworks 44a, 44b and 44c possesses modules 100, 104, 108, 112, 116, 120, 124 and 128 and their associated databases 102, 106, 110, 114, 118, 122, 126 and 130. However, some of these modules may be disabled in one or more of the engine frameworks. More specifically, the subscription manager module 112, the subscription database 114, the transaction manager module 116 and the transaction database 118 are disabled in the engine framework 44a of the customer connector server 22. Similarly, the outgoing service manager module 108, the OSM database 110, the subscription manager module 112, the subscription database 114, the transaction manager module 116, the transaction database 118, the custom business rules module 120 and the rules database 122 are disabled in the engine framework 44c of the data connector server 30.

The data holder module 100 is configured to create data holders for the input and output data contained in the requests received at the servers 22, 28 and 30. The XSD database 102 stores the schema for these data holders. The appropriate schema for the input and output data holders is determined by the incoming service manager module 104 based on the incoming service identifier contained in the header of the request. More specifically, the incoming service manager module 104 will be called upon to retrieve from the ISM database 106 for the name of the XSD file, which contains the definition of the schema, for a particular incoming service identifier. The incoming service manager module 104 is also tasked with retrieving from the ISM database 106 the outgoing service identifiers associated with the incoming service identifier.

The outgoing service manager module 108 is responsible for retrieving from the OSM database 110 information about the service providers available to perform the required services. In the engine framework 44a of the customer connector server, the module 108 will retrieve information relating to the data manager servers 28 available for the required services based on the outgoing service identifier contained in the data context. Such information may include information regarding activeness of each data manager server 28 (i.e. whether the data manager server is on-line or off-line), the geographic or network proximity and location information (e.g. URL or IP address) for each data manager server 28. In the engine framework 44b of the data manager server 30, the information retrieved pertains to the data connector servers 30 available for the required services. Data manager servers 28 and data connector servers 30 may be added or removed from the network by amending the OSM databases 110 of the engine frameworks 44a and 44b accordingly. As a result, it is possible to take a data connector server off-line for maintenance or put another data connector server on-line for increased processing power, all with no significant system interruptions.

As the name suggests, the subscription manager module 112 can be used to manage, for each customer account, the subscriptions to the various verification services offered by the identity verification system 20. Using the subscription manager module 112, the account manager can select which services to subscribe to, and can decide how much credit to allot to such subscriptions. The subscription manager module 112 can also be configured to aggregate customer usage information and available credit and to make this information available to the customer account manager as part of its reporting function. Customer account information is stored on the subscription database 114 and is accessible by the subscription manager module 112. The transaction manager module 116 permits an account manager or an authorized user to retrieve from the transaction database 118 and view, the transaction history for a particular account, for instance, the services purchased and the credits spent in payment of such services. In this embodiment, the modules 112 and 116 and the databases 114 and 118 are enabled only in the engine framework 44b of the data manager server 30.

As previously mentioned, the custom business rules module 120 will be called upon by the customer connector server 22 or data manager server 28 to search in the rules database 122 for any rules defined for an outgoing service identifier. If such custom rules do apply to an outgoing service identifier, the custom business rules module 120 will load the data from the incoming and out data holders into the appropriate outbound data holders in accordance with such custom rules.

As previously mentioned, the heart beat manager module 124 will be called upon by the heart beat service module 60, 74 or 92 (as the case may be), in some cases to update the statistics database 126 with information contained in an incoming message and in other cases to generate a reply (heart beat-type) message.

The personal mail manager (PMM) module 128 manages internal e-mail communications within the identity verification system 20. The PMM module 128 can be used to send e-mails to, and receive e-mails from authorized users, account managers or system administrators. The system e-mails are stored on the message database 130.

Figure 6:
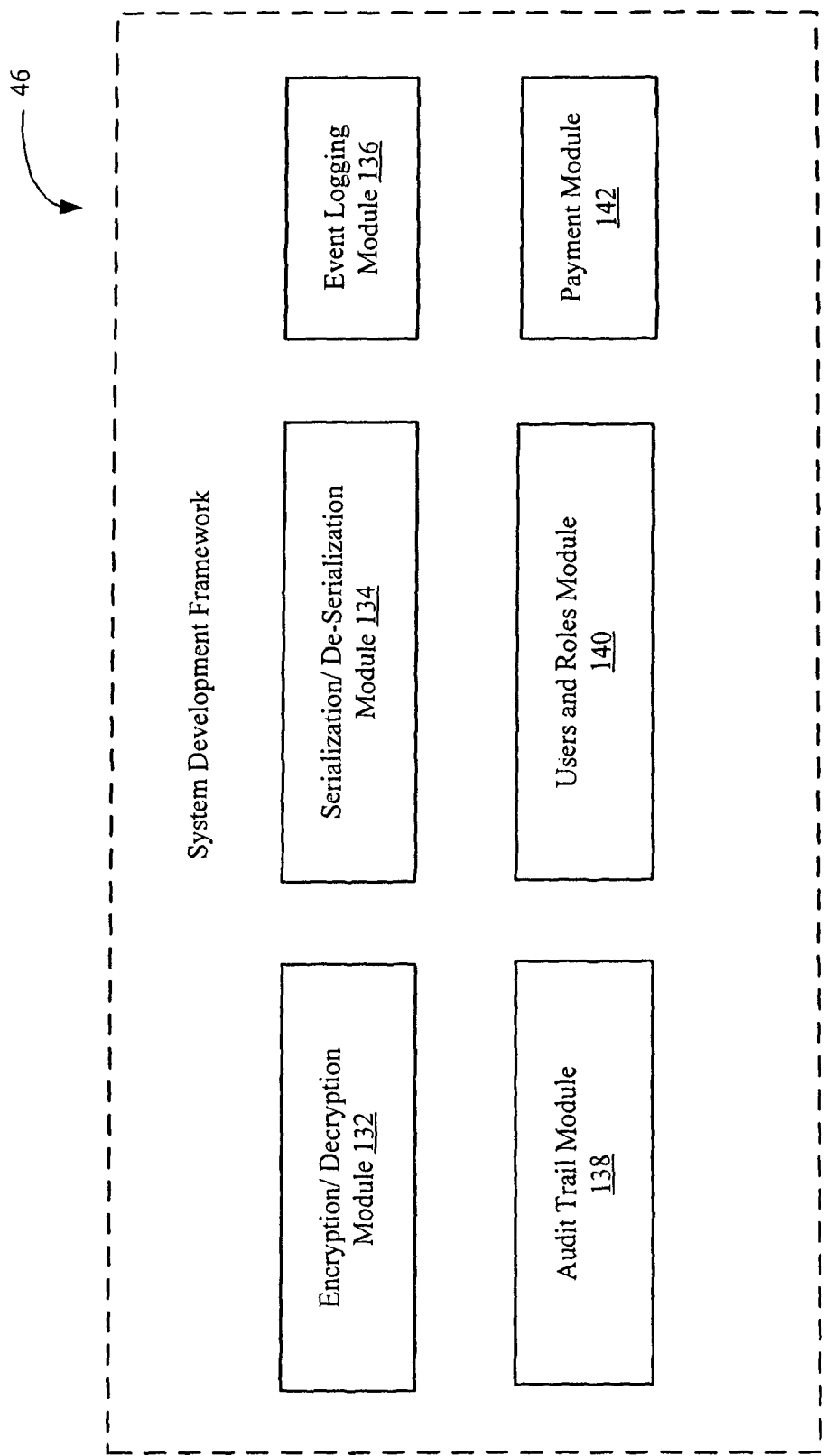
FIG. 6 is a block diagram showing components of a representative system development framework in accordance with an embodiment of the invention.

Referring now to FIG. 6, a representative system development framework 46 includes: an encryption/decryption module 132, a serialization/de-serialization module 134, an event logging module 136, an audit trail module 138, an users and roles module 140 and a payment module 142. Each of the system development frameworks 46a, 46b and 46c possesses modules 132, 134, 136, 138, 140 and 142. However, some of these modules may be disabled in one or more of the system development frameworks. In the preferred embodiment, the payment module 142 is disabled in the system development frameworks 46a and 46c of the customer connector server 22 and data connector server 30, respectively.

The encryption/decryption module 132 will be called upon to decrypt incoming messages received at the server 22, 28 or 30 and encrypt outbound messages sent out from the server 22, 28 or 30. Similarly, the serialization/de-serialization 134 will be called upon to de-serialize incoming messages received at the server 22, 28 or 30 and serialize outbound messages sent out from the server 22, 28 or 30.

The event logging module 136 is tasked with keeping a detailed record or log of all actions and events which occur within the servers 22, 28 or 30 (as the case may be). This functionality may be used by the system administrator to identify and locate the source of any system errors.

The audit trail module 138 permits real-time tracking of a request for identity verification and any response thereto as they are being processed by the system 20. This functionality can be used to track or monitor the services performed by each of the servers 22, 28 and 30.

The users and roles module 140 allows the system administrator or customer account manager to grant permissions (or certain access rights to the system and its resources), to certain authorized users, based on the role of such users.

The payment module 142 provides a gateway to a credit card processor. The payment module 142 allows an account manager or authorized user to add credit to a customer account or pay for services offered by the system 20 using a credit card. In other embodiments, the payment module could provide a gateway to other types of payment processors. In this embodiment, the payment module is enabled only on the system development framework 44b of the data manager server 28.

Figure 7:
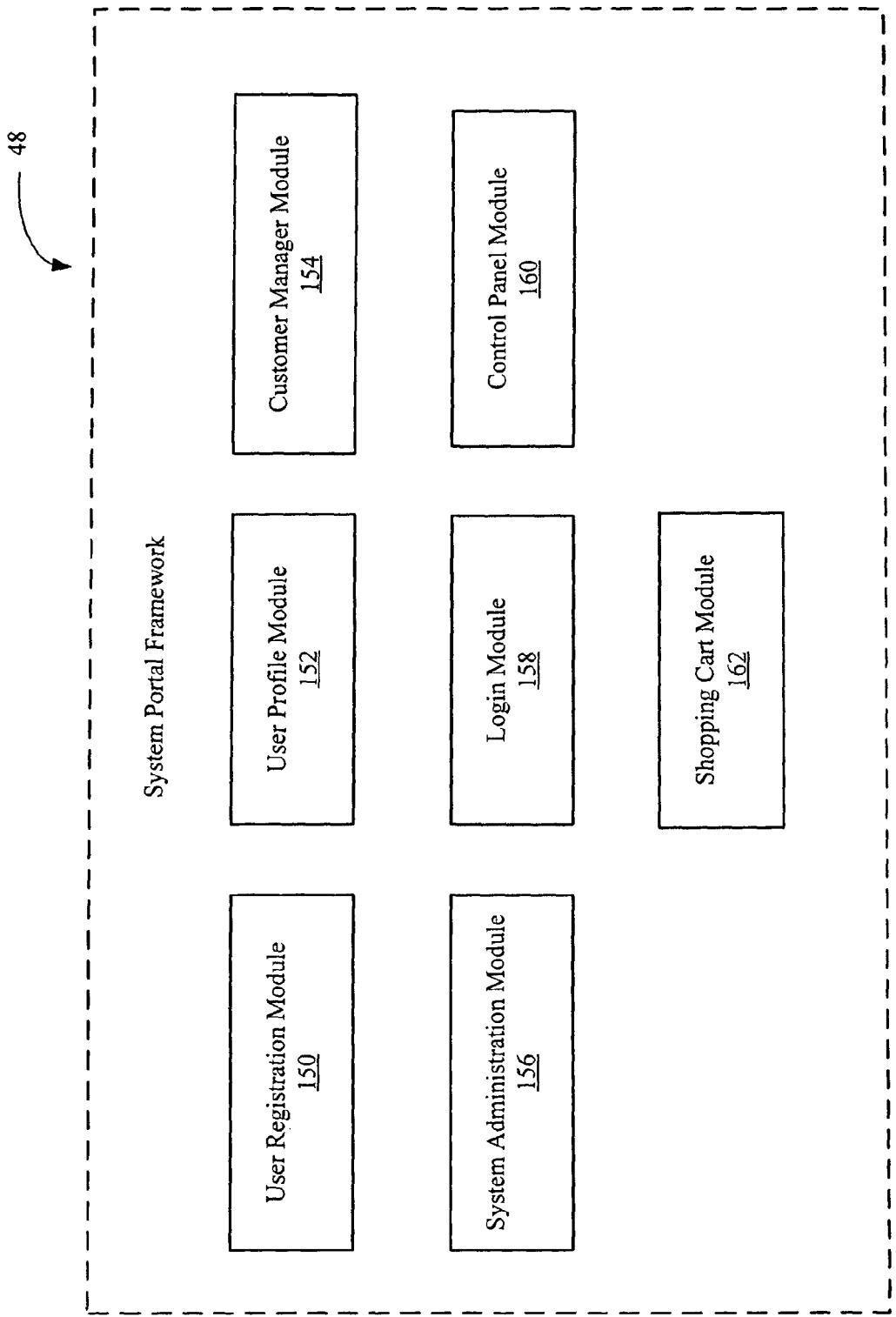
FIG. 7 is a block diagram showing components of a representative system portal framework in accordance with an embodiment of the invention.

Referring now to FIG. 7, a representative system portal framework 48 includes: a user registration module 150; a user profile 152; a customer manager module 154; a system administration module 156; a login module 158; a control panel module 160; and a shopping cart module 162. Each of the system portal frameworks 48a, 48b and 48c possesses modules 150, 152, 154, 156, 158, 160 and 162. However, some of these modules may be disabled in one or more of the system development frameworks. In the preferred embodiment, the shopping cart module 162 is disabled in the system portal frameworks 48a and 48c of the customer connector server 22 and data connector server 30, respectively.

The user registration module 150 permits new users to be registered on the identity verification system 20. The user profile module 152 may be used by the system administrator or the customer account manager to create a profile for each of the authorized users. Such profile may include information about the user, such as his/her name, his/her employer's name, his/her e-mail address or other contact information, his/her role within the organization, etc.

The customer manager module 154 allows the customer account manager to approve new users on an account and add or remove users on the account. This module can also be employed to create particular classes of users and to set certain allowable usage limits for such classes of users. These usage limits could take the form of a cap on the number of times a specific service can be requested by a user in the class or on a maximum value of services (or available credit) per user in the class.

The system administration module 156 can be used by the master administrator for the system 20 to create new customer accounts and appoint customer account managers for new and existing customer accounts.

The login module 158 allows users to login into the system 20. When actuated, the login module 158 will prompt a user for his/her username and password. If the username and password provided by the user matches the username and password on file, the user will be granted access to the system 20 and at least some of its resources. The login module 158 will also be called upon by the servers 22, 28 and 30 to authenticate the source of a request received by such servers.

The control panel module 160 allows the system administrator to manage the listing of services offered on the system 20. Using the control panel module 160, the system administrator may make certain services available on the system 20 or de-activate other services. The shopping cart module 162 presents to the user a listing of services available based on the subscription on the account and the role of the user and the permissions afforded to him/her.

An example of the implementation of the identity verification system 20 and methods therefor is described below. Referring now to FIGS. 8a and 8b, a customer system 24 imitates a request for verification of an individual's identity and transmits the request to the customer connector server 22 (at step 170). The request is encrypted and includes header, input data and output data tables represented as serialized header, input and output xml strings. The header data table will contain, inter alia, an incoming service identifier which identifies the verification service sought by the customer system 24. The schema for the input data table is defined by an XSD file supplied by the system and is based on the verification service requested. The input data will contain identification information obtained from the individual whose identity is to be verified. Such information may include the individual's name, address, date of birth, social security or social insurance number, etc. Of course, other types of information may also be included such as biometric information (e.g. retina scans fingerprints, voiceprints or the like).

The request further includes the credentials of the customer system 24 (i.e. username and password) to allow the customer system 24 to be authenticated. The username and password are passed along as clear text strings, however because Secure Sockets Layer (SSL) is used, they are not visible during transport to the customer connector server 22.

The customer connector server 22 receives the request and performs at the customer service connector server 22 a series of request processing steps (at step 180). This series of processing steps is now described with reference to FIGS. 9a to 9h and 10. The request from the customer system 24 is received at the communication service module 50 of the customer connector server 22 (at step 240). The request is transmitted from the communication service module 50 to the main process manager module 52 (at step 242) and subsequently, from the main process manager module 52 to the request handler module 54 (at step 244). The request handler module 54 calls upon the login module 158 of the system portal framework 48a to authenticate the source of the request based on the username and password contained in the request (at step 246). The login module 158 determines whether the request is authenticated (at step 248). If the request is not authenticated (because there is no match on file for the username and password provided), then the request handler module 54 calls upon the encryption/decryption module 132 and the serialization/de-serialization module 134 of the system development framework 46a to decrypt and de-serialize the header xml string and update the header with an error message indicating that the system has failed to authenticate the request (at step 250). The request handler module 54 then transmits the request to the main process manager module 52 which in turn passes it to the communication service module 50 (at step 252). The communication service module 50 then transmits the request to the customer system thereby advising that the identification transaction could not be completed as a result of an authentication failure (at step 254).

Figure 9A:
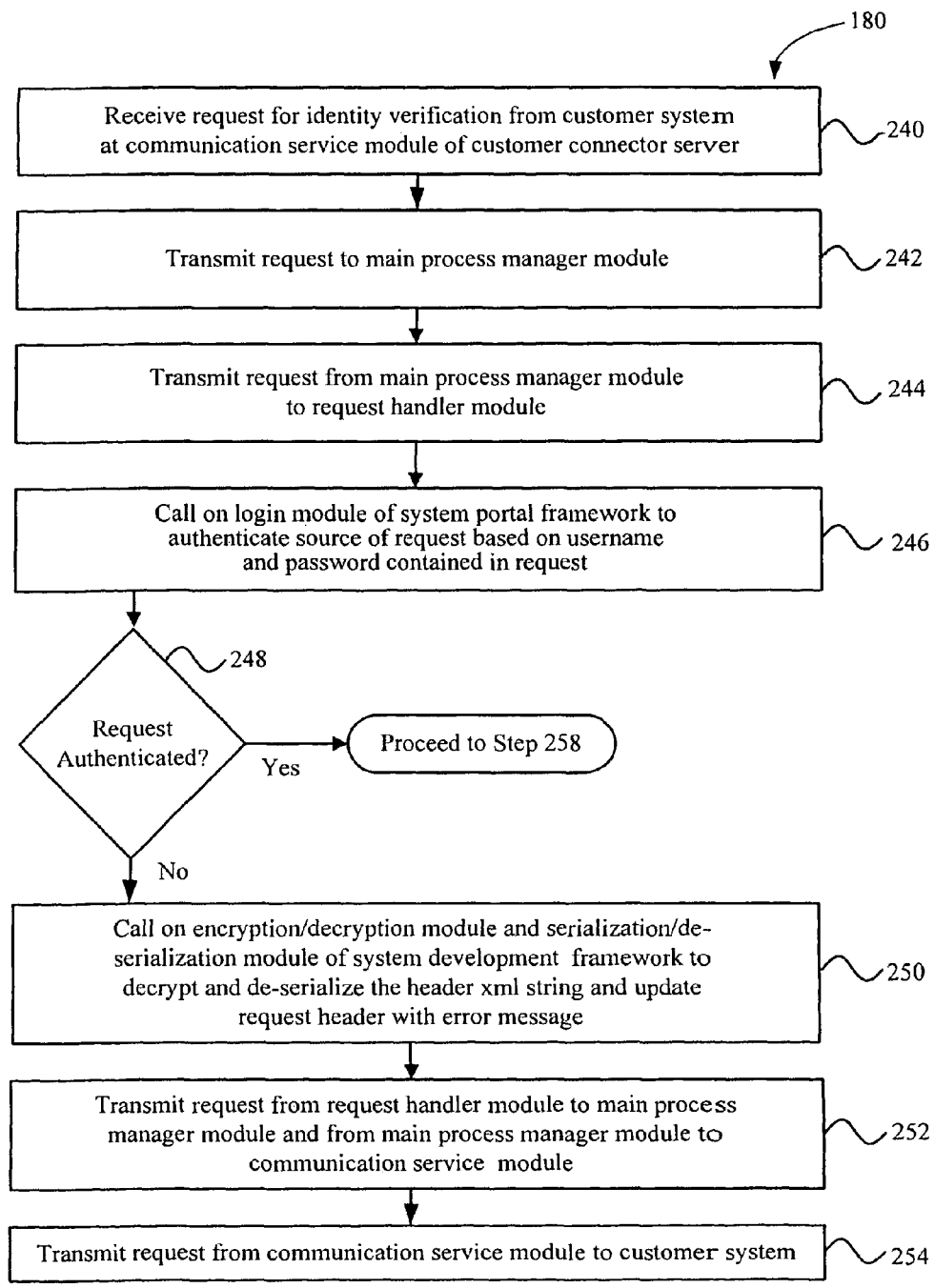
FIGS. 9a to 9h together form a flowchart illustrating the steps carried out by the customer connector server for processing a request for identity verification, in accordance with an embodiment of the invention.
Figure 9B:
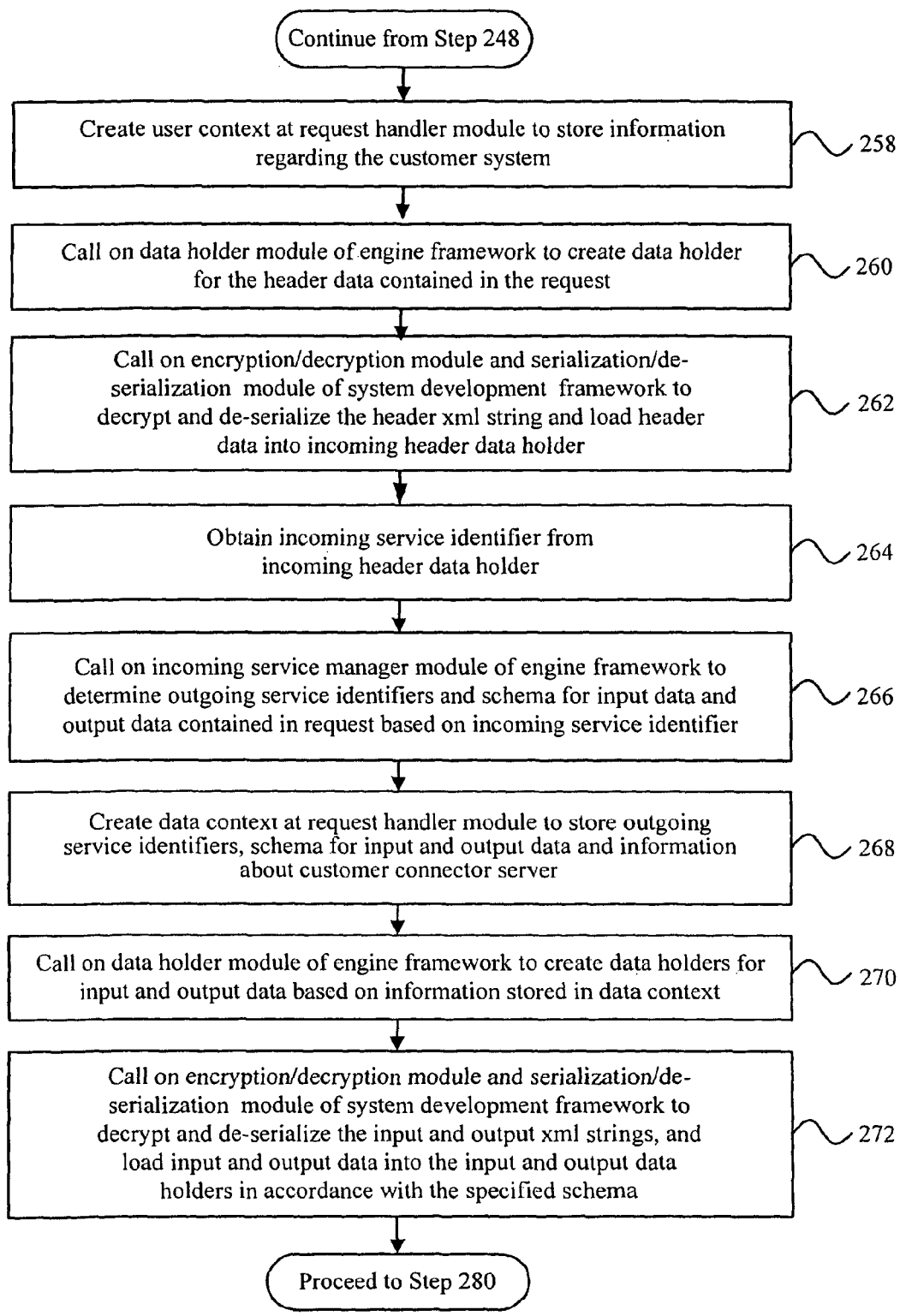

With reference to FIG. 9b, if the request is authenticated (i.e. the username and password provided match those on file), the request handler module 54 will create a user context to store information about the customer system (at step 258). The request handler module 54 will then call on the data holder module 100 of the engine framework 44a to create a data holder for the header data contained in the request (at step 260). The request handler module 54 will then call on the encryption/decryption module 132 and the serialization/de-serialization module 134 of system development framework 46a to decrypt and de-serialize the header xml string and load the header data into the incoming header data holder (at step 262). The request handler module 54 will inspect the incoming header data holder and obtain the incoming service identifier (at step 264). Preferably, the incoming service identifier is a generic identifier. For example, for a verification of the date of birth and the driver's license number for an individual, the incoming service identifier could be ABC_0001. From its face, the verification services sought may not necessarily be identifiable. This, however, may not be the case in other embodiments.

Having obtained the incoming service identifier, the request handler module 54 calls on the incoming service manager module 104 of engine framework 44a to determine the outgoing service identifiers and schema for the input data and output data contained in request based on incoming service identifier (at step 266). More specifically, the incoming service manager module 104 retrieves from the ISM database 106 the name of the XSD file, which contains the definition of the schema, for a particular incoming service, and the outgoing service identifiers associated with the incoming service identifier. For example, there may be two outgoing service identifiers for the incoming service identifier ABC_0001— one representing the service for date of birth verification and the other representing the service for the driver's license number verification. Of course, the incoming service identifier could have a greater number of outgoing service identifiers associated with it.

The request handler module 54 then creates a data context to store the outgoing service identifiers, the XSD files name defining the schema for the input and output data and information about customer connector server 22 (at step 268). Subsequently, the data holder module 100 of the engine framework 44a is called upon to create the data holders for the input and output data based on information stored in data context (at step 270). More specifically, the data holder module 100 retrieves from the XSD database 102 the XSD file identified in the data context. Thereafter, the request handler module 54 calls upon the encryption/decryption module 132 and serialization/de-serialization module 134 of system development framework 46a to decrypt and de-serialize the input and output xml strings. The module 54 then loads the input and the output data into the input and output data holders in accordance with the specified schema (at step 272).

Figure 9C:
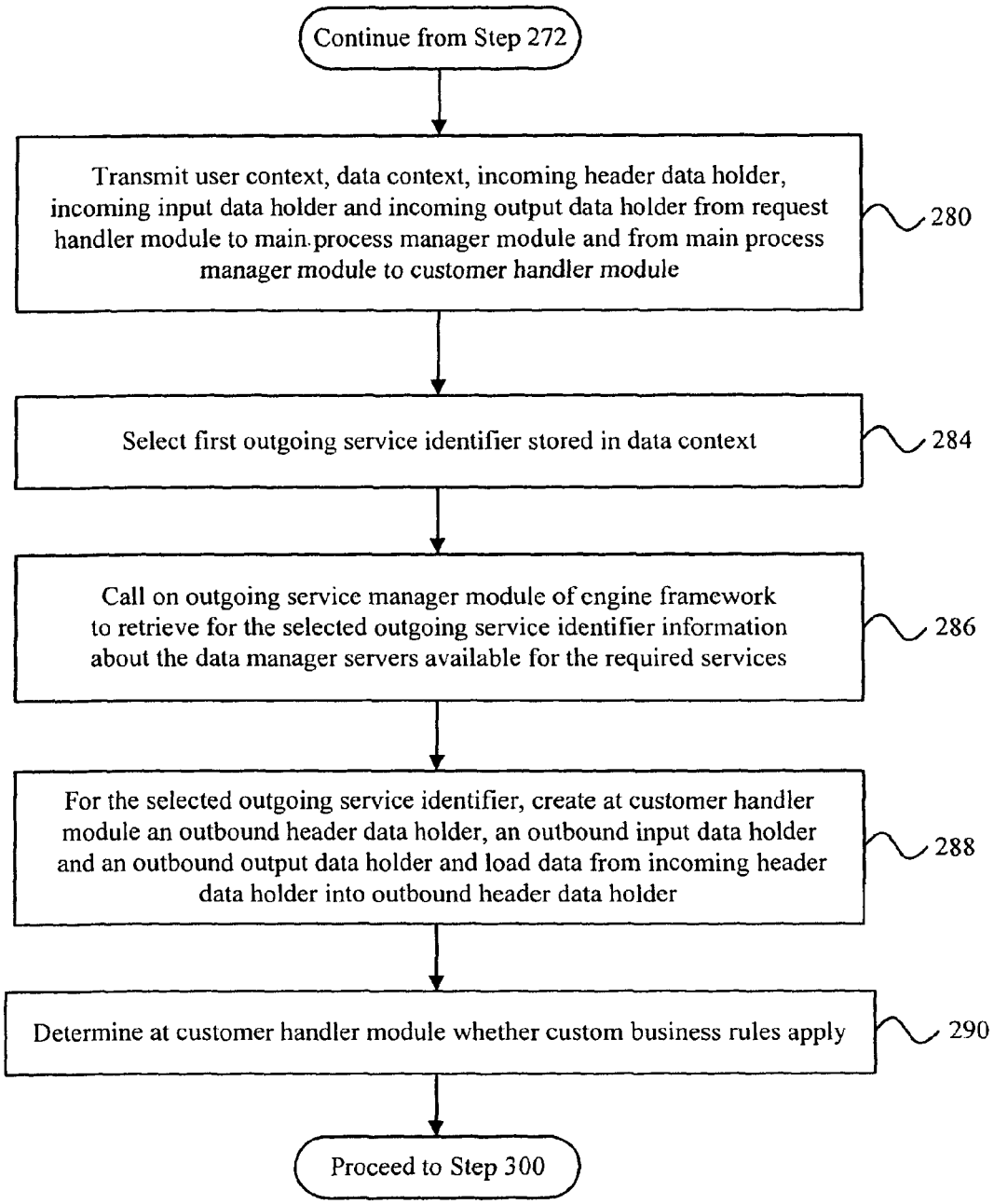

With reference to FIG. 9c, the user context, the data context, the incoming header data holder, the incoming input data holder and the incoming output data holder are transmitted from the request handler module 54 to the main process manager module 52 and next from the main process manager module 52 to the customer handler module 56 (at step 280). The customer handler module 56 selects the first outgoing service identifier stored in the data context (step 284) and calls on the outgoing service manager module 108 of engine framework 44a to retrieve for the selected outgoing service identifier information about the data manager servers 28a, 28b and 28c available for the required services (at step 286). The module 108 retrieves this information from the OSM database 110. The customer handler module 56 creates for the selected outgoing service identifier an outbound header data holder, an outbound input data holder and an outbound output data holder and loads data from the incoming header data holder into outbound header data holder (at step 288). Thereafter, the customer handler module 56 determines whether custom business rules apply (at step 290) by verifying whether such rules are specified for this outgoing service identifier.

Figure 9D:
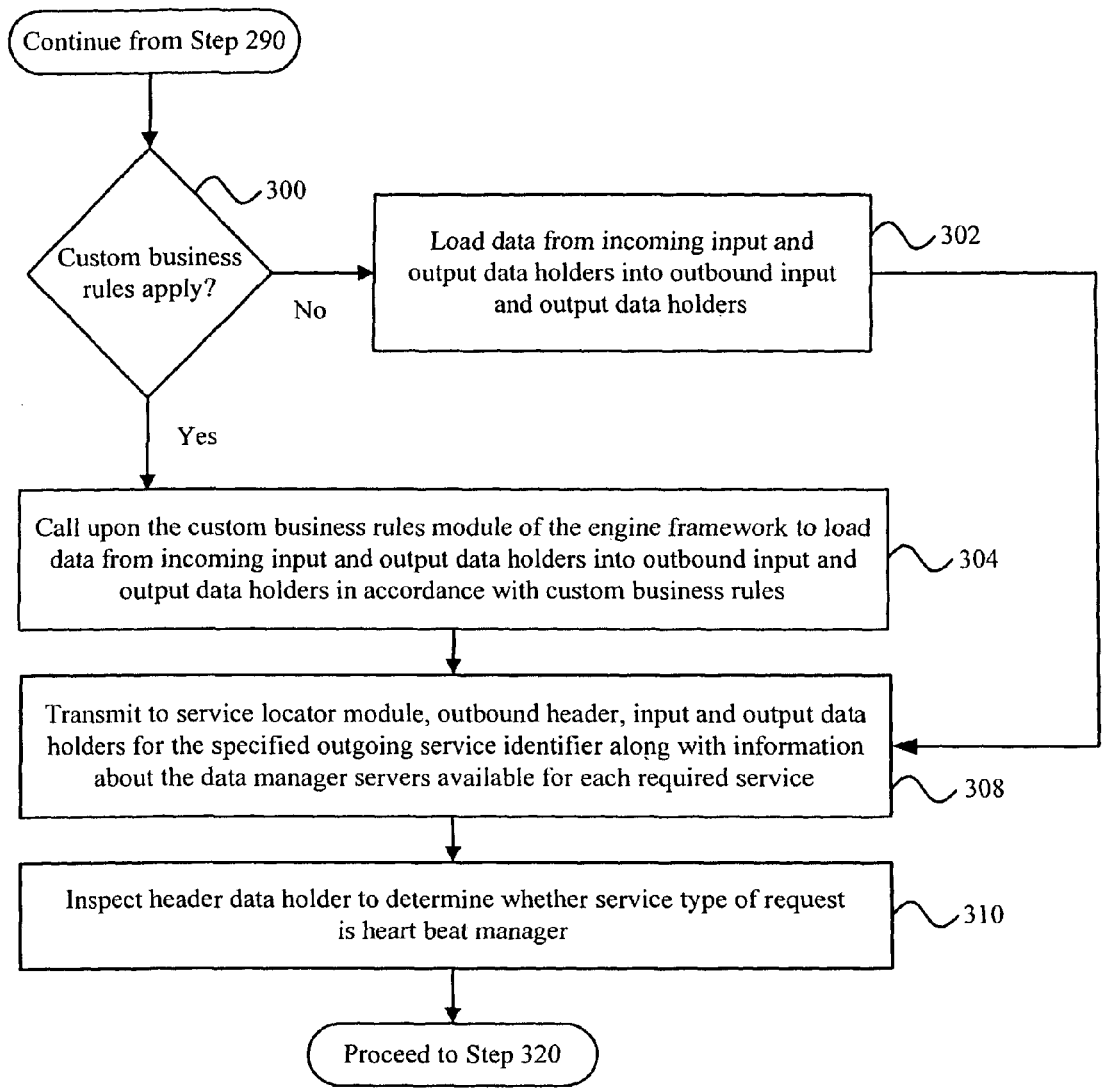
Figure 9E:
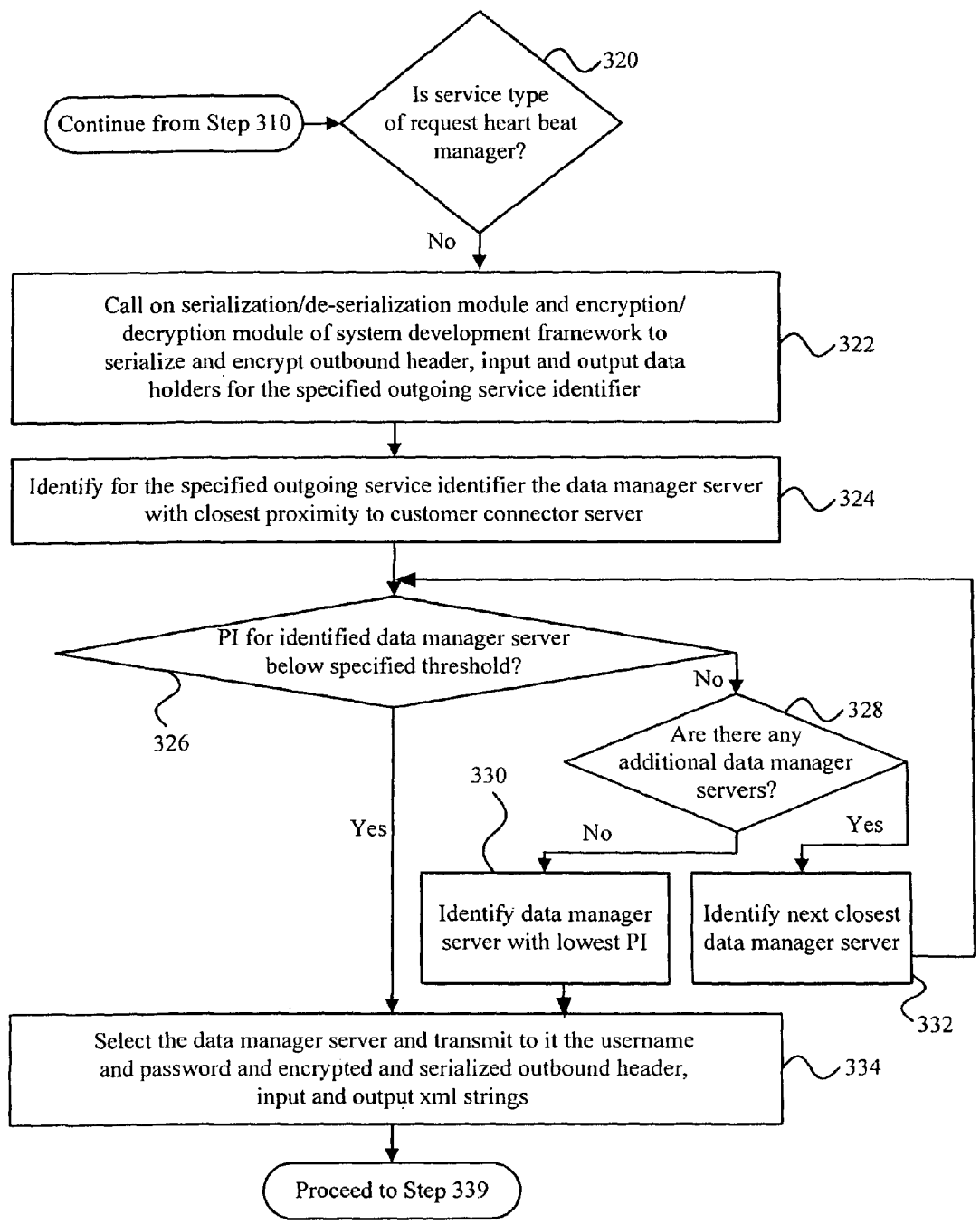

Referring now to FIG. 9d, if custom business rules are found to apply to this outgoing service identifier, the customer handler module 56 will call upon the custom business rules module 120 of the engine framework 44*a* to load the data from the incoming input and output data holders into the outbound input and output data holders in accordance with the custom business rules (at step 304). The module 120 retrieves the applicable custom business rules from the rules database 122. If no custom business rules are found to be applicable for this outgoing service identifier (at step 300), then the customer handler module 56 loads the incoming input and output data holders into the outbound input and output data holders (at step 302).

Once the data has been loaded into the outbound input and output data holders, the outbound header, input and output data holders for the specified outgoing service identifier are transmitted to the service locator module 58 along with information about the data manager servers 28*a*, 28*b* and 28*c* available for each required service (at step 308). The service locator module 58 inspects the outbound header data holder to determine whether the service type of the request is heart beat manager (at step 310). Given that FIGS. 9*a* to 9*h* track the sequence of steps performed by the customer connector server 22 when in receipt of a request for identity verification, the service type of the request in this case will be found not to be heart beat manager (at step 320) (see FIG. 9*e*).

The service locator module 58 will call on the serialization/de-serialization module 134 and encryption/decryption module 132 of the system development framework 46*a* to serialize and encrypt the outbound header, input and output data holders for the specified outgoing service identifier (at step 322) and will identify for the specified outgoing service identifier the data manager server 28 with closest proximity to customer connector server 22, based on information provided to it by customer handler module 56 (at step 324). The performance index (PI) (a measure of the responsiveness/availability of the data manager server) for the identified data manager server is checked to see if it is below the specified threshold (at step 326). In this embodiment, the lower the performance index, the more responsive/available the data manager server is. The calculation of the performance index for a data manager server is described below in greater detail.

If the performance index (PI) is found not to be below the specified threshold, the service locator module 58 determines whether there are any additional data manager servers capable of performing the required services (at step 328). If there are additional data manager servers, the service locator module 58 identifies the next closest data manager server (at step 332) and returns to step 326. If, on the other hand, there are no additional data manager servers, then the service locator module 58 identifies the data manager server with the lowest performance index (PI) (at step 330). It will thus be appreciated that in this embodiment, having the data manager server 28 with the closest geographic proximity to the customer connector server 22 is given priority first over having a data manager server 28 with a performance index below a specified threshold. If none of the data manager servers have a performance index below the specified threshold, the system will look for the data manager server 28 with the lowest performance index. It should be appreciated that while this selection scheme is preferred, other selection schemes could also be used to equal advantage.

The service locator module 58 selects the data manager server 28 which meets the selection criteria (i.e. either the data manager server 28 which has a performance index (PI) that is below the specified threshold, or if none is found, then the data manager server with the lowest performance index (PI)) and transmits to it the username and password and the encrypted and serialized outbound header, input and output xml strings (at step 334).

Figure 9F:
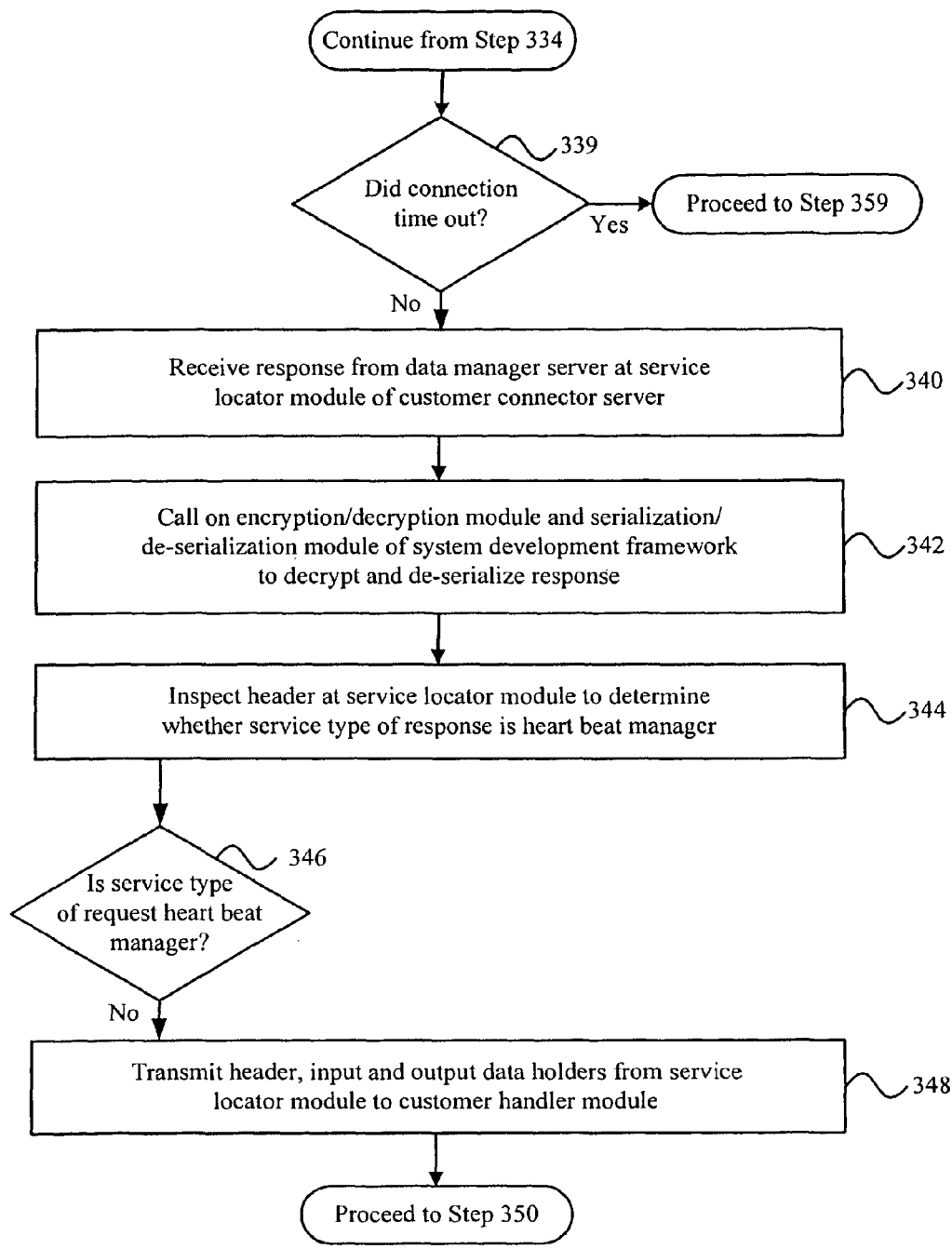

With reference to FIG. 9*f*, the service locator module 58 then waits to receive a response from the selected data manager server 28. If it is determined (at step 339) that no connection has been established between the customer connector server 22 and the selected data manager server 28 (i.e. the connection has timed out), then the customer connector server 22 proceeds to step 359 to initiate a retry logic for connecting to another data manager server 28 (see FIG. 10).

However, if it is determined (at step 339) that a connection has been established between the customer connector server 22 and the selected data manager server 28, the service locator module 58 of the customer connector server 22 receives a response from the selected data manager server 28 (at step 340). The service locator module 58 calls upon the encryption/decryption module 132 and the serialization/de-serialization module 134 of the system development framework 46*a* to decrypt and de-serialize the response (at step 342). The service locator module 58 then inspects the header of the response to determine whether the service type of response is heart beat manager (at step 344). Given that FIG. 9*f* tracks the sequence of steps performed by the customer connector server 22 when in receipt of a response to the service request transmitted by the data manager server 28, the service type of the request in this case will be found not to be heart beat manager (at step 346). The header, input and output data holders are then transmitted from the service locator module 58 to the customer handler module 56 (at step 348).

Figure 9G:
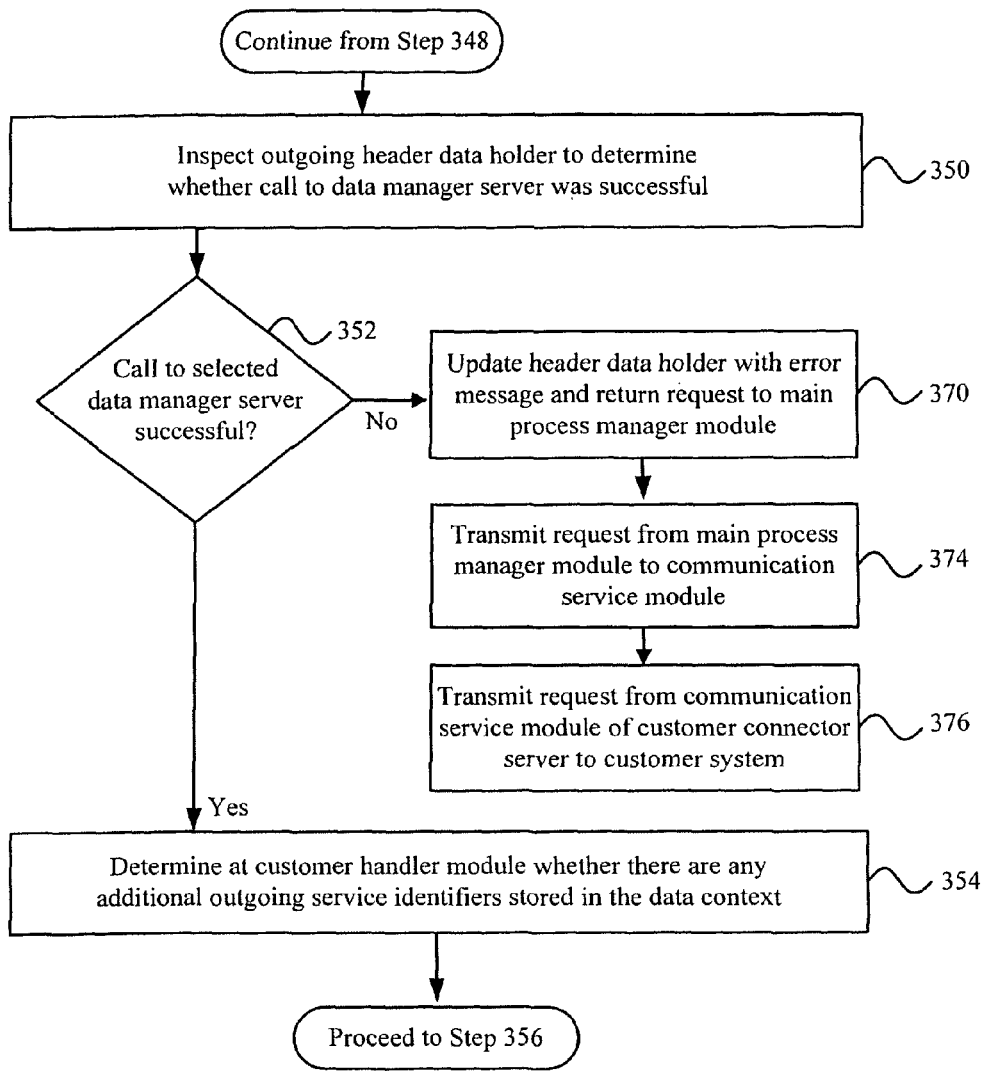

Referring now to FIG. 9*g*, the module 56 will inspect outgoing header data holder to determine whether call to data manager server was successful (at step 350). If the call is found not to be successful (at step 352), the customer handler module 56 updates the header data holder with an error message and returns the request to the main process manager module 52 (at step 370). The main process manager module 52 transmits the request to the communication service module 50 (at step 374) which in turn transmits it to the customer system 24 (at step 376).

Figure 9H:
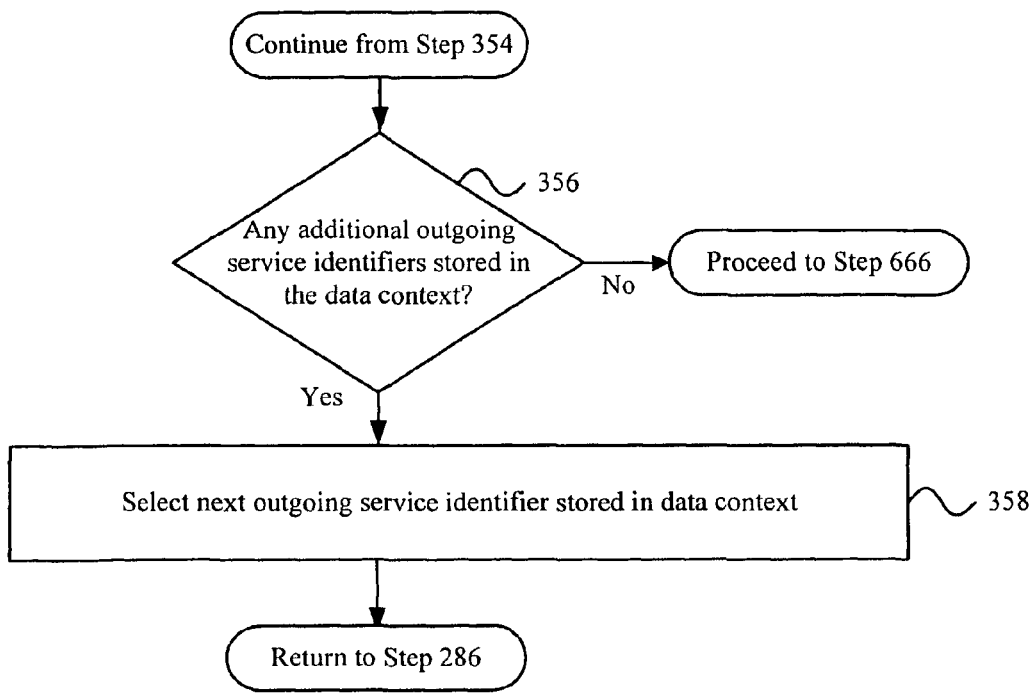

However, if the call to the data manager server 28 is found to be successful (at step 352), then the customer handler module 56 determines whether there are any additional outgoing service identifiers stored in the data context (at step 354). Referring to FIG. 9*h*, if a determination is made (at step 356) that there are no additional outgoing service identifiers stored in the data context, then the customer connector server proceeds to step 666 (shown in FIG. 14*c*) to complete its response processing steps. In the event, it is determined (at step 356) that there are additional outgoing service identifiers, then service locator module 58 selects the next outgoing service identifier stored in the data context (at step 358) and returns to step 286 (shown in FIG. 9*c*).

Figure 10:
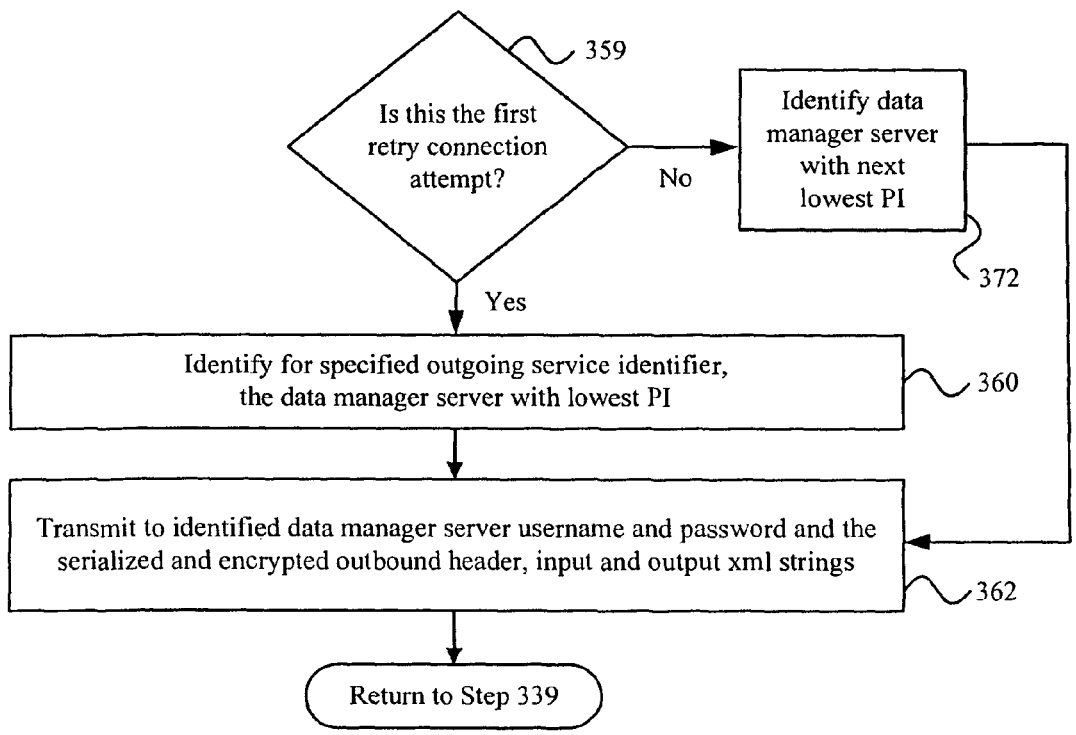
FIG. 10 illustrates the steps carried out by the customer connector server in the case where a call to the selected data manager server is unsuccessful, in accordance with an embodiment of the invention.

FIG. 10 shows the retry logic to be implemented by the customer connector server 22 in the case where the customer connector server 22 fails to connect with the selected data manager server 28. A determination is made as to whether this instance is the first retry connection attempt (at step 359). In the affirmative, the service locator module 58 identifies for the specified outgoing service identifier, the data manager server 28 with the lowest performance index (PI) (at step 360) and then transmits to the identified data manager server 28, the username and password and the encrypted and serialized outbound header, input and output xml strings (at step 362). Thereafter, the service locator module 58 waits to receive a response from the selected data manager server 28 and proceeds to step 339 shown in FIG. 9*f*.

In the event that it is determined (at step 359) that this instance is not a first retry connection attempt, then the service locator module 58 identifies for the specified outgoing service identifier, the data manager server 28 with the next lowest performance index (PI) (at step 372) and then transmits to the identified data manager server 28, the username and password and the encrypted and serialized outbound header, input and output xml strings (at step 362). Thereafter, the service locator module 58 waits to receive a response from the selected data manager server 28 and proceeds to step 339 shown in FIG. 9*f*.

As will be appreciated by a person skilled in the art, the retry logic shown in FIG. 10 allows the system 20 to manage faults and connection failures automatically without manual intervention.

The foregoing describes the submission of a request for identity verification via the customer connector server 22. However, as previously mentioned, such a request may be submitted to the system 20 through the business portal 23. This may be advantageous in cases where the user wishes to have the system 20 perform verification services, but a customer connector server has not yet been deployed. A request received from a business portal 23 is treated by a data manager server 28 in much the same as way as a request received from a customer connector server 22.

Figure 8A:
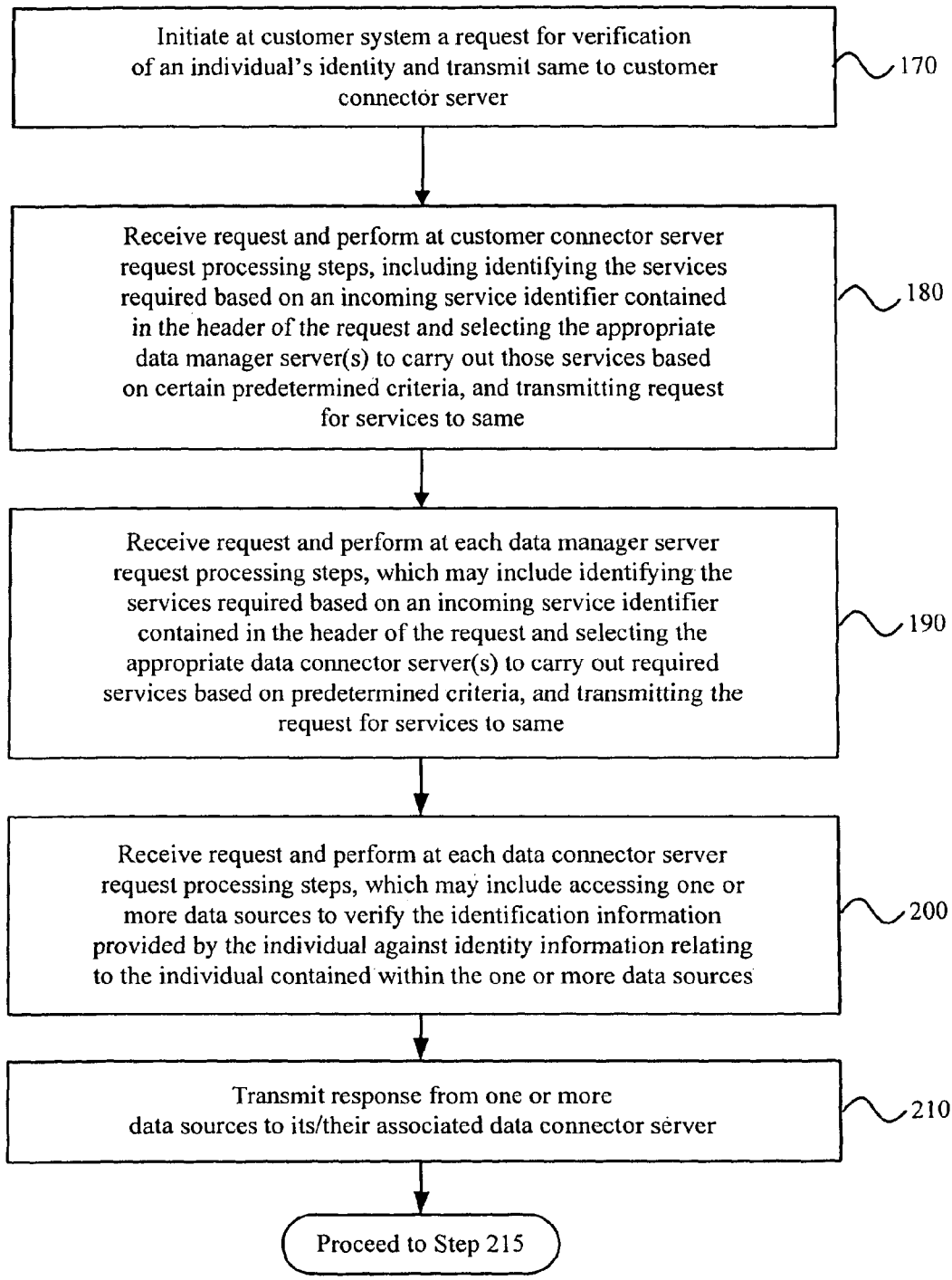
FIGS. 8a and 8b together form a flowchart illustrating an exemplary method for verifying an individual's identification, in accordance with an embodiment of the invention.
Figure 8B:
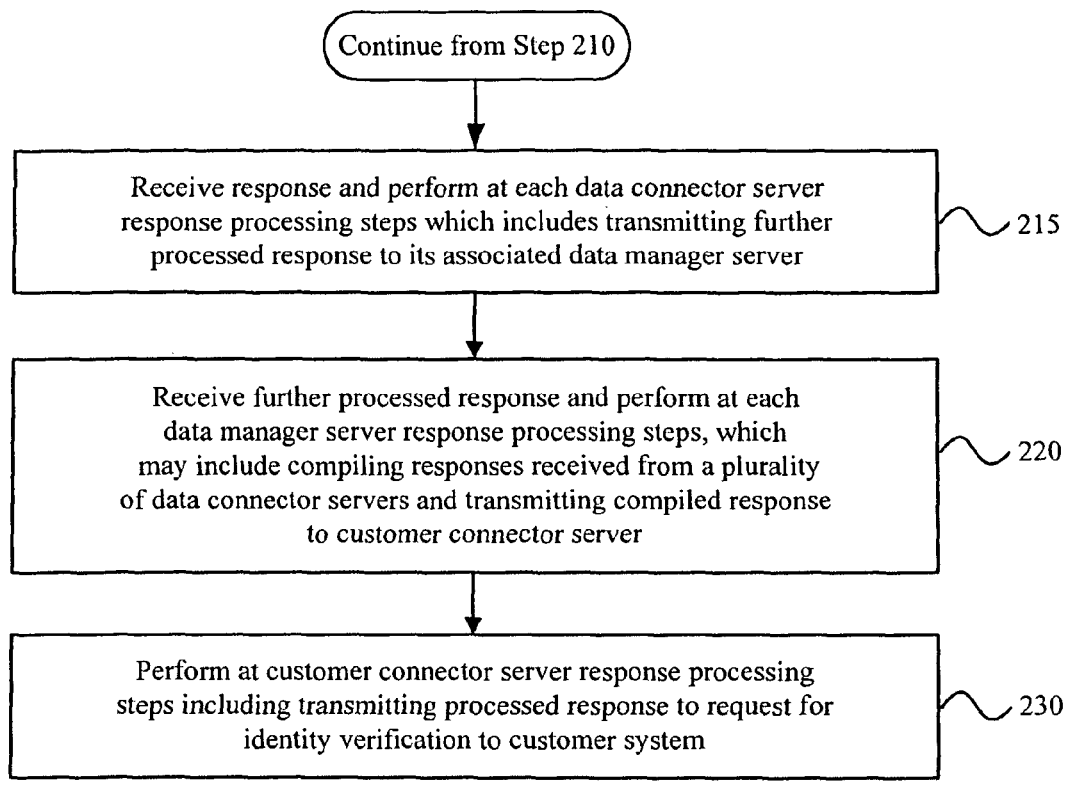

Once the username and password and the encrypted and serialized outbound header, input and output xml strings transmitted to the selected data manager server 28 at step 334 (see FIG. 9*e*) or step 362 (see FIG. 10) are received by the data manager server 28, the data manager server 28 performs a series of request processing steps (see step 190 shown in FIG. 8*a*). This series of processing steps is now described with reference to FIGS. 11*a* to 11*i* and 12. The request for service is received at the communication service module 64 of the data manager server 28*b* (at step 380). The request is transmitted from the communication service module 64 to the main process manager module 66 (at step 382) and subsequently, from the main process manager module 66 to the request handler module 68 (at step 384). The request handler module 66 calls upon the login module 158 of the system portal framework 48*b* to authenticate the source of the request based on the username and password contained in the request (at step 386). The login module 158 determines whether the request is authenticated (at step 388).

If the request is not authenticated (because there is no match on file for the username and password provided), then the request handler module 66 calls upon the encryption/decryption module 132 and the serialization/de-serialization module 134 of the system development framework 46*b* to decrypt and de-serialize the header xml string and update the header with an error message indicating that the system has failed to authenticate the request (at step 390). The request handler module 68 then transmits the request to the main process manager module 66 which in turn passes it to the communication service module 64 (at step 392). The communication service module 64 then transmits the request to the connector server system 22 thereby advising that the service transaction could not be completed as a result of an authentication failure (at step 394).

Figure 11A:
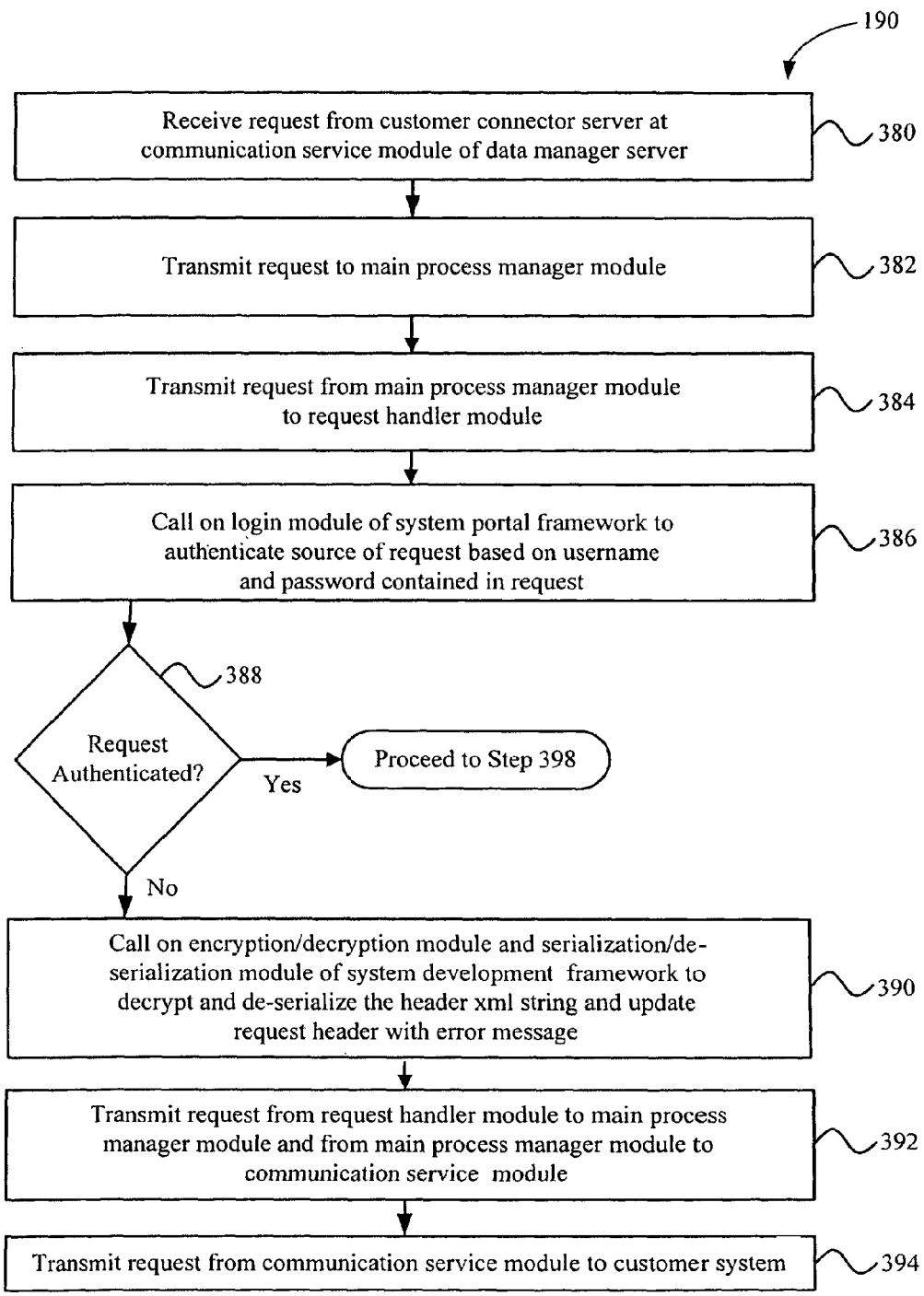
FIGS. 11a to 11i together form a flowchart illustrating the steps carried out by the data manager server for processing a request for service in accordance with an embodiment of the invention.
Figure 11B:
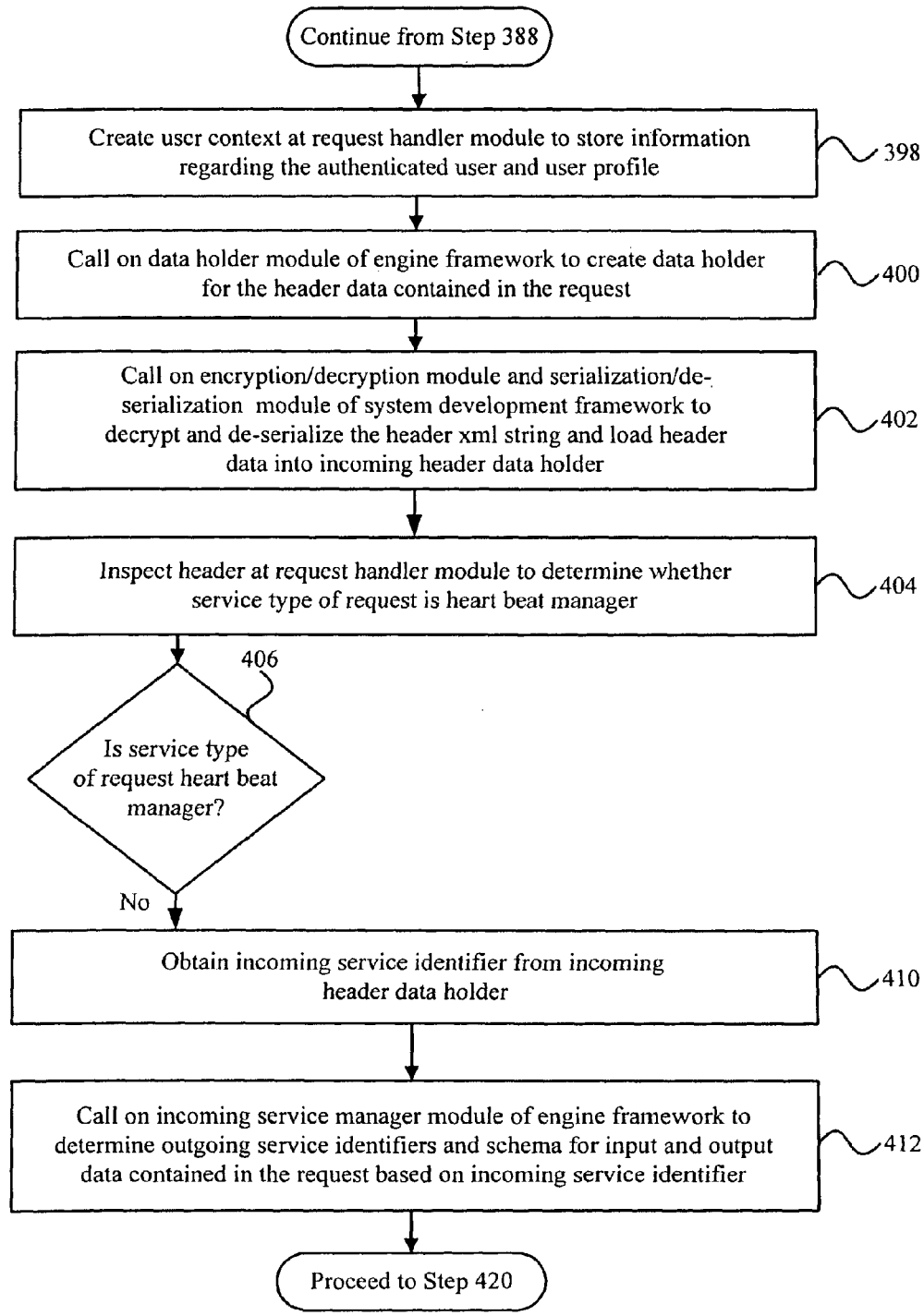

With reference to FIG. 11*b*, if the request is authenticated (i.e. the username and password provided match those on file), the request handler module 68 will create a user context to store information about the authenticated user and user profile (at step 398). The request handler module 66 will then call on the data holder module 100 of the engine framework 44*b* to create a data holder for the header data contained in the request (at step 400). The request handler module 66 will then call on the encryption/decryption module 132 and the serialization/de-serialization module 134 of system development framework 46*b* to decrypt and de-serialize the header xml string and load the header data into the incoming header data holder (at step 402). The request handler module 66 will then inspect the header data to determine whether the service type of the request is heart beat manager (at step 404). Given that FIGS. 11*a* to 11*i* track the sequence of steps performed by the data manager server 28*b* when in receipt of a request for service, the service type of the request in this case will be found not to be heart beat manager (at step 406).

The request handler module 68 will inspect the incoming header data holder and obtain the incoming service identifier (at step 410). Preferably, the incoming service identifier is a generic identifier. Having obtained the incoming service identifier, the request handler module 68 calls on the incoming service manager module 104 of engine framework 44*b* to determine the outgoing service identifiers and schema for the input data and output data contained in request based on incoming service identifier (at step 412). More specifically, the incoming service manager module 104 retrieves from the ISM database 106 the name of the XSD file, which contains the definition of the schema, for a particular incoming service, and the outgoing service identifiers associated with the incoming service identifier.

Figure 11C:
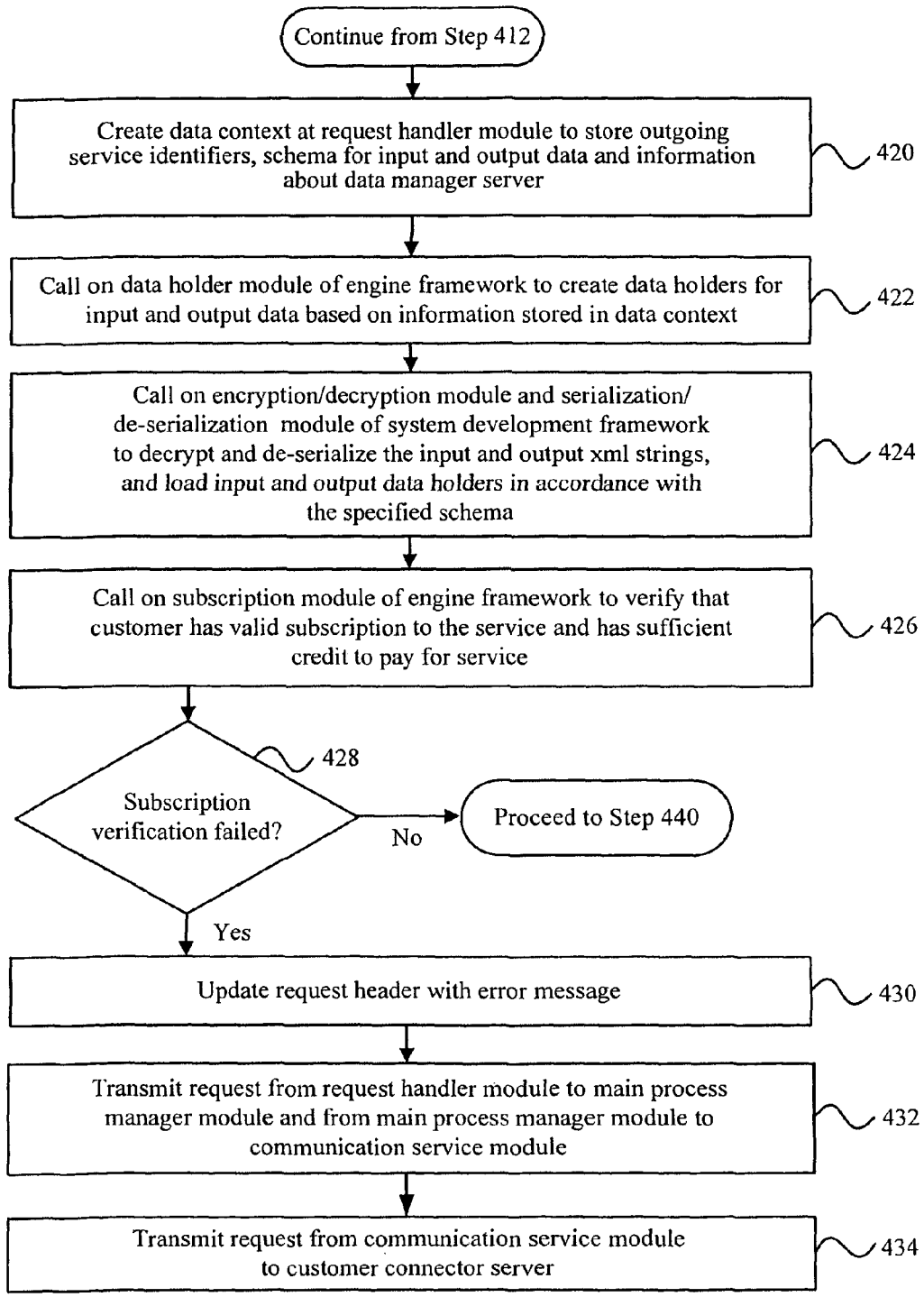

Referring now to FIG. 11*c*, the request handler module 68 then creates a data context to store the outgoing service identifiers, the XSD files name defining the schema for the input and output data and information about customer connector server 22 (at step 420). Subsequently, the data holder module 100 of the engine framework 44*b* is called upon to create the data holders for the input and output data based on information stored in data context (at step 422). More specifically, the data holder module 100 retrieves from the XSD database 102 the XSD file identified in the data context. Thereafter, the request handler module 68 calls upon the encryption/decryption module 132 and serialization/de-serialization module 134 of system development framework 46*b* to decrypt and de-serialize the input and output xml strings. The module 68 then loads the input and the output data into the input and output data holders in accordance with the specified schema (at step 424).

The subscription module 112 of the engine framework 44*b* is then called on to verify that the customer account has a valid subscription to the service requested and has sufficient credit to pay for the service (at step 426). The subscription module 112 will retrieve from the subscription database 114 the relevant information about the customer account. If the subscription verification is found to have failed (at step 428), the request handler module 68 will update the header with an error message (at step 430). The request will then be transmitted from the request handler module 68 to main process manager module 66 and from the main process manager module 66 to the communication service module 64 (at step 432). The communication service module 64 will then route the request to the customer connector server 22, thereby advising the user that the service transaction could not be completed as a result of a subscription failure (at step 434).

Figure 11D:
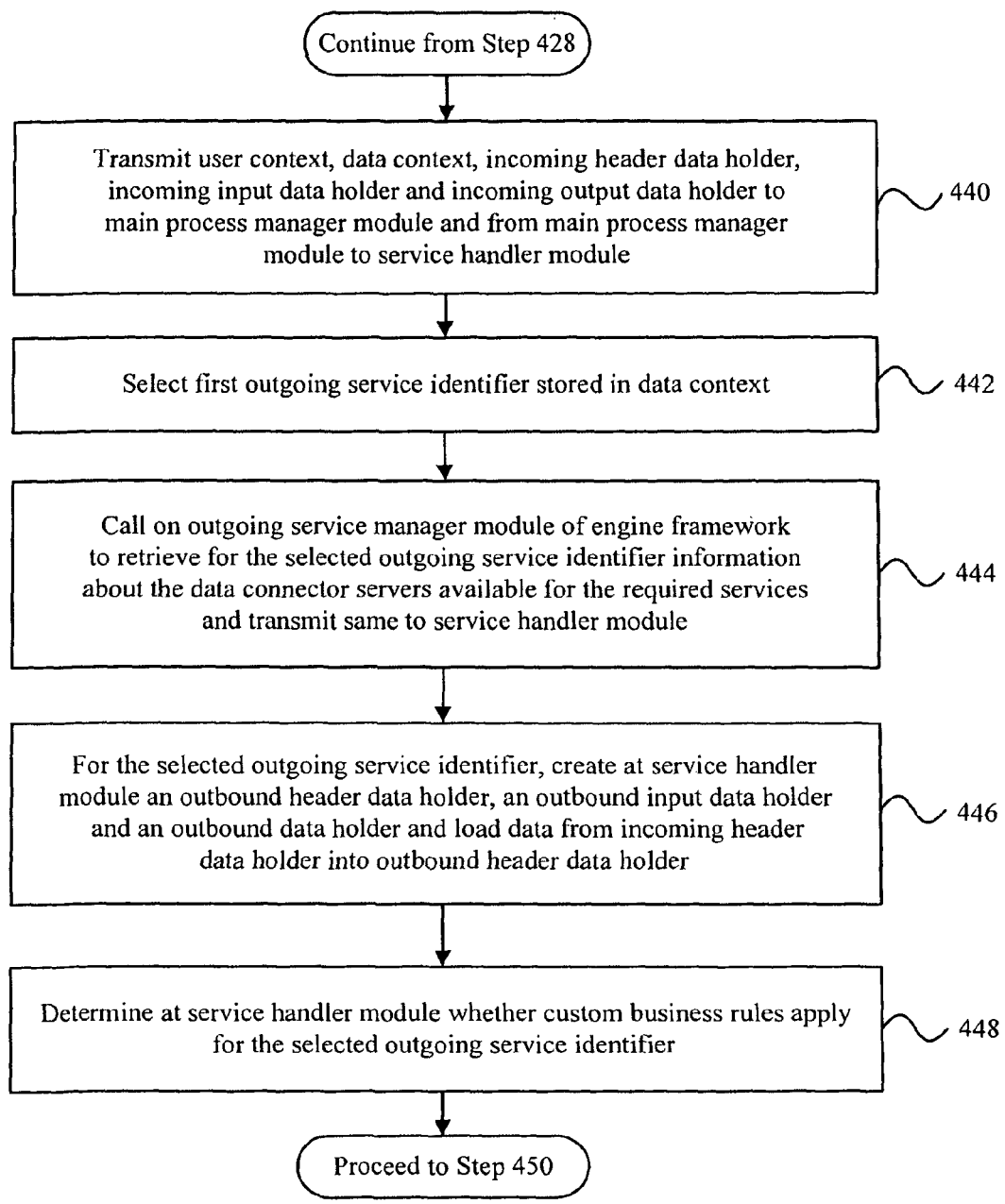

If the subscription verification is found have succeeded (at step 428), then the request handler module 68 transmits the user context, the data context, the incoming header data holder, the incoming input data holder and the incoming output data holder to the main process manager module 66 and next from the main process manager module 66 to the service handler module 70 (at step 440) (see FIG. 11*d*). The service handler module 70 selects the first outgoing service identifier stored in the data context (step 442) and calls on the outgoing service manager module 108 of engine framework 44*b* to retrieve for the selected outgoing service identifier information about the data connector servers 30*a*, 30*b* and 30c available for the required services (at step 444). The module 108 retrieves this information from the OSM database 110. The service handler module 70 creates for the selected outgoing service identifier an outbound header data holder, an outbound input data holder and an outbound output data holder and loads data from the incoming header data holder into outbound header data holder (at step 446). Thereafter, the service handler module 70 determines whether custom business rules apply (at step 448) by verifying whether such rules are specified for this outgoing service identifier.

Figure 11E:
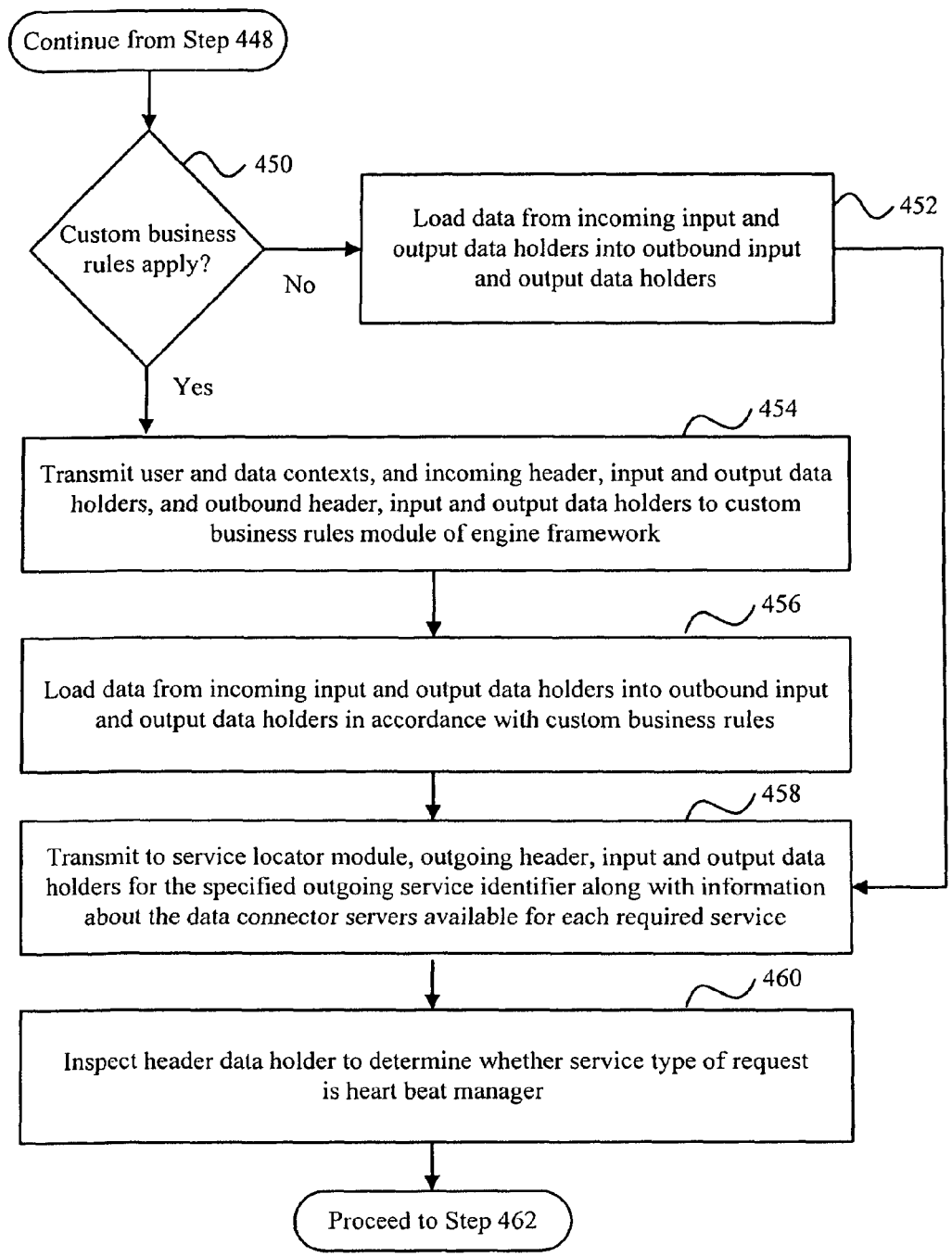
Figure 11F:
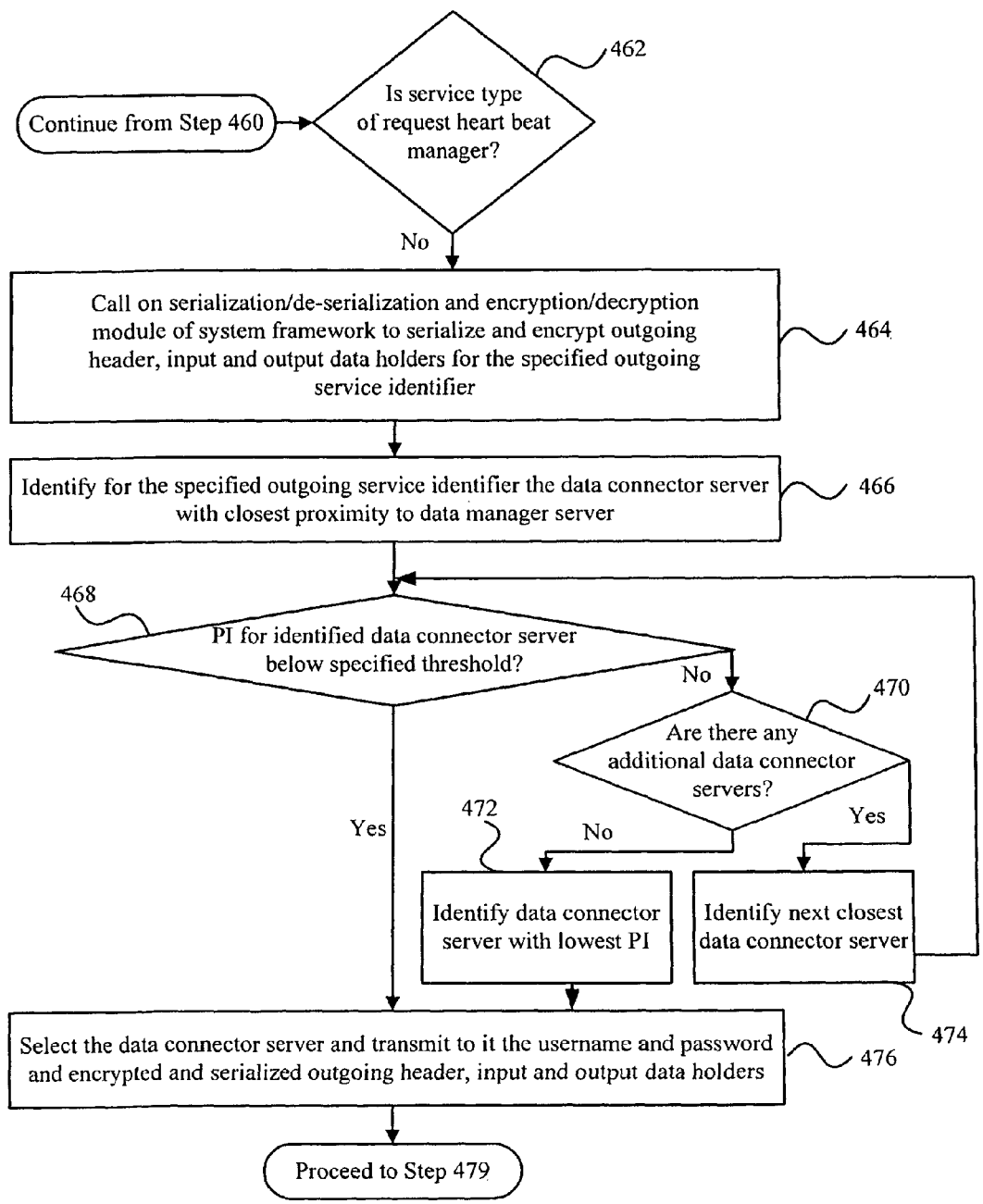

Referring now to FIG. 11e, if custom business rules are found to be specified for this outgoing service identifier (at step 450), the service handler module 70 transmits the user and data contexts; the incoming header, input and output data holders; and the outbound header, input and output data holders to the custom business rules module 120 of the engine framework 44b (at step 454). The module 120 retrieves from the rules database 122 the applicable custom business rules and then loads the data from the incoming input and output data holders into the outbound input and output data holders in accordance with the custom business rules (at step 456). If no custom business rules are found to be specified for this outgoing service identifier (at step 450), then the service handler module 70 loads the incoming input and output data holders into the outbound input and output data holders (at step 452).

Once the data has been loaded into the outbound input and output data holders, the outbound header, input and output data holders for the specified outgoing service identifier are transmitted to the service locator module 72 along with information about the data connector servers 30a, 30b and 30c available for each required service (at step 458). The service locator module 58 inspects the outbound header data holder to determine whether the service type of the request is heart beat manager (at step 460). Given that FIGS. 11a to 11i track the sequence of steps performed by the data manager server 28b when in receipt of a service request, the service type of the request in this case will be found not to be heart beat manager (at step 462) (see FIG. 11f).

The service locator module 70 will call on the serialization/de-serialization module 134 and encryption/decryption module 132 of the system development framework 46a to serialize and encrypt the outbound header, input and output data holders for the specified outgoing service identifier (at step 464) and will identify for the specified outgoing service identifier the data connector server 30 with closest proximity to data manager server 28b, based on information provided to it by service handler module 70 (at step 466). The performance index (PI) (a measure of the responsiveness/availability of the data connector server) for the identified data connector server is checked to see if it is below the specified threshold (at step 468). In this embodiment, the lower the performance index, the more responsive/available the data connector server is. The calculation of the performance index for a data connector server is described below in greater detail.

If the performance index (PI) is found not to be below the specified threshold, the service locator module 72 determines whether there are any additional data connector servers capable of performing the required services (at step 470). If there are additional data manager servers, the service locator module 72 identifies the next closest data connector server (at step 474) and returns to step 468. If, on the other hand, there are no additional data manager servers, then the service locator module 72 identifies the data connector server with the lowest performance index (PI) (at step 472). It will thus be appreciated that in this embodiment, having the data connector server 30 with the closest geographic proximity to the data manager server 28b is given priority first over having a data connector server 30 with a performance index below a specified threshold. If none of the data connector servers have a performance index below the specified threshold, the system will look for the data connector server 30 with the lowest performance index. It should be appreciated that while this selection scheme is preferred, other selection schemes could also be used to equal advantage.

The service locator module 72 selects the data connector server 30 which meets the selection criteria (i.e. either the data connector server 30 which has a performance index (PI) that is below the specified threshold, or if none is found, then the data connector server with the lowest performance index (PI)) and transmits to it the username and password and the encrypted and serialized outbound header, input and output xml strings (at step 476).

Figure 11G:
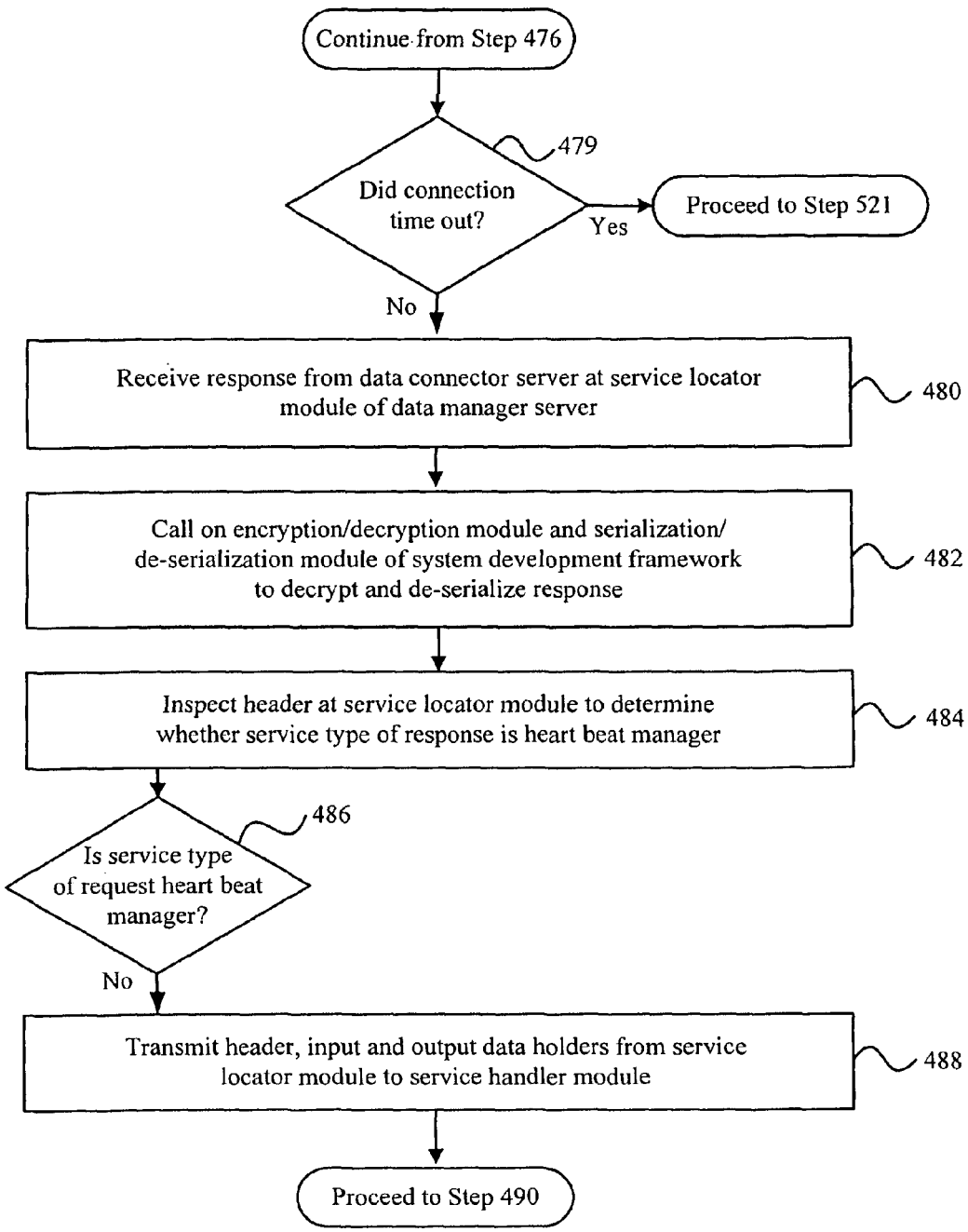

With reference to FIG. 11g, the service locator module 72 then waits to receive a response from the selected data connector server 30. If it is determined (at step 479) that no connection has been established between the data manager server 22 and the selected data connector server 30 (i.e. the connection has timed out), then the data manager server 28 proceeds to step 521 to initiate a retry logic for connecting to another data connector server 30 (see FIG. 12).

However, if it is determined (at step 479) that a connection has been established between the data manager server 28 and the selected data connector server 30, the service locator module 72 of the data manager server 28 receives a response from the selected data connector server 30 (at step 480). The service locator module 72 calls upon the encryption/decryption module 132 and the serialization/de-serialization module 134 of the system development framework 46b to decrypt and de-serialize the response (at step 482). The service locator module 72 then inspects the header of the response to determine whether the service type of response is heart beat manager (at step 484). Given that FIG. 11g tracks the sequence of steps performed by the data manager server 28b when in receipt of a response to the service request transmitted by the data connector server 30, the service type of the request in this case will be found not to be heart beat manager (at step 486). The header, input and output data holders are then transmitted from the service locator module 72 to the service handler module 70 (at step 488).

Figure 11H:
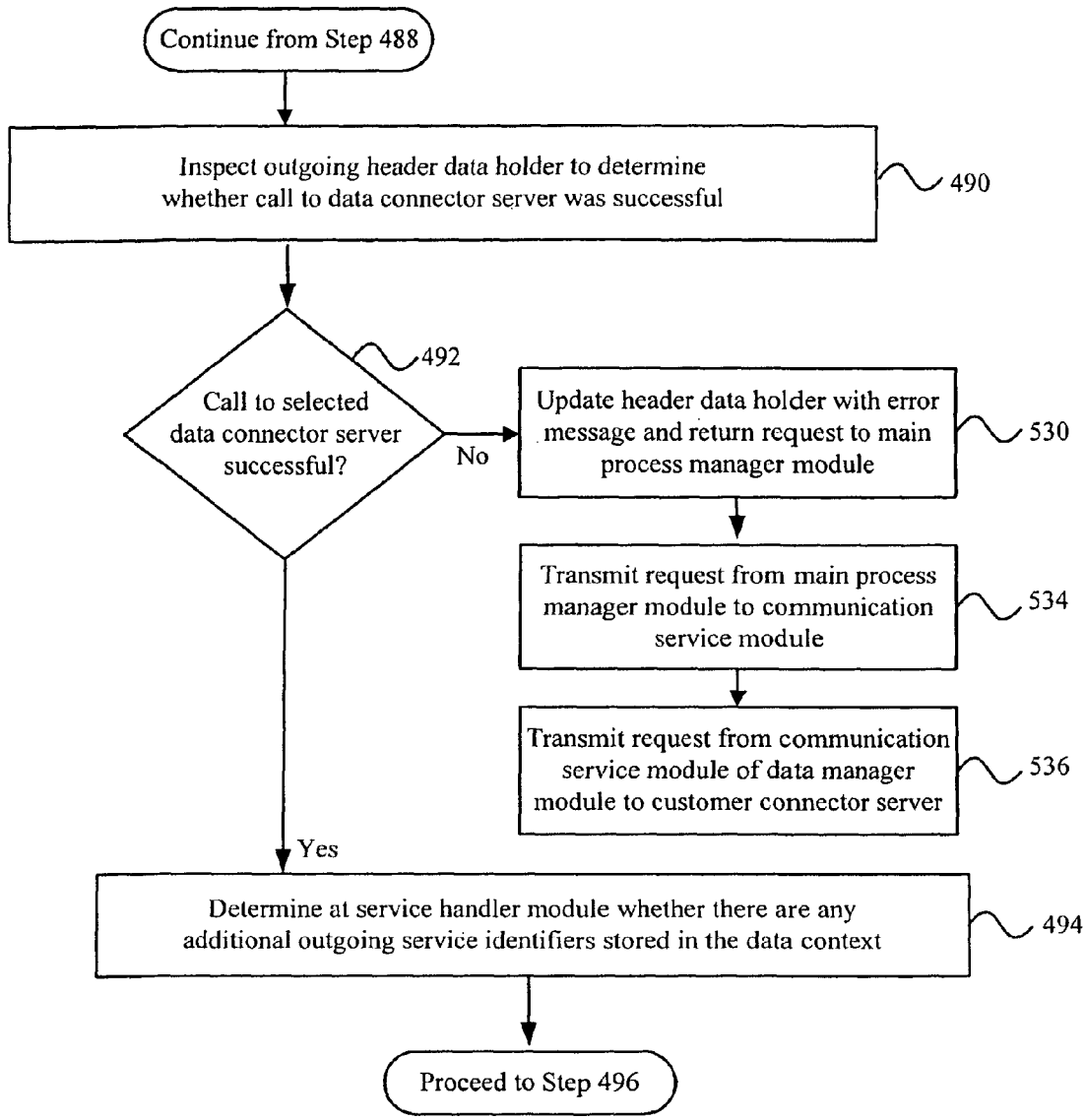

Referring now to FIG. 11h, the module 70 will inspect outgoing header data holder to determine whether the call to the data connector server was successful (at step 490). If the call is found not to be successful (at step 492), the service handler module 70 updates the header data holder with an error message and returns the request to the main process manager module 66 (at step 530). The main process manager module 66 transmits the request to the communication service module 64 (at step 534) which in turn transmits it to the customer connector server 22 (at step 536).

Figure 11I:
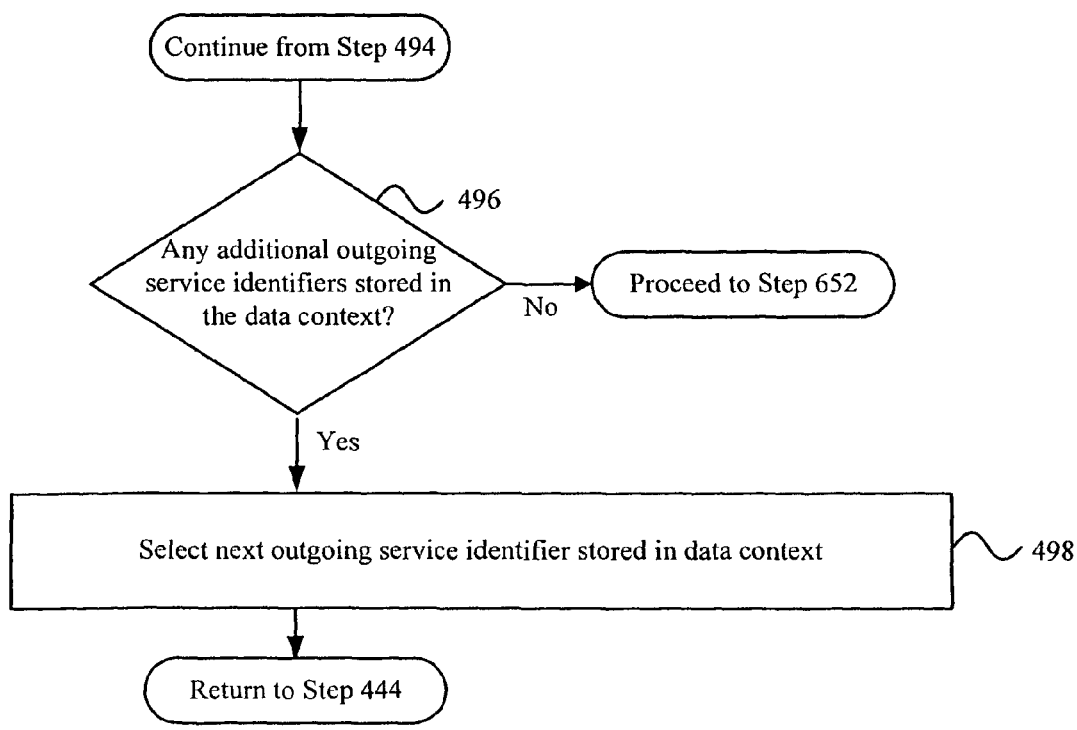

However, if the call to the data connector server 30 is found to be successful (at step 490), then the service handler module 70 determines whether there are any additional outgoing service identifiers stored in the data context (at step 494). Referring to FIG. 11i, if a determination is made (at step 496) that there are no additional outgoing service identifiers stored in the data context, then the customer connector server proceeds to step 652 (shown in FIG. 14b) to complete its response processing steps. In the event, it is determined (at step 496) that there are additional outgoing service identifiers, then service locator module 72 selects the next outgoing service identifier stored in the data context (at step 498) and returns to step 444 (shown in FIG. 11d).

Figure 12:
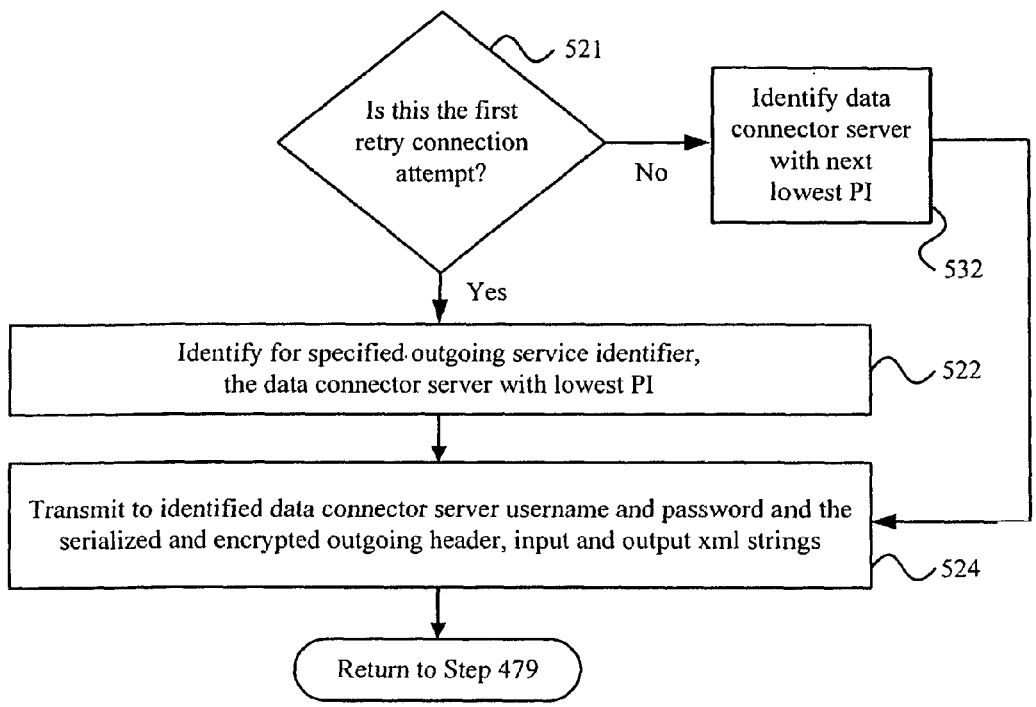
FIG. 12 illustrates the steps carried out by the data manager server in the case where a call to the selected data connector server is unsuccessful, in accordance with an embodiment of the invention.

FIG. 12 shows the retry logic to be implemented by the data manager server 28b in the case where the data manager server 28b fails to connect with the selected data connector server 30. A determination is made as to whether this instance is the first retry connection attempt (at step 521). In the affirmative, the service locator module 72 identifies for the specified outgoing service identifier, the data connector server 30 with the lowest performance index (PI) (at step 522) and then transmits to the identified data manager server 30, the username and password and the encrypted and serialized outbound header, input and output xml strings (at step 524). Thereafter, the service locator module 72 waits to receive a response from the selected data connector server 30 and proceeds to step 479 shown in FIG. 11g.

In the event that it is determined (at step 521) that this instance is not a first retry connection attempt, then the service locator module 72 identifies for the specified outgoing service identifier, the data connector server 30 with the next lowest performance index (PI) (at step 532) and then transmits to the identified data connector server 30, the username and password and the encrypted and serialized outbound header, input and output xml strings (at step 524). Thereafter, the service locator module 72 waits to receive a response from the selected data connector server 7228 and proceeds to step 479 shown in FIG. 11g.

As will be appreciated by a person skilled in the art, the retry logic shown in FIG. 12 allows the system 20 to manage faults and connection failures automatically without manual intervention.

Figure 13A:
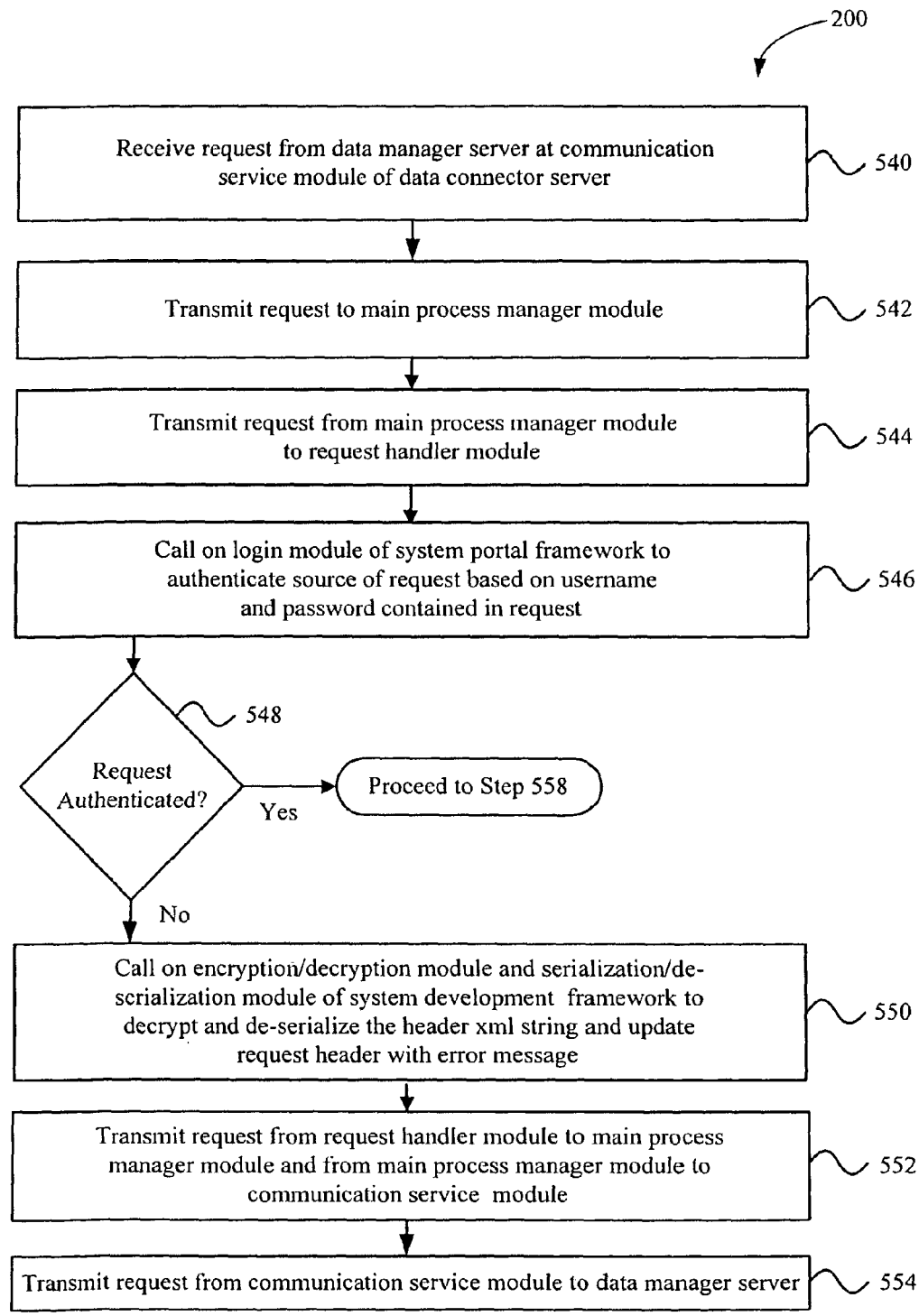
FIGS. 13a to 13c together form a flowchart illustrating the steps carried out by the data connector server for processing a request for service in accordance with an embodiment of the invention.

Once the username and password and the encrypted and serialized outbound header, input and output xml strings transmitted to the selected data connector server 30 at step 476 (see FIG. 11f) or step 524 (see FIG. 12) are received by the data connector server 30, the data connector server 30 performs a series of request processing steps (see step 200 shown in FIG. 8a). This series of processing steps is now described with reference to FIGS. 13a to 13c. The request for service is received at the communication service module 82 of the data connector server 30a (at step 540). The request is transmitted from the communication service module 82 to the main process manager module 84 (at step 542) and subsequently, from the main process manager module 84 to the request handler module 86 (at step 544). The request handler module 86 calls upon the login module 158 of the system portal framework 48c to authenticate the source of the request based on the username and password contained in the request (at step 546). The login module 158 determines whether the request is authenticated (at step 548).

If the request is not authenticated (because there is no match on file for the username and password provided), then the request handler module 86 calls upon the encryption/decryption module 132 and the serialization/de-serialization module 134 of the system development framework 46c to decrypt and de-serialize the header xml string and update the header with an error message indicating that the system has failed to authenticate the request (at step 550). The request handler module 86 then transmits the request to the main process manager module 84 which in turn passes it to the communication service module 82 (at step 552). The communication service module 82 then transmits the request to the data manager server 28b thereby advising that the service transaction could not be completed as a result of an authentication failure (at step 554).

Figure 13B:
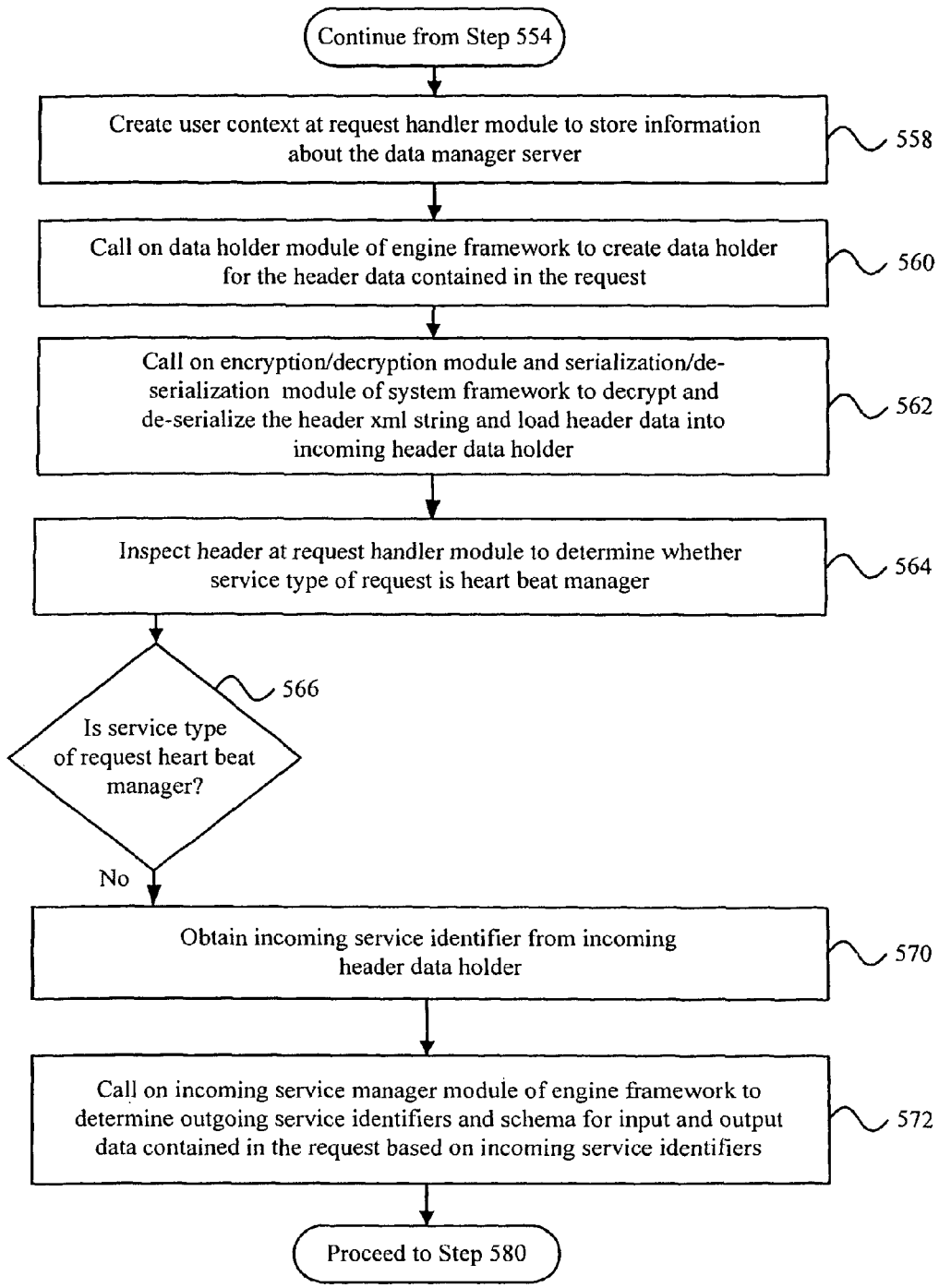

With reference to FIG. 13b, if the request is authenticated (i.e. the username and password provided match those on file), the request handler module 86 will create a user context to store information about the data manager server 28b (at step 558). The request handler module 86 will then call on the data holder module 100 of the engine framework 44c to create a data holder for the header data contained in the request (at step 560). The request handler module 86 will then call on the encryption/decryption module 132 and the serialization/de-serialization module 134 of system development framework 46c to decrypt and de-serialize the header xml string and load the header data into the incoming header data holder (at step 562). The request handler module 86 will then inspect the header data to determine whether the service type of the request is heart beat manager (at step 564). Given that FIGS. 13a to 13c track the sequence of steps performed by the data connector server 30a when in receipt of a request for service, the service type of the request in this case will be found not to be heart beat manager (at step 566).

The request handler module 86 will inspect the incoming header data holder and obtain the incoming service identifier (at step 570). Preferably, the incoming service identifier is a generic identifier. Having obtained the incoming service identifier, the request handler module 86 calls on the incoming service manager module 104 of engine framework 44c to determine the outgoing service identifiers and schema for the input data and output data contained in request based on incoming service identifier (at step 572). More specifically, the incoming service manager module 104 retrieves from the ISM database 106 the name of the XSD file, which contains the definition of the schema, for a particular incoming service, and the outgoing service identifiers associated with the incoming service identifier.

Figure 13C:
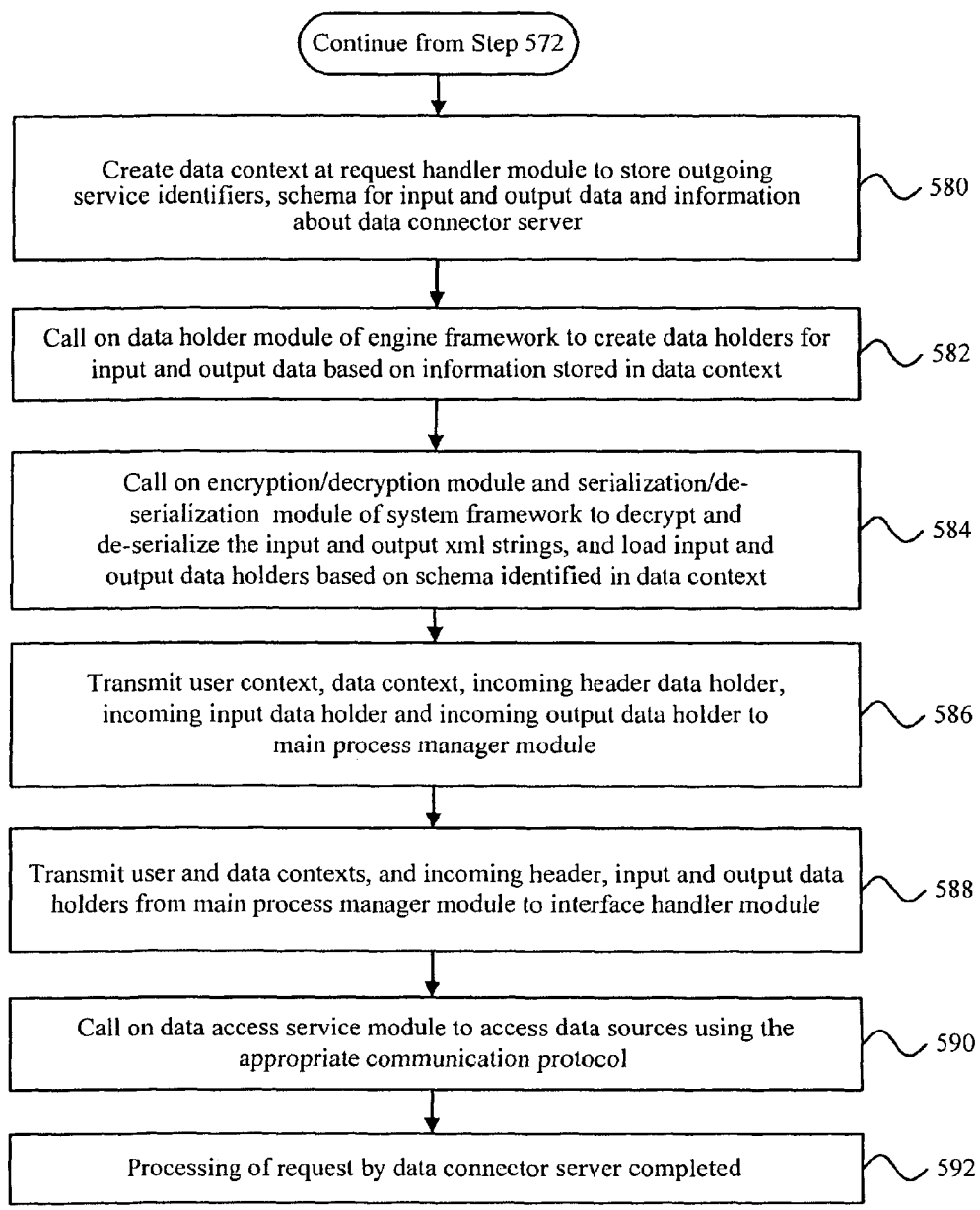

Referring now to FIG. 13c, the request handler module 86 then creates a data context to store the outgoing service identifiers, the XSD files name defining the schema for the input and output data and information about data connector server 30b (at step 580). Subsequently, the data holder module 100 of the engine framework 44c is called upon to create the data holders for the input and output data based on information stored in data context (at step 582). More specifically, the data holder module 100 retrieves from the XSD database 102 the XSD file identified in the data context. Thereafter, the request handler module 86 calls upon the encryption/decryption module 132 and serialization/de-serialization module 134 of system development framework 46c to decrypt and de-serialize the input and output xml strings. The module 86 then loads the input and the output data into the input and output data holders in accordance with the specified schema (at step 584).

Once the data has been loaded into the input and output data holders, the incoming header, input and output data holders for the specified outgoing service identifier are transmitted to the main process manager module 84 (at step 586) and then subsequently, to the interface handler module 88 (at step 588). The interface handler module 88 will call on the data access service module 90 to access the data sources 32, 33 and/or 34 using the appropriate communication protocol (at step 590). Once the module 90 accesses the data sources 32, 33 and/or 34, the processing of the request by the data connector server 30a will be complete (at step 592). The data sources 32, 33 and/or 34 verifies the identification information provided by the individual to be verified against the identity information relating to the individual contained within the one or more data sources 32, 33 or 34 and generates a response which indicates whether or not the individual's identity has been authenticated.

Figure 14A:
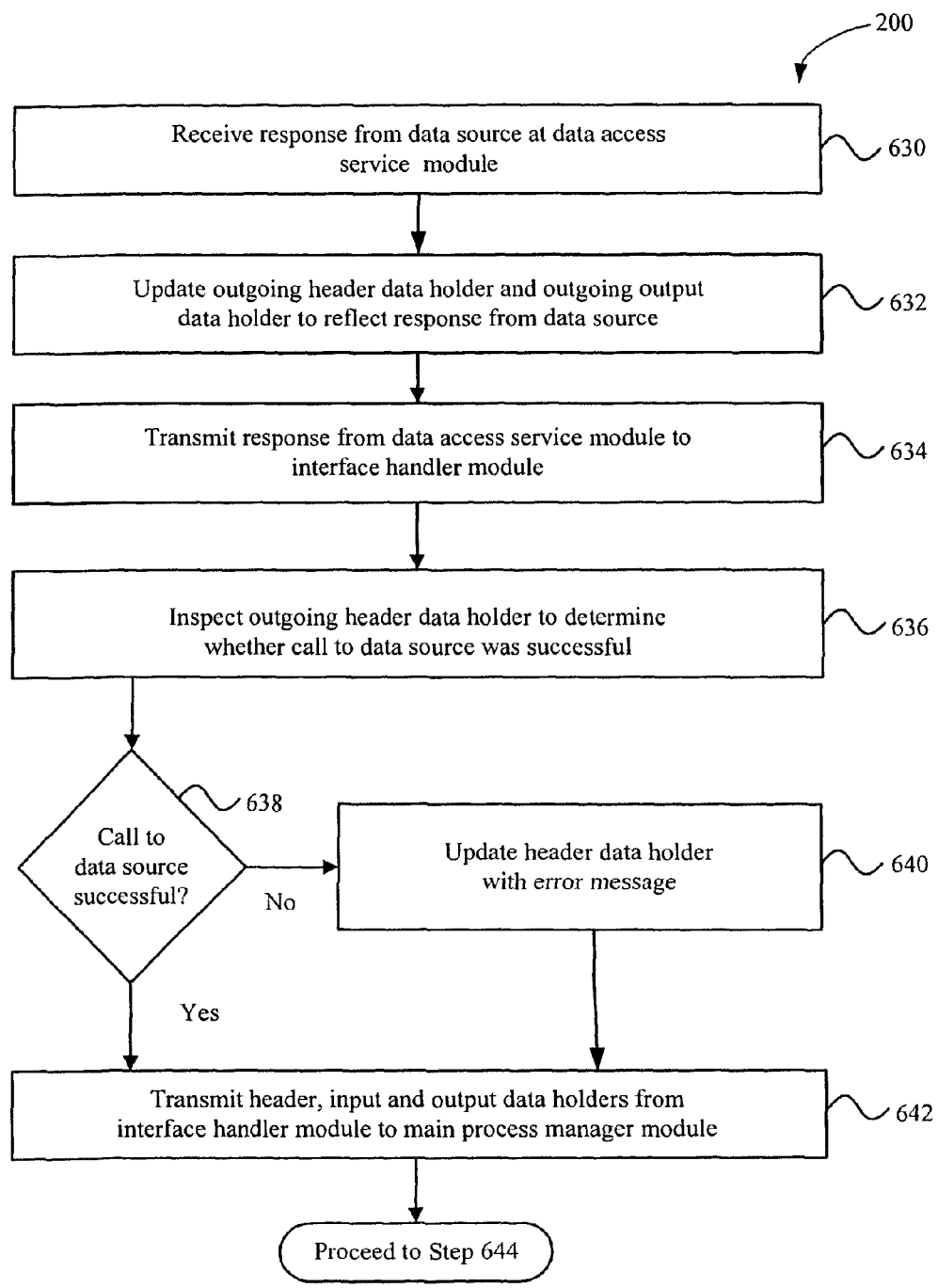
FIGS. 14a and 14d together form a flowchart illustrating the steps carried out by the data connector server, the data manager server and the customer connector server in processing a response received in connection with a request for identity verification, in accordance with an embodiment of the invention.

The data sources 32, 33 or 34 will transmit this response to the data connector server 30a based on the verification performed (see step 210 shown in FIG. 8a). This response is received by the data connector server 30a and will cause the data connector server 30a to perform a series of response processing steps (at step 215 shown in FIG. 8b). This series of processing steps is now described with reference to FIGS. 14a and 14b. The response from the data source 34, 32 or 33 is received at the access service module 90 of the data connector server 30a (at step 630). The module 90 updates the outgoing header data holder and outgoing output data holder to reflect the response from the data source (at step 632) and then transmits the response to the interface handler module 88.

Preferably, for reasons of privacy and security, the updated outgoing output data holder does not contain any personal information regarding the individual whose identity is being verified. The output data holder merely contains an indication as to whether the identity was conclusively verified or not. For example, where the individual's driver's license number is being verified, the outgoing output data holder may contain an indication that a match was found (i.e. that the driver's license number provided by the individual matches the driver's license number on record for that individual). In this way, since the system 20 does not retrieve or store sensitive or confidential data from the data sources, the risk of an unauthorized disclosure of such information tends to be eliminated thereby protecting the privacy of the individual.

The interface handler module 88 inspects the outgoing header data holder to determine whether the call to the data source was successful. If the call is found not to be successful (at step 638), the interface handler module updates the outgoing header data holder with an error message (at step 640) and then transmits the header, input and output data holders to the main process manager module 84 (at step 642). However, if the call is determined to be successful (at step 638), then the header, input and output data holders are transmitted to the main process manager module 84 (at step 642).

Figure 14B:
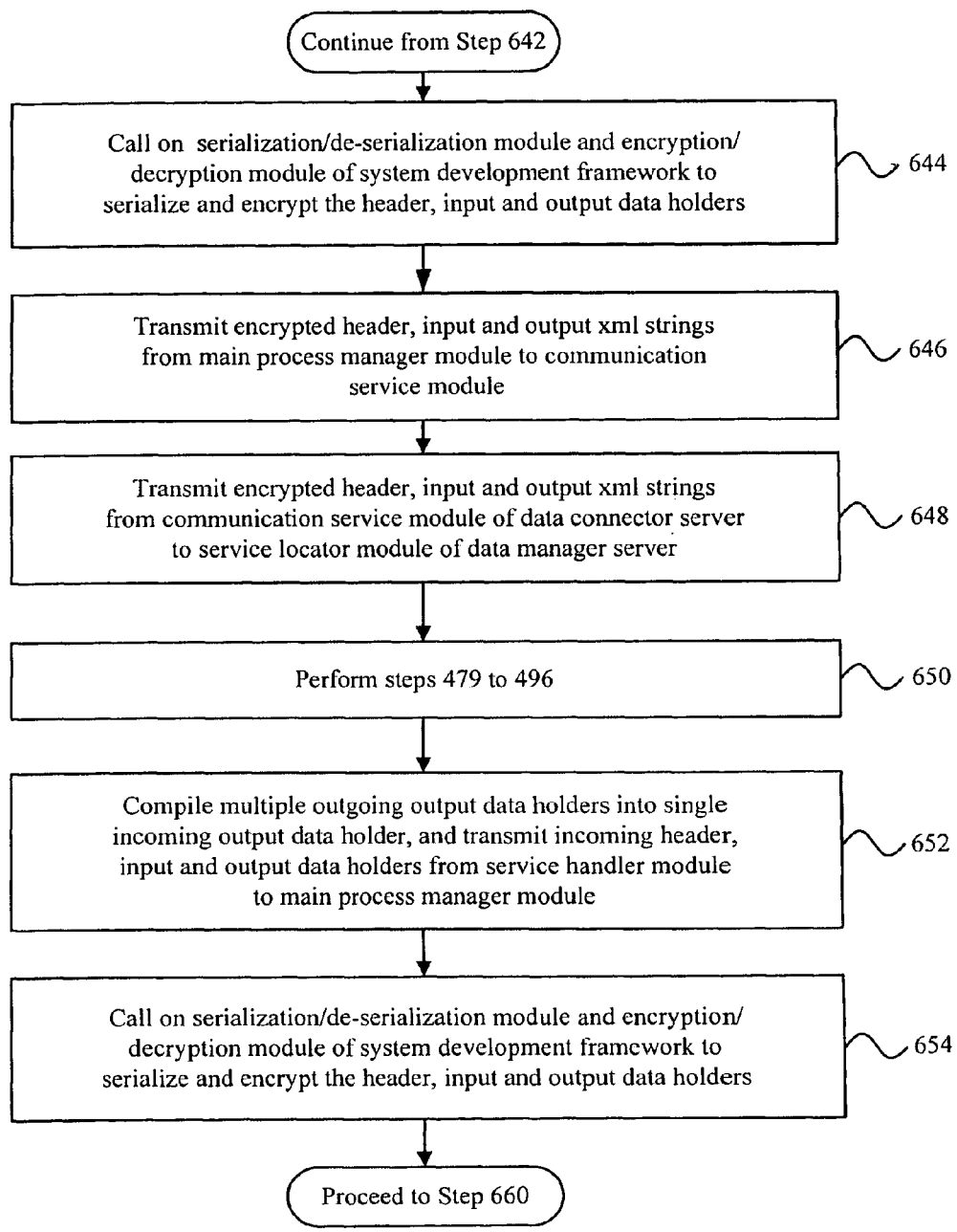

With reference to FIG. 14b, the main process manager module 84 calls on the serialization/de-serialization module 134 and the encryption/decryption module 132 of system development framework 46c to serialize and encrypt the header, input and output data holders (at step 644). The encrypted header, input and output xml strings are then transmitted from the main process manager module 84 to the communication service module 82 (at step 646) and in turn, from the communication service module 82 to the service locator module 72 of the data manager server 28b (at step 648). Once the response is received at the data manager server 28b, the server 28b will perform response processing steps (at step 220 shown in FIG. 8b). More specifically, steps 479 to 496 will be performed (at step 650) as described above.

Once a response has been received for the last of the calls made to the data connector servers 30, the service handler module 70 will compile the multiple outgoing output data holders into a single incoming output data holder, and will transmit the incoming header, input and output data holders to main process manager module 66 (at step 652). The main process manager module 66 will then call on the serialization/de-serialization module 134 and the encryption/decryption module 132 of the system development framework 46b to serialize and encrypt the header, input and output data holders (at step 654).

Figure 14C:
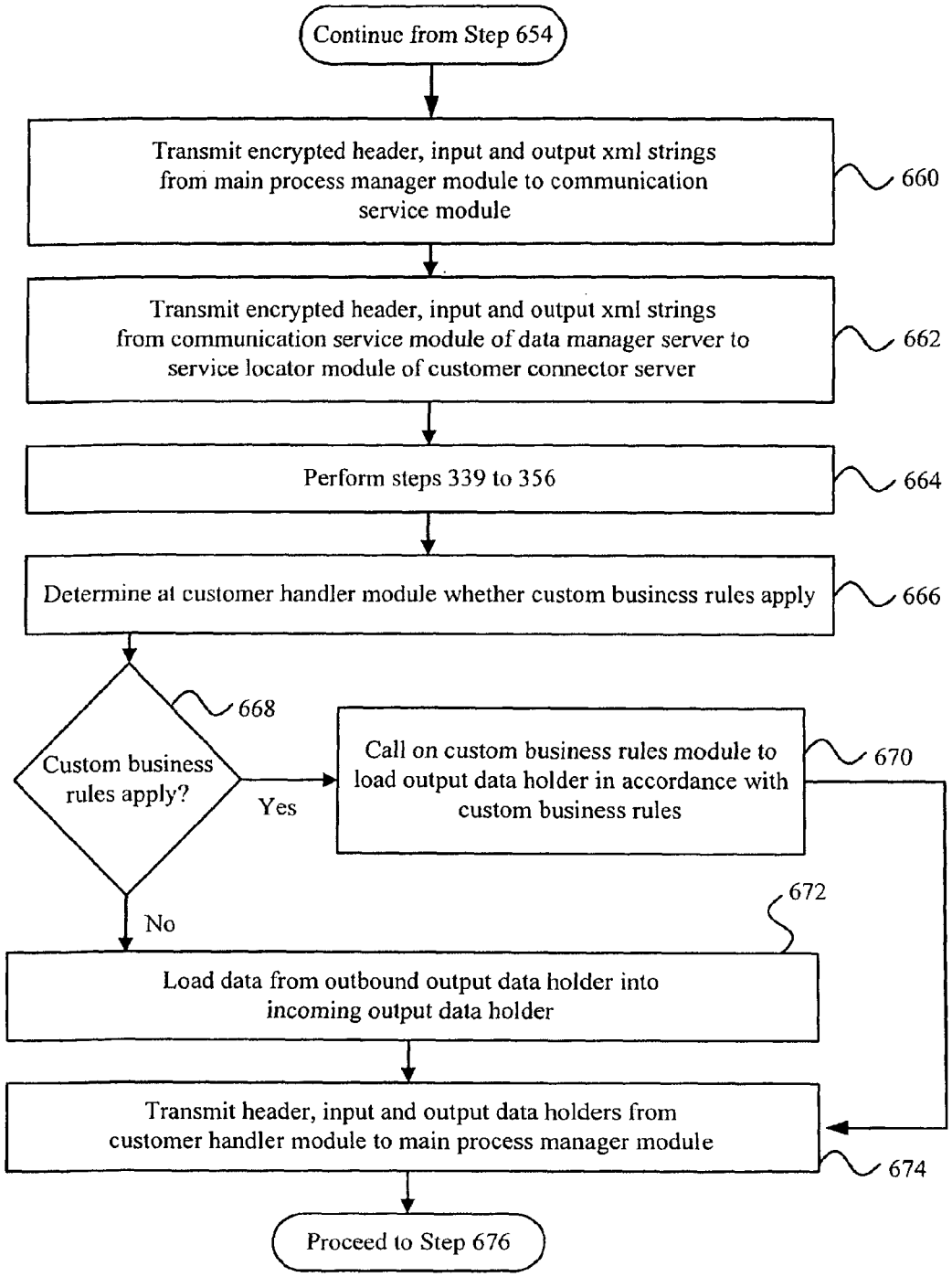

With reference to FIG. 14c, the encrypted header, input and output xml strings are transmitted from the main process manager module 66 to the communication service module 64 (at step 660) and subsequently, from the communication service module 64 to the service locator module 58 of the customer connector server 22 (at step 662). Once the response is received at the customer connector server 22, the server 22 will perform response processing steps (at step 230 shown in FIG. 8b). More specifically, steps 339 to 356 will be performed (at step 664) as described above.

Once a response has been received for the last of the calls made to the data manager servers 28, the customer handler module 56 will determine whether custom business rules apply to the response (at step 666) by verifying whether such rules are specified for the outgoing service identifier. If custom business rules are found to apply to the response (at step 668), the customer handler module 56 will call upon the custom business rules module 120 of the engine framework 44a to load the data from the outbound output data holder into the incoming output data holder in accordance with the custom business rules (at step 670). The module 120 retrieves the applicable custom business rules from the rules database 122. These custom business rules may stipulate specific formats for response customized to meet the customer requirements. Thereafter, the header, input and output data holders are transmitted from the customer handler module 58 to the main process manager module 52 (at step 674).

If, however, the custom business rules are found not to apply to the response (at step 668), then the customer handler module 56 loads the data from the outbound output data holder into the incoming output data holder (at step 672) and transmits the header, input and output data holders to the main process manager module 52 (at step 674).

Figure 14D:
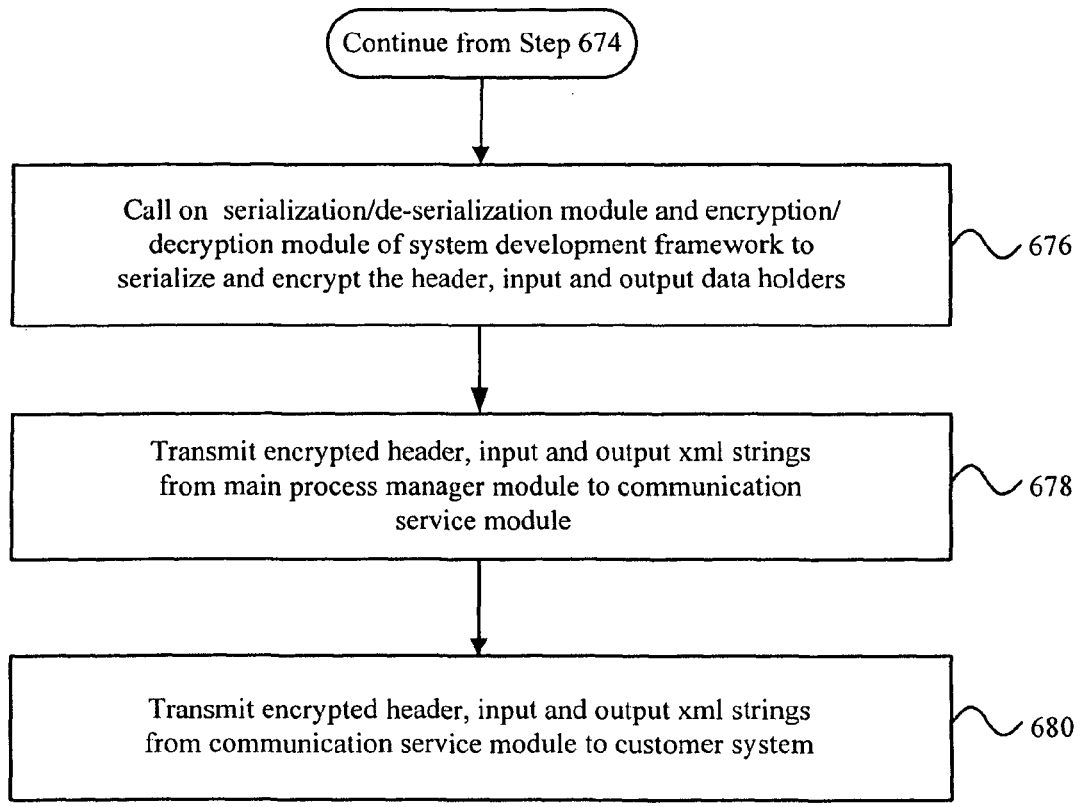

With reference to FIG. 14d, the main process manager module 52 then calls on the serialization/de-serialization module 134 and the encryption/decryption module 132 of the system development framework 46a to serialize and encrypt the header, input and output data holders (at step 676). The encrypted header, input and output xml strings are transmitted from the main process manager module 52 to the communication service module 50 (at step 678) and subsequently, from the communication service module 50 to the customer system 24 (at step 680).

In the case where a request for service was initiated from a business portal 23, the flow of responses from the data connector server 30 to the data manager server 28 will proceed generally similar to that described above and shown in FIGS. 14a and 14b. However, when the processing of the response by the data manager server 28 gets to step 662 (see FIG. 14c), instead of the encrypted header, input and output xml strings being transmitted to the service locator module 58 of customer connector server 22, it gets transmitted to the business portal 23.

With reference to FIGS. 15a, 15b and 16a to 16d, the implementation of the heart beat strategy as carried out by the customer connector server 22 and the data manager server 28b is now described in greater detail. The process begins with the actuation of the heart beat service module 60 of the customer connector server 22 at predetermined times (at step 690). The module 60 calls upon the outgoing service manager module 108 of the engine framework 44a to retrieve all unique outgoing service identifiers (at step 692). Thereafter, the module 60 calls upon the data holder module 100 of the engine framework 44a to create and populate a header data holder for each outgoing service identifier (at step 694). The header data holder for the first outgoing service identifier is selected and serialized (at step 696), and then transmitted to the service locator module 58 (at step 698).

Figure 15A:
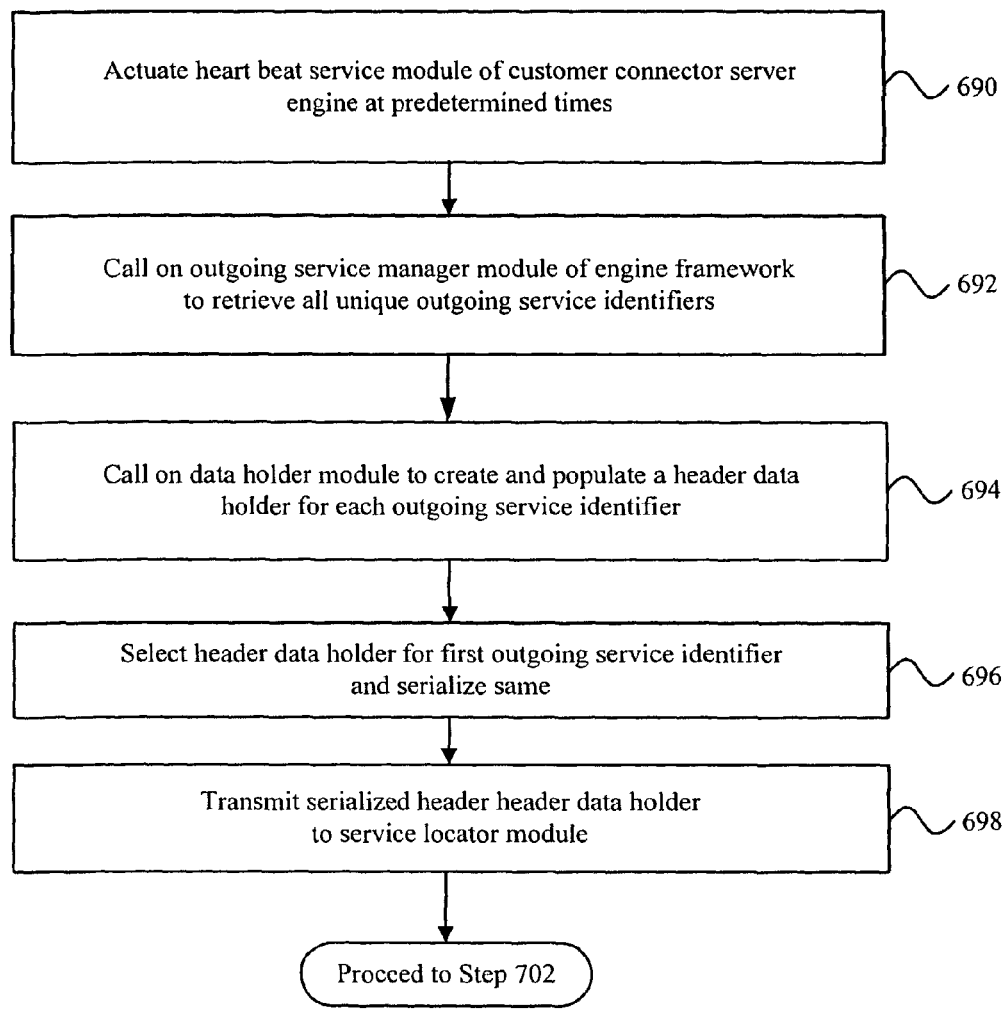
FIGS. 15a and 15b together form a flowchart illustrating the steps carried out by the customer connector server to initiate a heart beat service type request, in accordance with an embodiment of the invention.
Figure 15B:
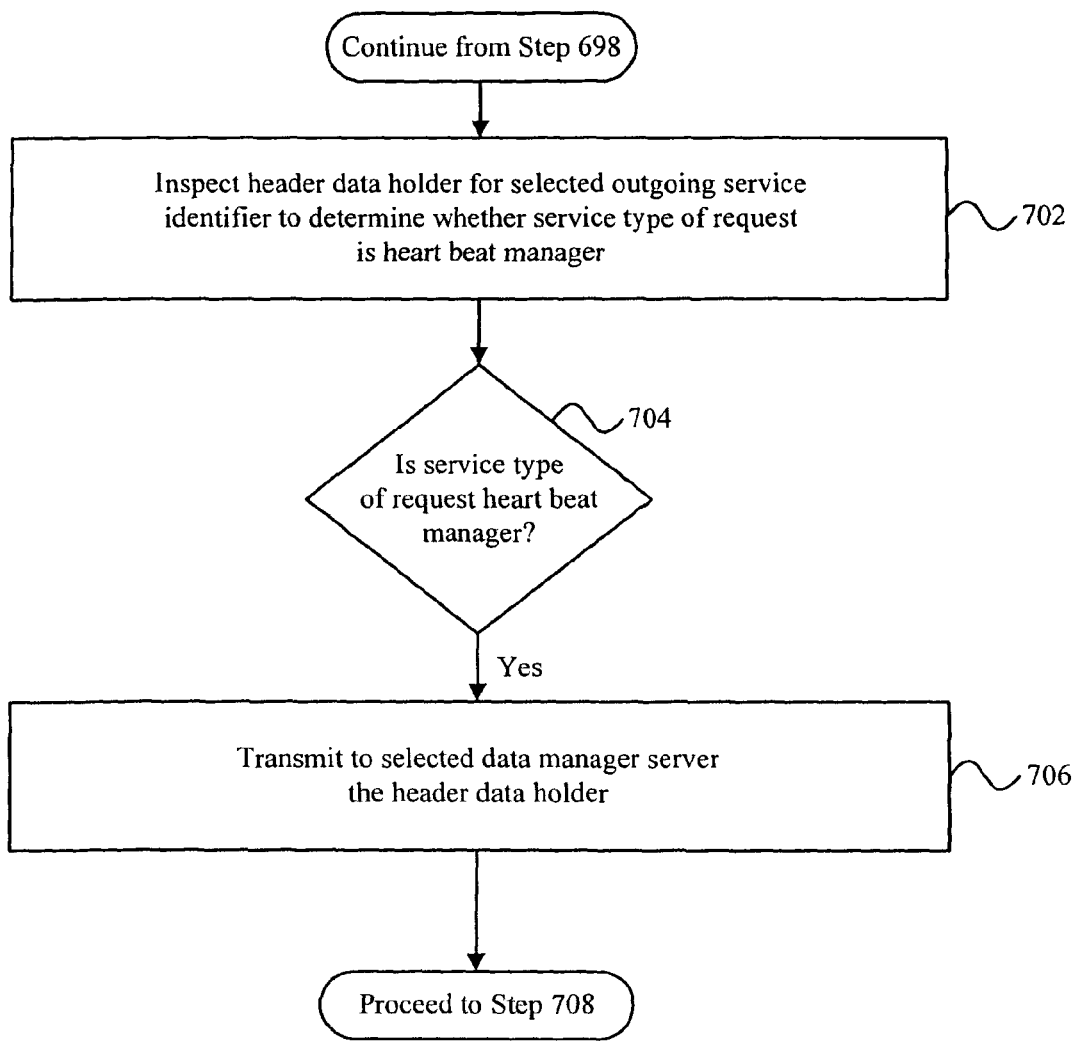

Referring to FIG. 15b, the module 58 inspects the header data holder for the selected outgoing service identifier to determine whether the service type of request is heart beat manager. Given that FIGS. 15a and 15b track the sequence of steps performed by the server 22 in connection with a heart beat manager service type request, the service type of the request in this case will be found to be heart beat manager (at step 704). The module 58 then transmits the header data holder to the selected data manager server 28 (at step 706).

FIGS. 16a, 16b, 16c and 16d illustrate the handling of a heart manager service type request by the data manager server 28b. Once the request (containing the header data holder) is received at the data manager server 28b, the server 28b performs steps 380 to 384 (at step 708) as described above. More specifically, the request is received at the communication service module 64 (at step 380) and transmitted to the main process manager module 66 (at step 382) and subsequently, to the request handler module 68 (at step 384). The request handler module 68 calls on the data holder module 100 of engine framework 44b to create a header data holder and populate the header data holder with the incoming header data (at step 709). The header data holder is then returned the main process manager module 66 (at step 710). Next, the module 66 inspects the header to determine whether the service type of request is heart beat manager (at step 711). Given that FIGS. 16a to 16d track the sequence of steps performed by the server 28b in connection with a heart beat manager service type request, the service type of the request in this case will be found to be heart beat manager (at step 712). The main process manager module 66 then transmits the request to the heart beat service module 74 (at step 714).

Figure 16A:
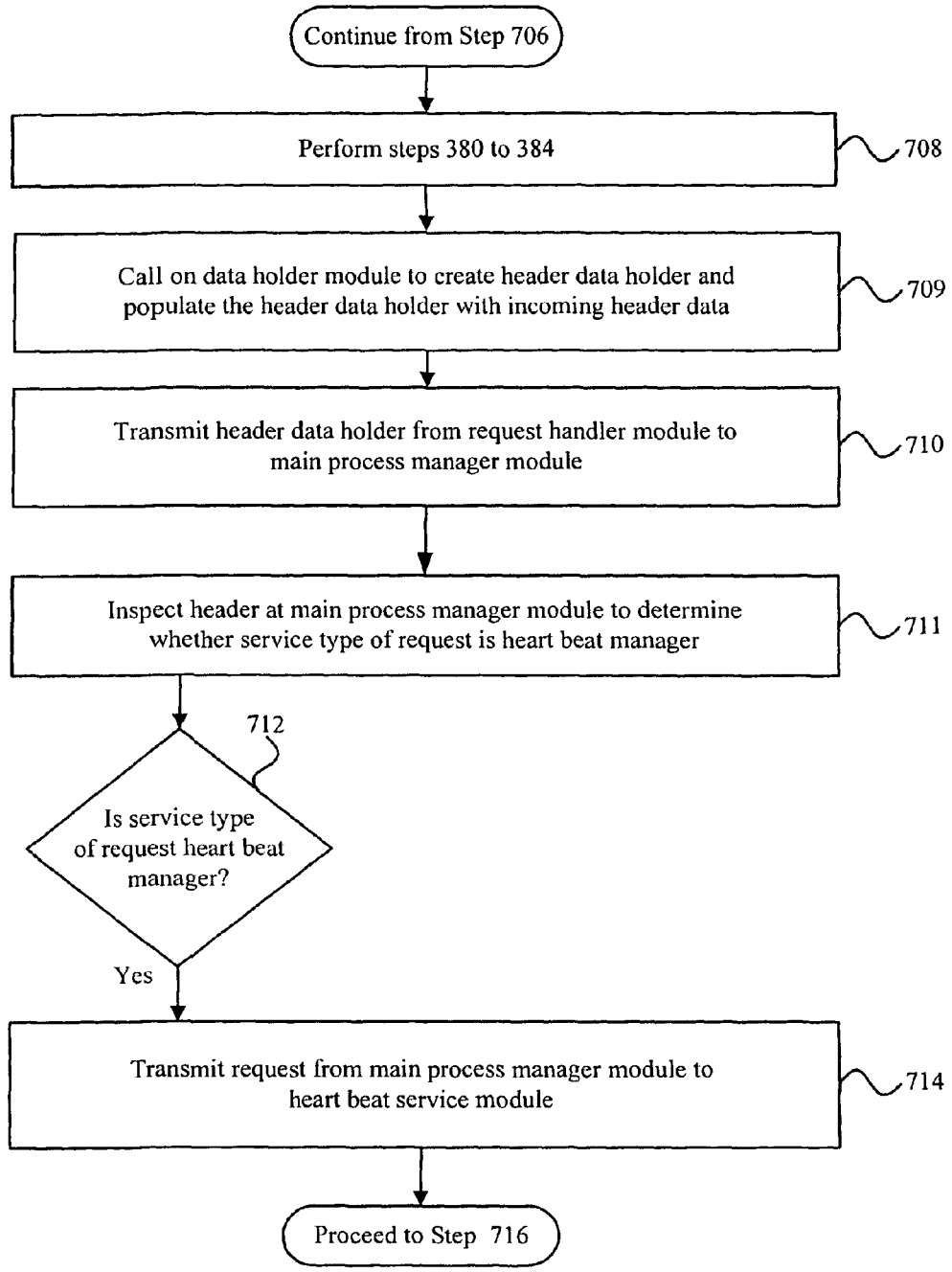
FIGS. 16a to 16d together form a flowchart illustrating the steps carried out by the data manager server receiving a heart beat manager message or request and those steps carried out by the customer connector server receiving a response to the heart beat manager message or request, in accordance with an embodiment of the invention.
Figure 16B:
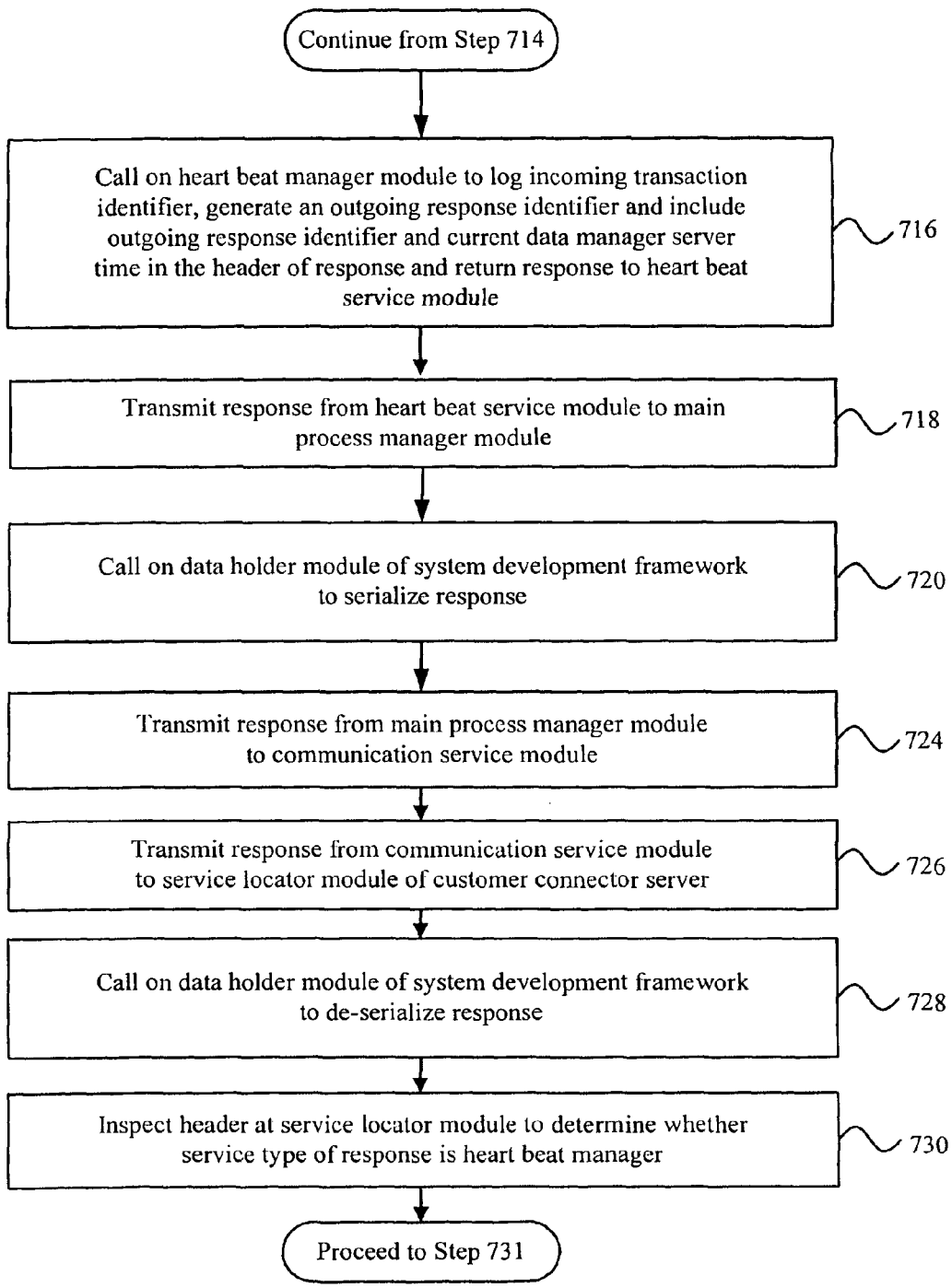
Figure 16C:
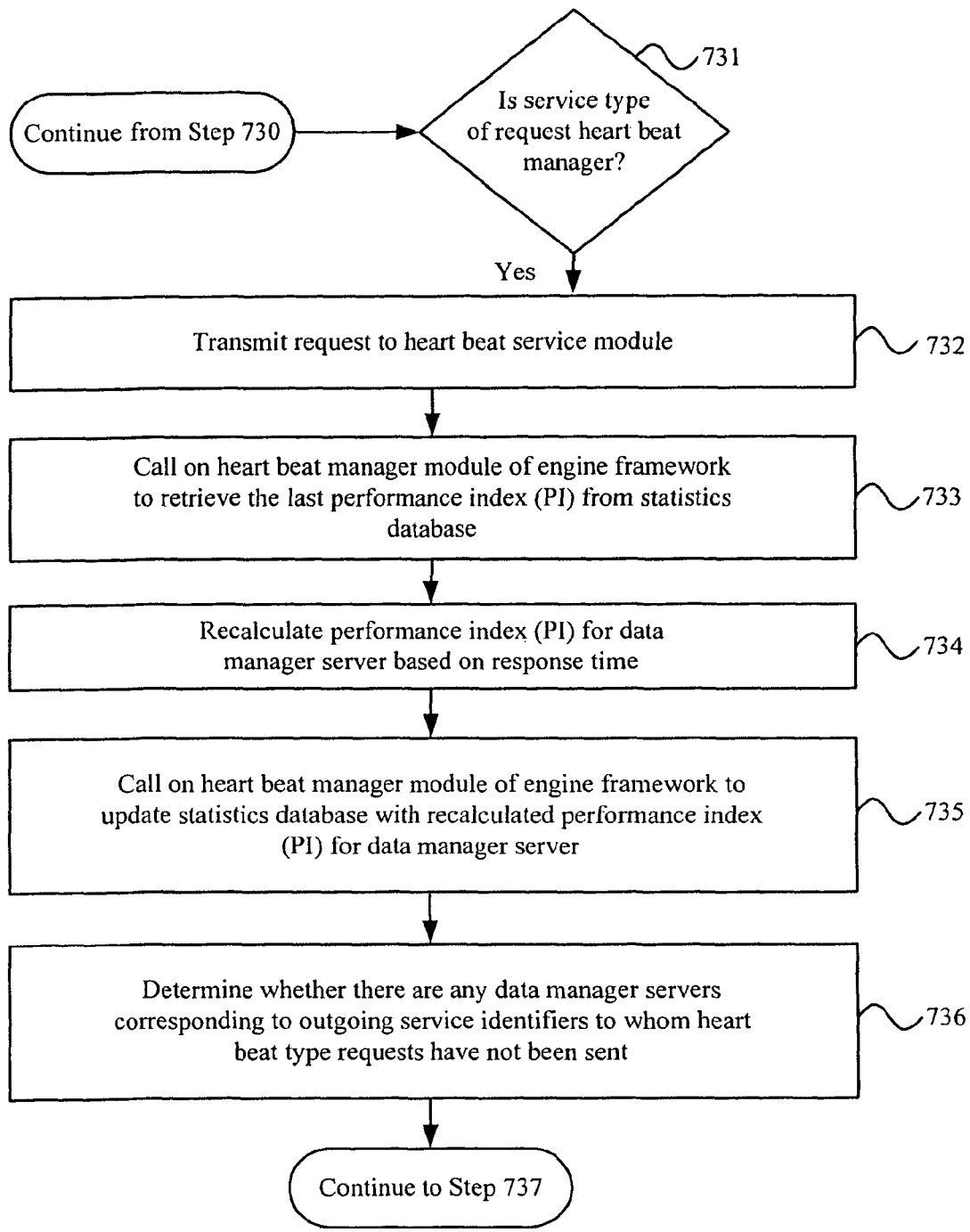

Referring to FIG. 16b, the module 74 calls on the heart beat manager module 124 of the engine framework 44b to log the incoming transaction identifier, generate an outgoing response identifier and include the outgoing response identifier and current data manager server time in the header of the response. The module 124 also updates the service records stored in the statistics database 126. The response is then returned to the heart beat service module 74 (at step 716) and from there transmitted back to the main process manager module 66 (at step 718). The module 66 will then call on the data holder module 100 of the engine framework 44b to serialize the response (at step 720). Subsequently, the response is transmitted from the main process manager module 66 to the communication service module 64 (at step 724) and then from the communication service module 64 to the service locator module 58 of the customer connector server 22 (at step 726). The service locator module 58 will then call on the data holder module 100 of the engine framework 44a to de-serialize the response (at step 728). The module 58 will inspect the header to determine whether the service type of the response is heart beat manager (at step 730). Given that FIGS. 16a to 16d track the sequence of steps performed by the servers 22 and 28b in connection with a heart beat manager service type request, the service type of the response in this case will be found to be heart beat manager (at step 731) (see FIG. 16c).

The service locator module 58 then transmits the response to the heart beat service module 60 (at step 732). The module 60 calls on the heart beat manager module 124 of the engine framework 46a to retrieve the last performance index (PI) from the statistics database 126 (at step 733). The module 60 then recalculates the performance index (PI) for the data manager server 28b based on the response time of the data manager server (at step 734). The algorithm for recalculating the performance index is described below.

In the preferred embodiment, the performance index is based on server response time and more specifically, on the time it took for the server 28b to respond to the heart beat message transmitted by the customer connector server 22. If the current time taken to respond to the heart beat message is lower than the previous response time, then the current response time will be set as the new performance index. However, if the current response time is greater than the previous response time then the performance index will be calculated as follows. The previous response time will be subtracted from the current response time and the difference obtained from such operation will be halved. The value thus obtained will be added to the previous response time and the resulting sum will become the new performance index for the data manager server 28. It should be appreciated that in other embodiments, a different algorithm for calculating the performance index (PI) could be employed to similar advantage. Thereafter, the OSM database 110 will be updated with the new performance index (PI) for the data manager server 28b.

Once the performance index (PI) has been recalculated, then the module 60 calls on the heart beat manager module 124 of the engine framework 44a to update the statistics database 126 with the recalculated performance index (PI) for the data manager server (at step 735). The module 60 then determines whether there are any data manager servers corresponding to the outgoing service identifiers to whom heart beat type requests have not been sent (at step 736).

Figure 16D:
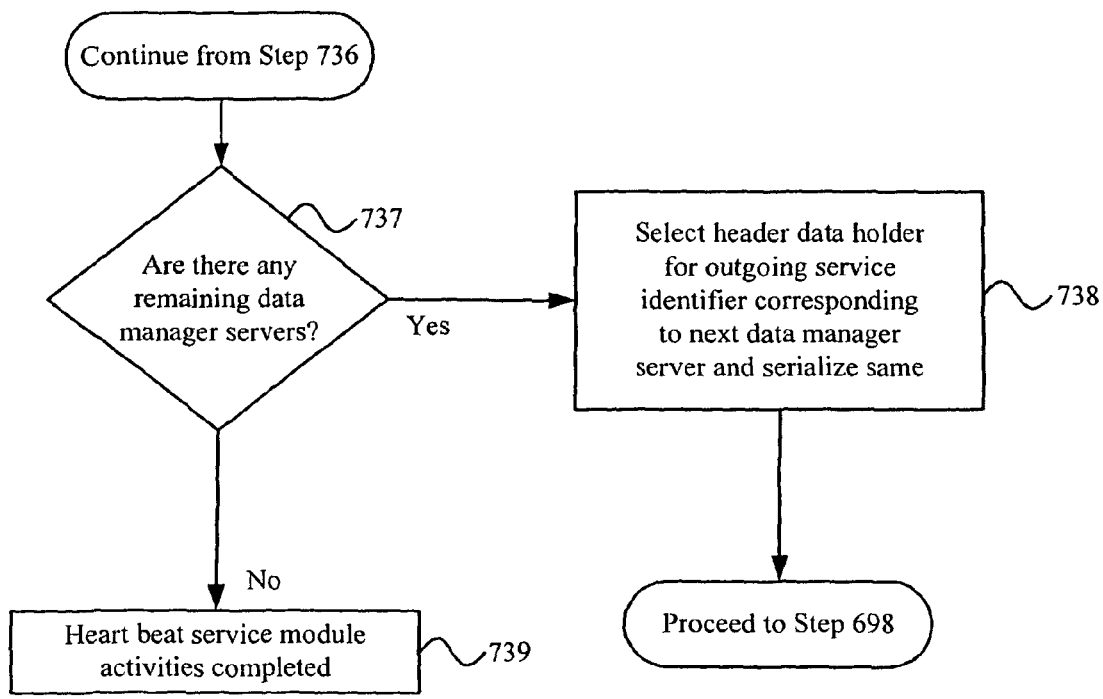

Referring to FIG. 16d, if it is determined (at step 737) that there are any such data managers servers, then the heart beat service module 60 selects the header data holder for the outgoing service identifier corresponding to next data connector server and serializes same (at step 738) and proceeds to step 698 shown in FIG. 15a. However, if it is determined that heart beat type requests have been sent to all data manager servers corresponding to the outgoing service identifiers, then the heat beat service module 60 has completed its activities (at step 739).

With reference to FIGS. 17a, 17b and 18a to 18d, the implementation of the heart beat strategy as carried out by the data manager server 28b and the data connector server 30a is now described in greater detail. The process begins with the actuation of the heart beat service module 74 of the data manager server 28b at predetermined times (at step 740). The module 74 calls upon the outgoing service manager module 108 of the engine framework 44b to retrieve all unique outgoing service identifiers (at step 742). Thereafter, the module 74 calls upon the data holder module 100 of the engine framework 44b to create and populate a header data holder for each outgoing service identifier (at step 744). The header data holder for the first outgoing service identifier is selected and serialized (at step 746), and then transmitted to the service locator module 72 (at step 748).

Figure 17A:
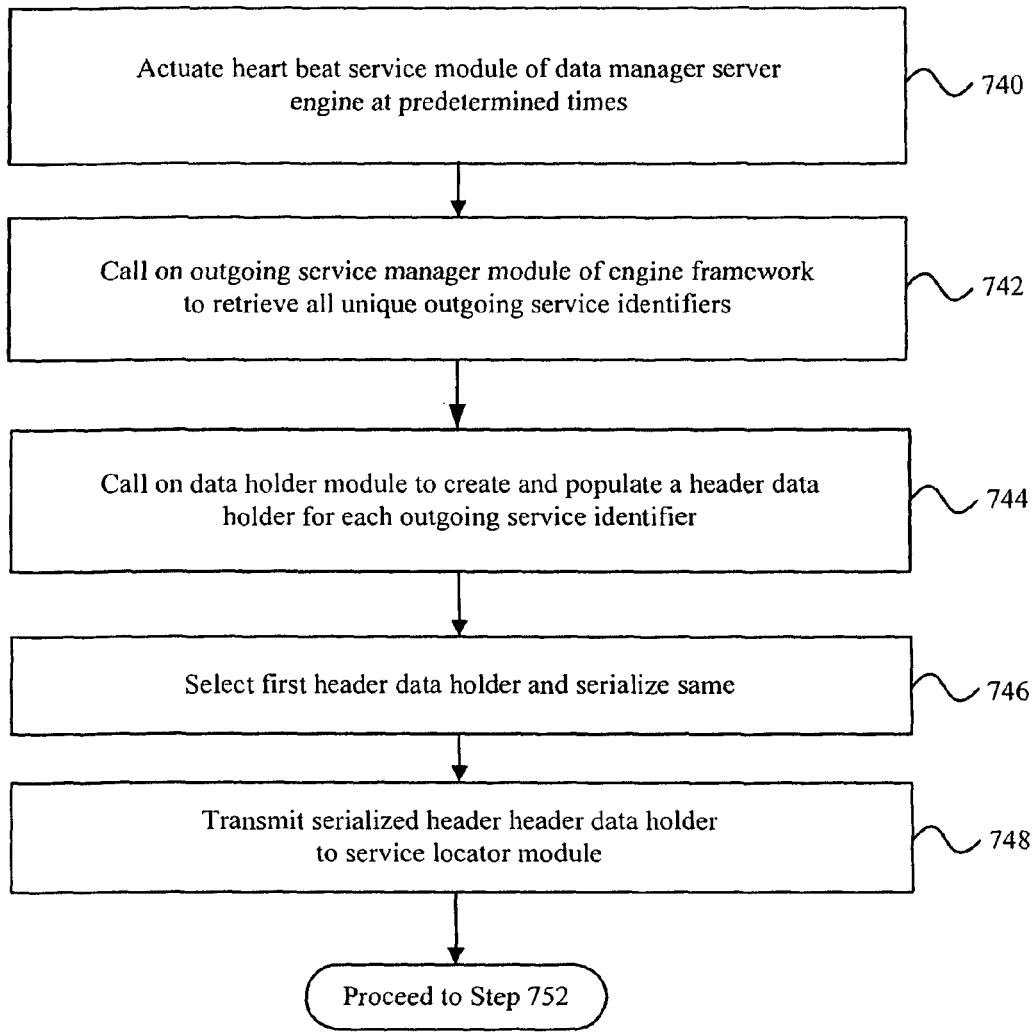
FIGS. 17a and 17b together form a flowchart illustrating the steps carried out by the data manager server to initiate a heart beat service type request, in accordance with an embodiment of the invention.
Figure 17B:
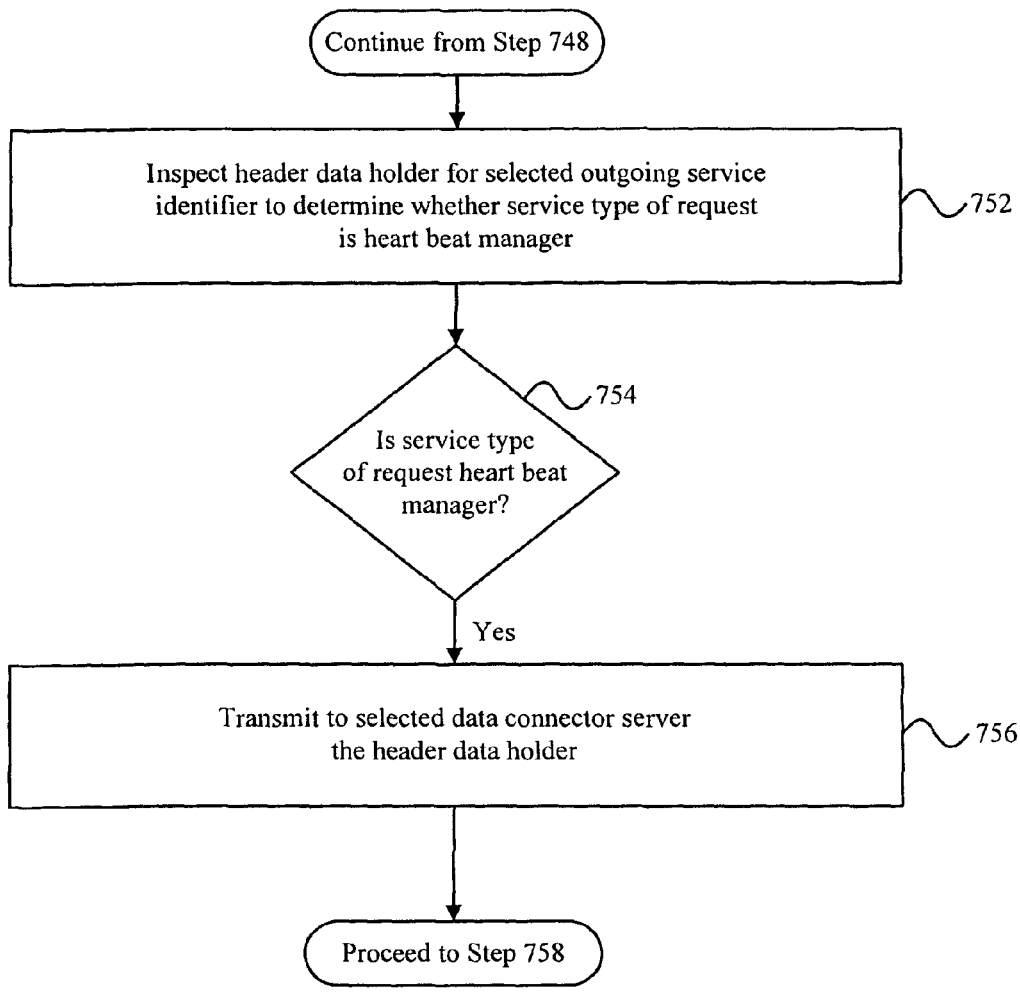

Referring to FIG. 17b, the module 72 inspects the header data holder for the selected outgoing service identifier to determine whether the service type of request is heart beat manager. Given that FIGS. 17a and 17b track the sequence of steps performed by the server 28b in connection with a heart beat manager service type request, the service type of the request in this case will be found to be heart beat manager (at step 754). The module 72 transmits to each data connector server 30 the header data holder (at step 756).

FIGS. 18a, 18b, 18c and 18d illustrate the handling of a heart manager service type request by the data connector server 30a. Once the request (containing the header data holder) is received at the data connector server 30a, the server 30a performs steps 540 to 544 (at step 758) as described above. More specifically, the request is received at the communication service module 82 (at step 540) and transmitted to the main process manager module 84 (at step 542) and subsequently, to the request handler module 86 (at step 544). The request handler module 86 calls on the data holder module 100 of engine framework 44c to create a header data holder and populate the header data holder with the incoming header data (at step 760). The header data holder is then returned to the main process manager module 84 (at step 762). Next, the module 84 inspects the header to determine whether the service type of request is heart beat manager (at step 764). Given that FIGS. 18a to 18d track the sequence of steps performed by the server 30a in connection with a heart beat manager service type request, the service type of the request in this case will be found to be heart beat manager (at step 766). The main process manager module 84 transmits the request to the heart beat service module 92 (at step 770).

Figure 18A:
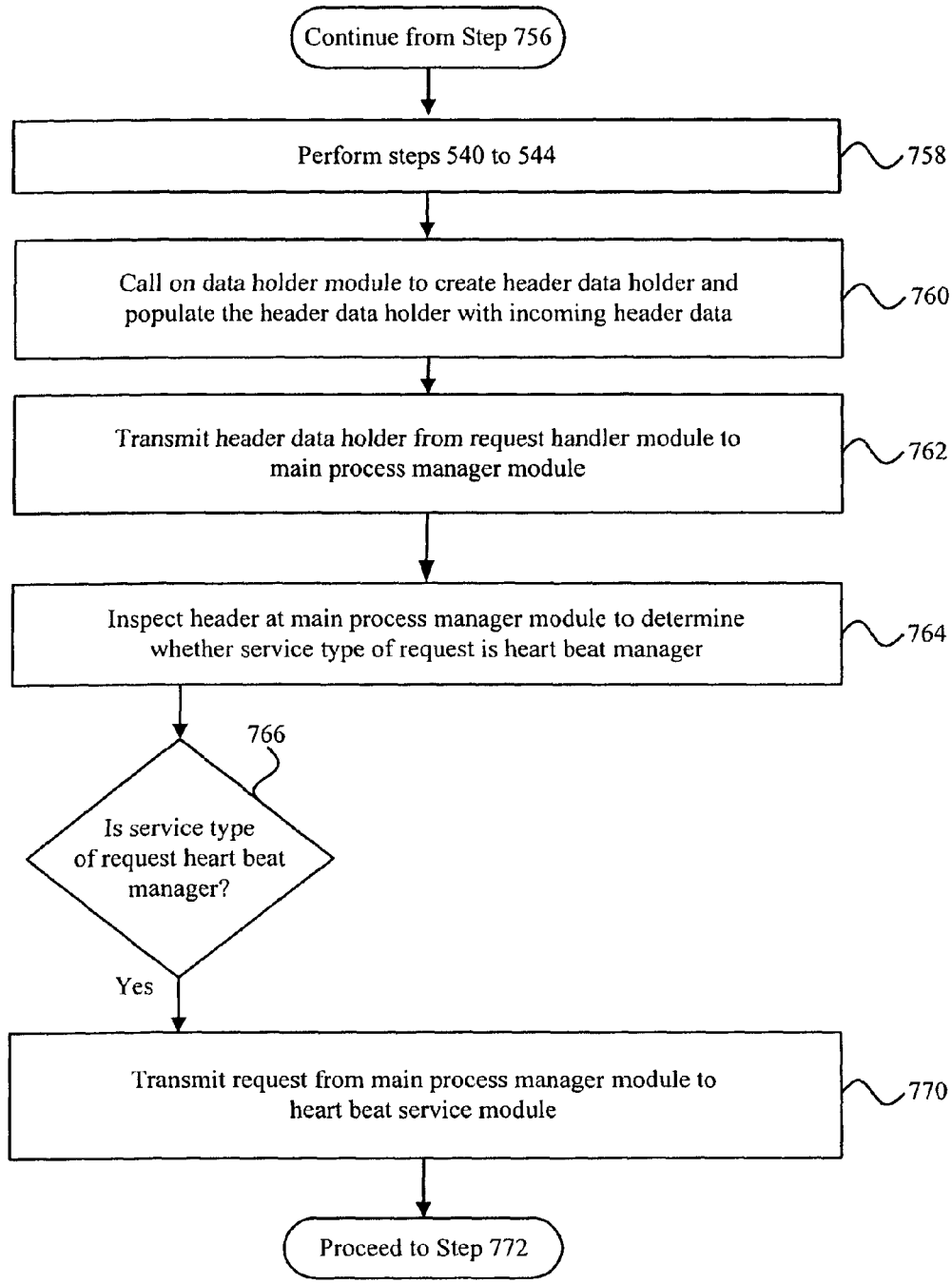
FIGS. 18a to 18d together form a flowchart illustrating the steps carried out by the data connector server receiving a heart beat manager message or request and those steps carried out by the data manager server receiving a response to the heart beat manager message or request, in accordance with an embodiment of the invention.
Figure 18B:
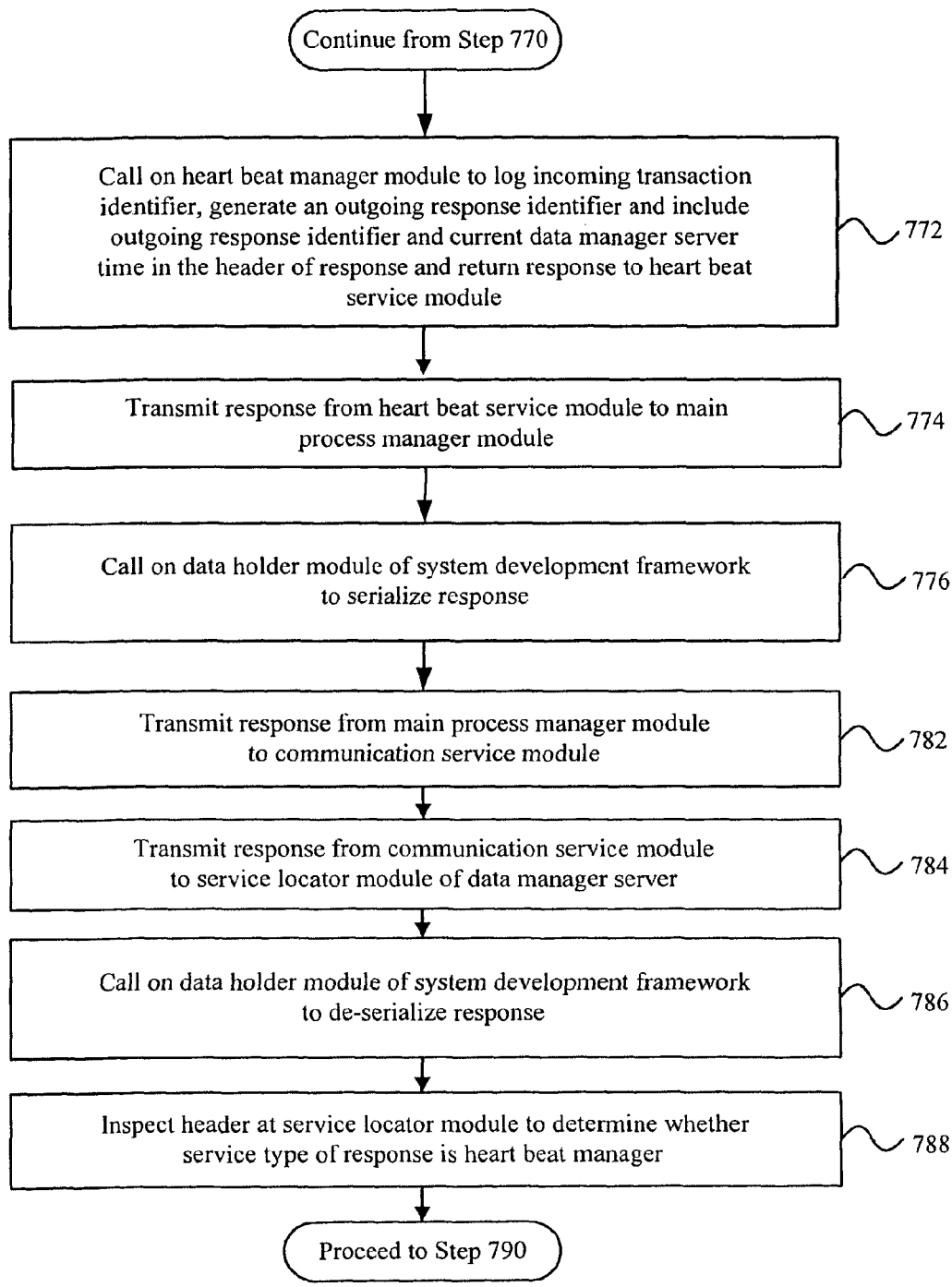
Figure 18C:
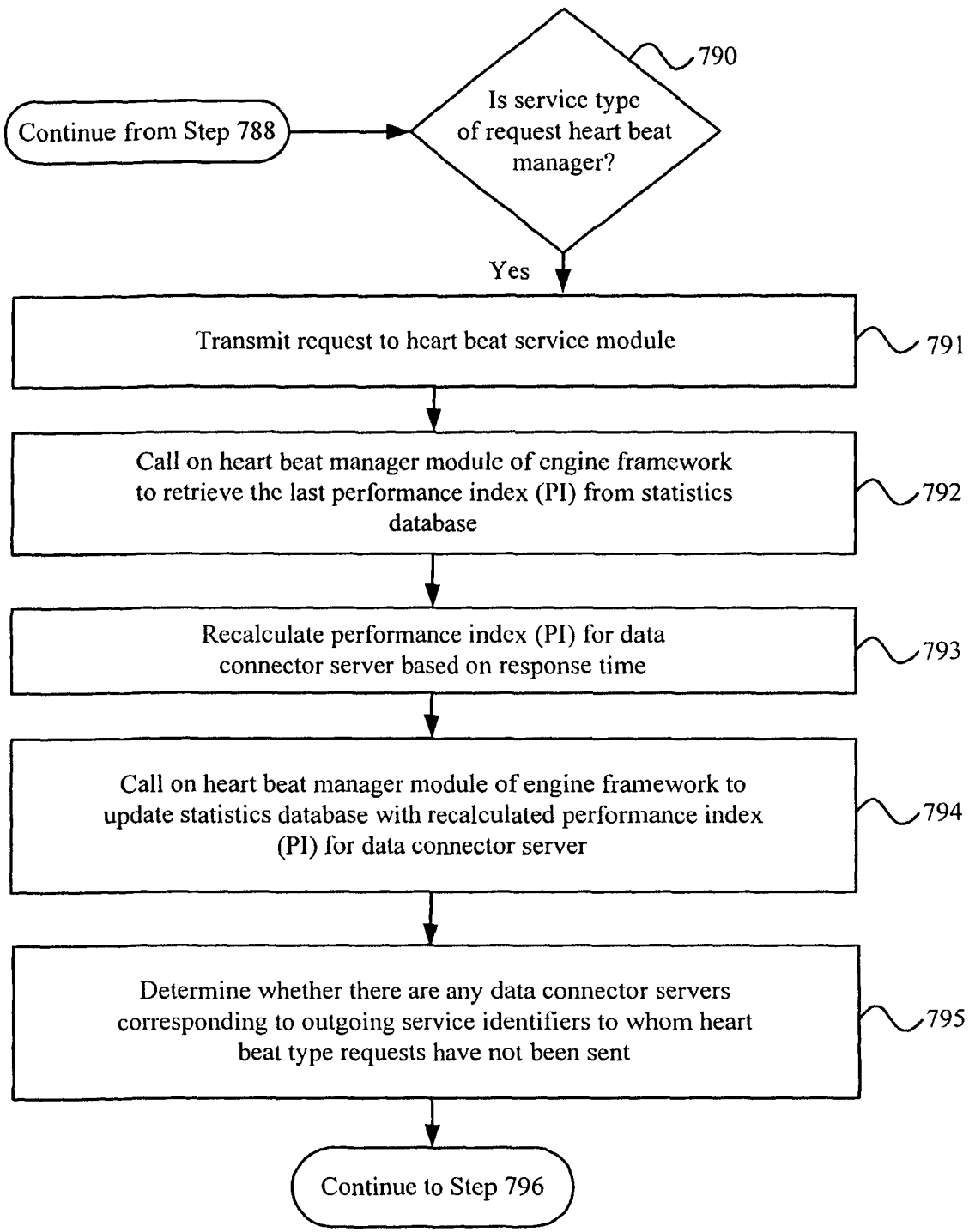

Referring to FIG. 18b, the module 92 calls on the heart beat manager module 124 of the engine framework 44c to log the incoming transaction identifier, generate an outgoing response identifier and include the outgoing response identifier and current data manager server time in the header of the response. The module 124 also updates the service records stored in the statistics database 126. The response is then returned to the heart beat service module 92 (at step 772) and from there transmitted back to the main process manager module 84 (at step 774).

The module 84 will then call on the data holder module 100 of the engine framework 44c to serialize the response (at step 776). Subsequently, the response is transmitted from the main process manager module 84 to the communication service module 82 (at step 782) and then from the communication service module 82 to the service locator module 72 of the data manager server 28b (at step 784). The service locator module 72 will then call on the data holder module 100 of the engine framework 44b to de-serialize the response (at step 786). The module 72 will inspect the header to determine whether the service type of the response is heart beat manager (at step 788). Given that FIGS. 18a to 18d track the sequence of steps performed by the servers 28b and 30a in connection with a heart beat manager service type request, the service type of the response in this case will be found to be heart beat manager (at step 790) (see FIG. 18c).

The service locator module 72 then transmits the response to the heart beat service module 74 (at step 791). The module 74 calls on the heart beat manager module 124 of the engine framework 46b to retrieve the last performance index (PI) from the statistics database 126 (at step 792). The module 74 then recalculates the performance index (PI) for the data connector server 30a based on the response time of the data manager server (at step 793). The algorithm for recalculating the performance index is described below.

In the preferred embodiment, the performance index is based on server response time and more specifically, on the time it took for the server 30a to respond to the heart beat message transmitted by the data manager server 28b. If the current time taken to respond to the heart beat message is lower than the previous response time, then the current response time will be set as the new performance index. However, if the current response time is greater than the previous response time then the performance index will be calculated as follows. The previous response time will be subtracted from the current response time and the difference obtained from such operation will be halved. The value thus obtained will be added to the previous response time and the resulting sum will become the new performance index for the data connector server 30a. Thereafter, the OSM database 110 will be updated with the new performance index (PI) for the data connector server 28b. Other algorithms could also be employed to recalculate the performance index of the data connector server.

Once the performance index (PI) has been recalculated, then the module 74 calls on the heart beat manager module 124 of the engine framework 44b to update the statistics database 126 with the recalculated performance index (PI) for the data connector server (at step 794). The module 74 then determines whether there are any data connector servers corresponding to the outgoing service identifiers to whom heart beat type requests have not been sent (at step 795).

Figure 18D:
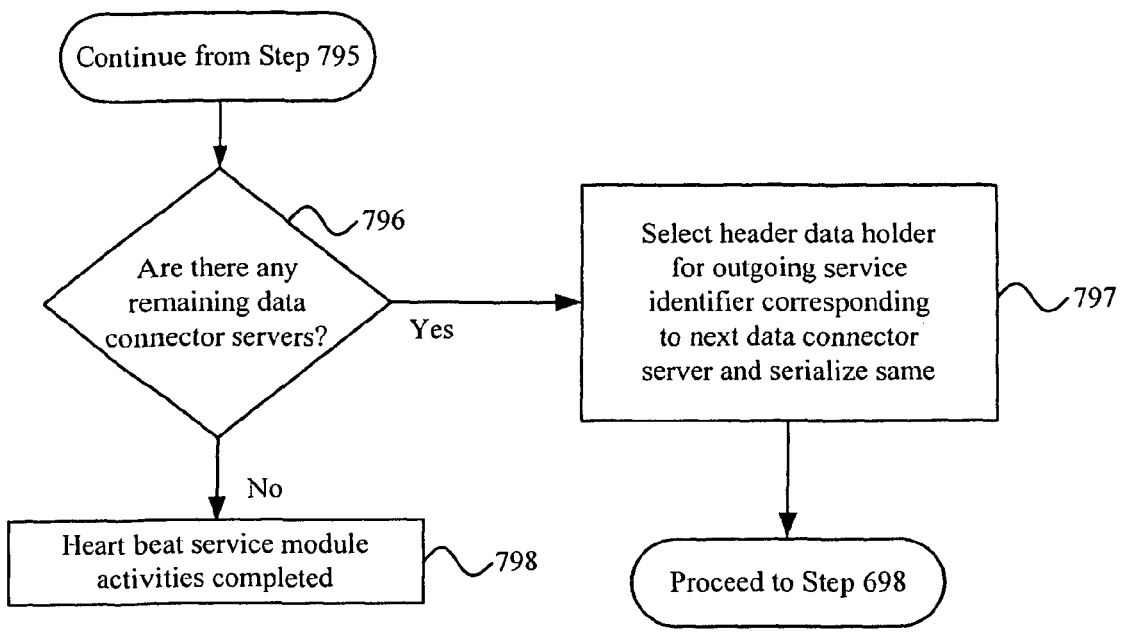

Referring to FIG. 18d, if it is determined (at step 796) that there are any such data connector servers, then the heart beat service module 74 selects the header data holder for the outgoing service identifier corresponding to next data connector server and serializes same (at step 797) and proceeds to step 748 shown in FIG. 17a. However, if it is determined (at step 796) that heart beat type requests have been sent to all data manager servers corresponding to the outgoing service identifiers, then the heat beat service module 74 has completed its activities (at step 798).

The heart beat strategy described above allows the system 20 to leverage the attributes of a distributed network environment and to manage/balance the request load handled by the various data manager servers 28 and data connectors 30 for optimal load distribution on a real time basis.

From the foregoing disclosure, it will be apparent that the identity verification system and the methods described above may be computer implemented and may be embodied in software, either in whole or in part. However, it should be appreciated that the principles of the present invention could be implemented to similar advantage by hardwired circuitry used in place of, or in combination with, software instructions. Thus, the present invention is not limited to any specific combination of hardware circuitry and software.

The identification verification system 20 has been described as an exemplary embodiment of the present invention. However, it should be appreciated that the principles of the present invention could be applied to other systems configured to verify 2D/3D barcodes, fingerprints, retina images and voiceprints. Such systems would support binary incoming data and would be provided with specialized engines configured for image or voice recognition or verification.

Additionally, the principles of the present invention could be applied to other types of systems and need not be restricted to systems for identity verification. The network configurations, the hardware, the software, the methods and procedures described above in the context of system 20 could be adapted for use in other data transaction or data exchange systems.

Although the foregoing description and accompanying drawings relate to specific preferred embodiments of the present invention and specific systems and methods relating to identity verification as presently contemplated by the inventors, it will be understood that various changes, modifications and adaptations, may be made without departing from the spirit of the invention.

What is claimed is:

1. A method for verifying the identity of an individual comprising the steps of:
   transmitting from a customer system to a customer connector server a request for identity verification containing identification information provided by the individual to be identified;
   at the customer connector server, identifying from the request for identity verification at least one verification service required to satisfy the request for identity verification;
   selecting for each verification service, based on a first set of predetermined criteria, an appropriate data manager server from a plurality of data manager servers to manage the verification service;
   transmitting to each appropriate data manager server a corresponding request verification service;
   at each appropriate data manager server, identifying from the corresponding request for verification service at least one data access service required to permit the identification information provided by the individual to be verified against identity information relating to the individual contained within the at least one data source;

selecting for each data access service, based on a second set of predetermined criteria, an appropriate data connector server from a plurality of data connector servers to manage the data access service;

transmitting to each appropriate data connector server a corresponding request for data access service;

accessing from each appropriate data connector server at least one data source in connection with each request for data access service;

verifying the identification information provided by the individual against the identity information relating to the individual contained within the at least one data source;

generating a response indicating whether the identity of the individual has been authenticated; and communicating the response to the customer system.

2. The method for identity verification of claim 1 further comprising the steps of receiving at the customer connector server the request for identity verification and authenticating the source of the request for identity verification, prior to identifying from the request for identity verification the at least one verification service.

3. The method for identity verification of claim 2 wherein:
the request for identity verification includes encrypted header, input and output xml strings; and
the method further comprises the step of decrypting and de-serializing the header, input and output xml strings, after authenticating the source of the request for identity verification.

4. The method for identity verification of claim 3 further comprising the steps of creating incoming header, input and output data holders for the data obtained from the decrypted and deserialized header, input and output xml strings and loading data into the incoming header, input and output data holders.

5. The method for identity verification of claim 4 wherein the step of identifying from the request for identity verification the at least one verification service includes obtaining from the incoming header data holder an incoming service identifier associated with at least one verification service, and determining the at least one verification service based on the incoming service identifier.

6. The method for identity verification of claim 5 further comprising, after the determining step, the steps of:
creating outbound header, input and output data holders; and
loading data from the incoming header, input and output data holders into the outbound header, input and output data holders.

7. The method for identity verification of claim 5 wherein:
the first set of predetermined criteria includes the geographic proximity of each data manager server to the customer connector server and the responsiveness of each data manager server; and
the step of selecting for each verification service an appropriate data manager server, includes the step of retrieving for each verification service a list of data manager servers capable of managing the verification service and information pertaining to the geographic proximity and responsiveness criteria for each of the data manager servers on the list.

8. The method for identity verification of claim 6 further comprising the step of serializing and encrypting the outbound header, input and output data holders.

9. The method for identity verification of claim 8 wherein the corresponding request for verification service transmitted to each appropriate data manager server includes the serialized and encrypted outbound header, input and output data holders.

10. The method for identity verification of claim 1 further comprising the steps of receiving at the appropriate data manager server the corresponding request for verification service and authenticating the source of the request for verification service, prior to identifying from the request for verification service the at least one data access service.

11. The method for identity verification of claim 10 wherein:
the request for verification service includes encrypted incoming header, input and output xml strings; and
the method further comprises the step of decrypting and de-serializing the incoming header, input and output xml strings, after authenticating the source of the request for verification service.

12. The method for identity verification of claim 11 wherein the step of identifying from the request for verification service the at least one data access service includes obtaining from the incoming header data holder an incoming service identifier associated with at least one data access service, and determining the at least one data access service based on the incoming service identifier.

13. The method for identity verification of claim 12 further comprising, after the determining step, the steps of:
creating outbound header, input and output data holders; and
loading data from the incoming header, input and output data holders into the outbound header, input and output data holders.

14. The method for identity verification of claim 13 further comprising, after the steps of creating and loading, the step of verifying whether the requestor who initiated the request for identity verification has a valid subscription to the verification service requested.

15. The method for identity verification of claim 12 wherein:
the second set of predetermined criteria includes the geographic proximity of each data connector server to the appropriate data manager server and the responsiveness of each data connector server; and
the step of selecting for each data access service an appropriate data connector server, includes the step of retrieving for each data access service a list of data connector servers capable of managing the data access service and information pertaining to the geographic proximity and responsiveness for each of the data connector servers on the list.

16. The method for identity verification of claim 13 further comprising the step of serializing and encrypting the outbound header, input and output data holders.

17. The method for identity verification of claim 15 wherein the corresponding request for data access service transmitted to each appropriate data connector server includes the serialized and encrypted outbound header, input and output data holders.

18. The method for identity verification of claim 1 further comprising the steps of receiving at the appropriate data connector server the corresponding request for data access service and authenticating the source of the request for data access service, prior to accessing from each appropriate data connector server at least one data source.

19. The method for identity verification of claim 18 wherein:
the request for data access service includes encrypted incoming header, input and output xml strings; and
the method further comprises the step of decrypting and de-serializing the incoming header, input and output xml strings, after authenticating the source of the request for data access service.

20. A method for verifying the identity of an individual comprising the steps of:
transmitting from a customer system to a business portal a request for identity verification containing identification information provided by the individual to be identified;
at the business portal, identifying from the request for identity verification at least one verification service required to satisfy the request for identity verification;
selecting for each verification service, based on a first set of predetermined criteria, an appropriate data manager server from a plurality of data manager servers to manage the verification service;
transmitting to each appropriate data manager server a corresponding request for verification service;
at each appropriate data manager server, identifying from the corresponding request for verification service at least one data access service required to permit the identification information provided by the individual to be verified against identity information relating to the individual contained within the at least one data source;
selecting for each data access service, based on a second set of predetermined criteria, an appropriate data connector server from a plurality of data connector servers to manage the data access service;
transmitting to each appropriate data connector server a corresponding request for data access service;
accessing from each appropriate data connector server at least one data source in connection with each request for data access service;
verifying the identification information provided by the individual against the identity information relating to the individual contained within the at least one data source; and
generating a response indicating whether the identification information provided by the individual matches the identity information relating to the individual contained within the at least one data source; and
communicating the response to the customer system.

21. A system for verifying the identity of an individual comprising:
a customer connector server for connecting to a customer system and for receiving therefrom a request for identity verification containing identification information provided by the individual to be identified;
a plurality of data manager servers connected to the customer connector server;
a plurality of data connector servers, each data connector server being connected to at least one data manager server of the plurality and being operable to access at least one data source containing identity information relating to the individual;
the customer connector server being operable to identify from the request for identity verification at least one verification service required to satisfy the request and to select for each verification service, based on a first set of predetermined criteria, an appropriate data manager server of the plurality thereof to manage the verification service; the customer connector server being further operable to transmit to each appropriate data manager server a corresponding request for verification service;
each appropriate data manager server being operable to identity from the corresponding request for verification service at least one data access service required to permit the identification information provided by the individual to be verified against the identity information relating to the individual contained within the at least one data source; each appropriate data manager server being further operable to select for each data access service, based on a second set of predetermined criteria, an appropriate data connector server of the plurality thereof to manage the data access service, and to transmit to each appropriate data connector server a corresponding request for data access service.

22. The identity verification system of claim 21 wherein the customer system includes a system selected from the group consisting of: (a) a point-of-sale system; (b) a financial services system; and (c) a risk management system.

23. The identity verification system of claim 21 wherein the plurality of data manager servers includes a first data manager server and a second data manager server; the customer connector server being connected to the first data manager server; the first data manager server being connected to the second data manager server and the second data manager server being connected to one of the data connector servers of the plurality.

24. The identity verification system of claim 21 wherein the at least one data source is selected from the group consisting of: (a) a database system; (b) a legacy records system; and (c) a web service.

25. The identity verification system of claim 21 wherein:
the at least one data source is managed by a data service provider; and
the selected at least one data connector server is physically located at a facility of the data service provider and resides behind a firewall of the data service provider.

26. The identity verification system of claim 21 wherein:
the customer connector server, the data manager servers and the data connector servers includes a server engine for coordinating and managing the performance of a plurality of request and response processing steps, and a plurality of frameworks configured for communication with the server engine;
the plurality of frameworks having resources which may be called upon by the server engine to perform at least some of the request and response processing steps.

27. The identity verification system of claim 26 wherein the plurality of frameworks includes an engine framework, a system development framework and a system portal framework.

28. The identity verification system of claim 27 wherein the customer connector server includes:
a main process manager module;
a communication service module for receiving the request for identity verification from the customer system and for returning responses to the customer system;
a request handler module for coordinating authentication of the source of the request for identity verification and creation of a first set of incoming data holders associated with the request for identity verification received from the customer system;
a customer handler module for creating a second set of outgoing data holders based on the first set of incoming data holders for transmission to each appropriate data manager server; and
a service locator module configured for communication with the customer handler module, the service locator module being operable to select the appropriate data manager and transmit to the appropriate data manager server the outgoing data holders;

each of the communication service module, the request handler module and the customer handler module being configured for communication with the main process manager module; the main process manager module being operable to coordinate the activities of the communication service module, the request handler module and the customer handler module.

29. The identity verification system of claim 28 wherein the server engine of the customer connector server further includes a heart beat service module configured for communication with the service locator module and co-operable therewith to transmit heart beat type messages to the plurality of data manager servers to measure the responsiveness of the plurality of data manager servers.

30. The identity verification system of claim 26 wherein the server engine of each data manager server includes:
a main process manager module;
a communication service module for receiving a request for verification service from the customer connector server and for returning responses to the customer connector server;
a request handler module for coordinating authentication of the source of the request for verification service and creation of a first set of incoming data holders associated with the request for verification service received from the customer connector server;
a service handler module for creating a second set of outgoing data holders based on the first set of incoming data holders for transmission to the appropriate data connector server; and
a service locator module configured for communication with the service handler module, the service locator module being operable to select the appropriate data connector server and transmit to the appropriate data connector server the outgoing data holders;
each of the communication service module, the request handler module and the service handler module being configured for communication with the main process manager module; the main process manager module being operable to coordinate the activities of the communication service module, the request handler module and the service handler module.

31. The identity verification system of claim 30 wherein the server engine of each data manager server further includes a heart beat service module configured for communication with the service locator module and co-operable therewith to transmit heart beat type messages to at least some data connector servers of the plurality to measure the responsiveness of the at least some data connector servers.

32. The identity verification system of claim 31 wherein the heart beat service module is configured for communication with the main engine process module and is operable to respond to heart beat type messages originating from the customer connector server.

33. The identity verification system of claim 26 wherein the server engine of each data connector server includes:
a main process manager module;
a communication service module for receiving a request for data access service from the at least one data manager server and for returning responses to the at least one data manager server;
a request handler module for coordinating authentication of the source of the request for data access service and creation of a set of incoming data holders associated with the request for data access service received from the at least one data manager server;
a data access module capable of accessing the at least one data source; and
an interface handler module configured for communication with, and operable to actuate, the data access module;
each of the communication service module, the request handler module and the interface handler module being configured for communication with the main process manager module; the main process manager module being operable to coordinate the activities of the communication service module, the request handler module and the interface handler module.

34. The identity verification system of claim 33 wherein the server engine of each data connector server further includes a heart beat service module configured for communication with the main process manager module, the heart beat service module being operable to respond to heart beat type messages originating from the at least one data manager server.

35. The identity verification system of claim 33 wherein the server engine of each data connector server further includes a cache database connected to the data access service module, the cache database capable of storing data extracted from the at least one data source.

36. The identity verification system of claim 35 wherein the server engine of each data connector server further includes a batch control manager connected to the data access service module and the at least one data source, the batch control manager being operable to periodically refresh the data stored on the cache database with more recent data extracted from the at least one data source.

37. The identity verification system of claim 21 wherein the first set of predetermined criteria includes the geographic proximity of each of the data manager servers to the customer connector server and the performance index of each of the data manager servers.

38. The identity verification system of claim 37 wherein the geographic proximity criterion in the first set of predetermined criteria is given priority over the performance index criterion.

39. The identity verification system of claim 38 wherein the performance index of each of the data manager servers is calculated based on the responsiveness of each of the data manager servers.

40. The identity verification system of claim 39 wherein the responsiveness of each of the data manager servers is determined using a heart beat strategy deployed jointly by the customer connector server and each of the data manager servers.

41. The identity verification system of claim 21 wherein the second set of predetermined criteria includes the geographic proximity of each of the data connector servers to the appropriate data manager server and the performance index of each of the data connector servers.

42. The identity verification system of claim 41 wherein the geographic proximity criterion in the second set of predetermined criteria is given priority over the performance index criterion.

43. The identity verification system of claim 42 wherein the performance index of each of the data connector servers is calculated based on the responsiveness of each of the data connector servers.

44. The identity verification system of claim 43 wherein the responsiveness of each of the data connector servers is determined using a heart beat strategy deployed jointly by the appropriate data manager server and each of the data connector servers.

45. A system for verifying the identity of an individual comprising:
- a business portal for connecting to a customer system and for receiving therefrom a request for identity verification containing identification information provided by the individual to be identified;
- a plurality of data manager servers connected to the business portal;
- a plurality of data connector servers, each data connector server being connected to at least one data manager server of the plurality and being operable to access at least one data source containing identity information relating to the individual;
- the business portal being operable to identify from the request for identity verification at least one verification service required to satisfy the request and to select for each verification service, based on a first set of predetermined criteria, an appropriate data manager server of the plurality thereof to manage the verification service; the business portal being further operable to transmit to each appropriate data manager server a corresponding request for verification service;
- each appropriate data manager server being operable to identity from the corresponding request for verification service at least one data access service required to permit the identification information provided by the individual to be verified against the identity information relating to the individual contained within the at least one data source; each appropriate data manager server being further operable to select for each data access service, based on a second set of predetermined criteria, an appropriate data connector server of the plurality thereof to manage the data access service, and to transmit to each appropriate data connector server a corresponding request for data access service.

* * * * *